US010178435B1

(12) United States Patent
Patel et al.

(10) Patent No.: US 10,178,435 B1
(45) Date of Patent: Jan. 8, 2019

(54) METHODS AND APPARATUS FOR ENABLING MEDIA FUNCTIONALITY IN A CONTENT DELIVERY NETWORK

(71) Applicant: Time Warner Cable Enterprises LLC, New York, NY (US)

(72) Inventors: Vipul Patel, Upper Holland, PA (US); Scott Miller, Doylestown, PA (US); Mehul Shah, Lansdale, PA (US); Jian Yu, Warrington, PA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 355 days.

(21) Appl. No.: 13/794,560

(22) Filed: Mar. 11, 2013

Related U.S. Application Data

(63) Continuation of application No. 12/582,653, filed on Oct. 20, 2009, now Pat. No. 8,396,055.

(51) Int. Cl.
*H04L 29/06* (2006.01)
*H04N 21/45* (2011.01)

(52) U.S. Cl.
CPC .............................. *H04N 21/4516* (2013.01)

(58) Field of Classification Search
CPC ... A63F 13/12; A63F 2300/402; G06Q 50/20; H04N 7/106; H04N 21/4781
See application file for complete search history.

(56) References Cited

U.S. PATENT DOCUMENTS 5,410,344 A 4/1995 Graves et al.
5,528,284 A 6/1996 Iwami et al.
(Continued)

FOREIGN PATENT DOCUMENTS

JP 2001275090 A 10/2001
JP A-2005-519365 6/2005
(Continued)

OTHER PUBLICATIONS

Enhanced TV Binary Interchange, Format 1.0 OC-SP-ETV-BIF1.0-I04-070921 Date: Sep. 21, 2007, 420 pages.
(Continued)

*Primary Examiner* — Gregory B Sefcheck
*Assistant Examiner* — Jenkey Van
(74) *Attorney, Agent, or Firm* — Gazdzinski & Associates, PC

(57) ABSTRACT

Methods and apparatus for providing unified access to interactive media applications and services in a network. In one embodiment, the network comprises a content-based network such as a cable television or satellite network, and the applications are disposed at the network headend. A servlet is provided to facilitate communication between the applications and client devices. The servlet acts as a proxy for applications utilizing a different content format than the client devices. The applications obtain data from e.g., an internet host server via a gateway device. The client application(s) may comprise Enhanced TV Binary Interchange Format (EBIF) pages, and are configured so as to permit use via a common interface (e.g., the user's set top box and television display). These client applications enable a user to, for example, search the internet for data relating to displayed content, post and navigate micro-blogs, instant messaging or SMS, making telephone calls (e.g., VoIP), address/contact management, or provide the user with additional information about a product or service. An application providing internet content to the client device is also provided.

12 Claims, 30 Drawing Sheets

(56) References Cited

U.S. PATENT DOCUMENTS

| | | |
|---|---|---|
| 5,534,911 A | 7/1996 | Levitan |
| 5,557,319 A | 9/1996 | Gurusami et al. |
| 5,628,284 A | 5/1997 | Sheen et al. |
| 5,708,961 A | 1/1998 | Hylton et al. |
| 5,745,837 A | 4/1998 | Fuhrmann |
| 5,758,257 A | 5/1998 | Herz et al. |
| 5,818,438 A | 10/1998 | Howe et al. |
| 5,822,530 A | 10/1998 | Brown |
| 5,838,921 A | 11/1998 | Speeter |
| 5,844,552 A | 12/1998 | Gaughan et al. |
| 5,897,635 A | 4/1999 | Torres et al. |
| 5,940,738 A | 8/1999 | Rao |
| 5,999,525 A | 12/1999 | Krishnaswamy et al. |
| 5,999,535 A | 12/1999 | Wang et al. |
| 6,118,472 A | 9/2000 | Dureau et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,473,793 B1 | 10/2002 | Dillon et al. |
| 6,519,062 B1 | 2/2003 | Yoo |
| 6,523,696 B1 | 2/2003 | Saito et al. |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,721,789 B1 | 4/2004 | DeMoney |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 6,981,045 B1 | 12/2005 | Brooks |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,242,960 B2 | 7/2007 | Van Rooyen |
| 7,242,988 B1 | 7/2007 | Hoffberg et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 2/2008 | Shao et al. |
| 7,330,483 B1 | 2/2008 | Peters et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,759 B1 | 3/2008 | Rodriguez |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen |
| 7,444,655 B2 | 10/2008 | Sardera |
| 7,457,520 B2 | 11/2008 | Rossetti et al. |
| 7,486,869 B2 | 2/2009 | Alexander |
| 7,487,523 B1 | 2/2009 | Hendricks |
| 7,532,712 B2 | 5/2009 | Gonder |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek |
| 7,602,820 B2 | 10/2009 | Helms |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,690,020 B2 | 3/2010 | Lebar |
| 7,693,171 B2 | 4/2010 | Gould |
| 7,721,314 B2 | 5/2010 | Sincaglia et al. |
| 7,725,553 B2 | 5/2010 | Rang et al. |
| 7,742,074 B2 | 6/2010 | Minatogawa |
| 7,763,360 B2 | 7/2010 | Paul et al. |
| 7,770,200 B2 | 8/2010 | Brooks et al. |
| 7,787,539 B2 | 8/2010 | Chen |
| 7,809,942 B2 | 10/2010 | Baran et al. |
| 7,889,765 B2 | 2/2011 | Brooks et al. |
| 7,893,171 B2 | 2/2011 | Le et al. |
| 7,900,052 B2 | 3/2011 | Jonas |
| 7,908,626 B2 | 3/2011 | Williamson et al. |
| 7,916,755 B2 | 3/2011 | Hasek |
| 7,924,451 B2 | 4/2011 | Hirooka |
| 7,936,775 B2 | 5/2011 | Iwamura |
| 7,954,131 B2 | 5/2011 | Cholas et al. |
| 7,975,283 B2 | 7/2011 | Bedingfield |
| 7,987,491 B2 * | 7/2011 | Reisman ............ G06F 17/30873 725/112 |
| 8,015,306 B2 | 9/2011 | Bowman |
| 8,032,914 B2 | 10/2011 | Rodriguez |
| 8,042,054 B2 | 10/2011 | White et al. |
| 8,046,836 B2 | 10/2011 | Isokawa |
| 8,056,103 B2 | 11/2011 | Candelore |
| 8,095,610 B2 | 1/2012 | Gould et al. |
| 8,151,194 B1 | 4/2012 | Chan et al. |
| 8,166,126 B2 | 4/2012 | Bristow et al. |
| 8,170,065 B2 | 5/2012 | Hasek |
| 8,219,134 B2 | 7/2012 | Maharajh et al. |
| 8,249,497 B2 | 8/2012 | Ingrassia et al. |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2 | 3/2013 | Patel |
| 8,429,702 B2 | 4/2013 | Yasrebi et al. |
| 8,484,511 B2 | 7/2013 | Engel et al. |
| 8,516,529 B2 | 8/2013 | LaJoie et al. |
| 8,520,850 B2 | 8/2013 | Helms et al. |
| 8,677,431 B2 | 3/2014 | Smith |
| 8,713,623 B2 | 4/2014 | Brooks |

(56) References Cited

U.S. PATENT DOCUMENTS

| | | | |
|---|---|---|---|
| 8,731,053 B2 | 5/2014 | Karegoudar |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,805,270 B2 | 8/2014 | Maharajh et al. |
| 8,949,919 B2 | 2/2015 | Cholas et al. |
| 8,995,815 B2 | 3/2015 | Maharajh et al. |
| 9,124,608 B2 | 9/2015 | Jin et al. |
| 9,124,650 B2 | 9/2015 | Maharajh et al. |
| 2001/0004768 A1 | 6/2001 | Hodge et al. |
| 2001/0050924 A1 | 12/2001 | Herrmann et al. |
| 2001/0050945 A1 | 12/2001 | Lindsey |
| 2002/0002688 A1 | 1/2002 | Gregg et al. |
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0049755 A1 | 4/2002 | Koike |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow |
| 2002/0100059 A1 | 7/2002 | Buehl et al. |
| 2002/0123931 A1 | 9/2002 | Splaver et al. |
| 2002/0143607 A1 | 10/2002 | Connelly |
| 2002/0144267 A1 | 10/2002 | Gutta et al. |
| 2002/0147771 A1 | 10/2002 | Traversat et al. |
| 2002/0152091 A1 | 10/2002 | Nagaoka |
| 2002/0152299 A1 | 10/2002 | Traversat et al. |
| 2002/0178444 A1 | 11/2002 | Trajkovic et al. |
| 2002/0188744 A1 | 12/2002 | Mani |
| 2002/0188869 A1 | 12/2002 | Patrick et al. |
| 2002/0194595 A1 | 12/2002 | Miller et al. |
| 2003/0005453 A1 | 1/2003 | Rodriguez et al. |
| 2003/0028451 A1 | 2/2003 | Ananian |
| 2003/0028873 A1 | 2/2003 | Lemmons |
| 2003/0046704 A1 | 3/2003 | Laksono et al. |
| 2003/0056217 A1 | 3/2003 | Brooks |
| 2003/0093794 A1 | 5/2003 | Thomas et al. |
| 2003/0097574 A1 | 5/2003 | Upton |
| 2003/0115267 A1 | 6/2003 | Hinton et al. |
| 2003/0118014 A1 | 6/2003 | Lyer et al. |
| 2003/0135628 A1 | 7/2003 | Fletcher et al. |
| 2003/0135860 A1 | 7/2003 | Dureau |
| 2003/0163443 A1 | 8/2003 | Wang |
| 2003/0165241 A1 | 9/2003 | Fransdonk |
| 2003/0166401 A1 | 9/2003 | Combes et al. |
| 2003/0200548 A1 | 10/2003 | Baran et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0019913 A1 | 1/2004 | Wong et al. |
| 2004/0031058 A1* | 2/2004 | Reisman ........... G06F 17/30873 725/112 |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0117254 A1 | 6/2004 | Nemirofsky |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0002418 A1 | 1/2005 | Yang et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson et al. |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1 | 10/2005 | Ramsayer et al. |
| 2005/0228725 A1 | 10/2005 | Rao et al. |
| 2005/0289616 A1 | 12/2005 | Horiuchi et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Rooyen et al. |
| 2006/0130107 A1* | 6/2006 | Gonder et al. ................. 725/110 |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0149850 A1 | 7/2006 | Bowman |
| 2006/0156392 A1 | 7/2006 | Baugher |
| 2006/0161635 A1 | 7/2006 | Lamkin et al. |
| 2006/0165173 A1 | 7/2006 | Kim et al. |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0221246 A1 | 10/2006 | Yoo |
| 2006/0224690 A1* | 10/2006 | Falkenburg ....... G06F 17/30905 709/217 |
| 2006/0236358 A1 | 10/2006 | Liu et al. |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. |
| 2007/0022469 A1 | 1/2007 | Cooper et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0049245 A1 | 3/2007 | Lipman |
| 2007/0050822 A1* | 3/2007 | Stevens ............... H04N 21/4788 725/74 |
| 2007/0053513 A1 | 3/2007 | Hoffberg |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0081537 A1 | 4/2007 | Wheelock |
| 2007/0094691 A1 | 4/2007 | Gazdzinski |
| 2007/0113246 A1 | 5/2007 | Xiong |
| 2007/0118848 A1 | 5/2007 | Schwesinger et al. |
| 2007/0121578 A1 | 5/2007 | Annadata et al. |
| 2007/0121678 A1 | 5/2007 | Brooks |
| 2007/0124488 A1 | 5/2007 | Baum et al. |
| 2007/0127519 A1* | 6/2007 | Hasek ................. H04N 21/2747 370/466 |
| 2007/0153820 A1 | 7/2007 | Gould |
| 2007/0154041 A1 | 7/2007 | Beauchamp |
| 2007/0157262 A1 | 7/2007 | Ramaswamy et al. |
| 2007/0180230 A1 | 8/2007 | Cortez |
| 2007/0204300 A1 | 8/2007 | Markley |
| 2007/0204314 A1 | 8/2007 | Hasek et al. |

(56) References Cited

U.S. PATENT DOCUMENTS

| | | |
|---|---|---|
| 2007/0209054 A1 | 9/2007 | Cassanova |
| 2007/0209059 A1 | 9/2007 | Moore et al. |
| 2007/0217436 A1* | 9/2007 | Markley ............ H04L 12/2803 370/401 |
| 2007/0219910 A1 | 9/2007 | Martinez |
| 2007/0226365 A1 | 9/2007 | Hildreth et al. |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie et al. |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky |
| 2008/0021836 A1 | 1/2008 | Lao |
| 2008/0022012 A1 | 1/2008 | Wang |
| 2008/0036917 A1 | 2/2008 | Pascarella et al. |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092181 A1 | 4/2008 | Britt |
| 2008/0098212 A1 | 4/2008 | Helms et al. |
| 2008/0098450 A1 | 4/2008 | Wu et al. |
| 2008/0101460 A1 | 5/2008 | Rodriguez |
| 2008/0112405 A1 | 5/2008 | Cholas |
| 2008/0127245 A1* | 5/2008 | Olds ................ G06Q 30/02 725/32 |
| 2008/0127255 A1* | 5/2008 | Ress ................ H04N 7/17318 725/38 |
| 2008/0133551 A1 | 6/2008 | Wensley et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin |
| 2008/0162353 A1 | 7/2008 | Tom et al. |
| 2008/0170551 A1 | 7/2008 | Zaks |
| 2008/0177998 A1 | 7/2008 | Apsangi et al. |
| 2008/0192820 A1 | 8/2008 | Brooks |
| 2008/0198780 A1 | 8/2008 | Sato |
| 2008/0201386 A1 | 8/2008 | Maharajh et al. |
| 2008/0201748 A1* | 8/2008 | Hasek et al. .............. 725/98 |
| 2008/0222684 A1 | 9/2008 | Mukraj et al. |
| 2008/0229379 A1 | 9/2008 | Akhter |
| 2008/0235746 A1 | 9/2008 | Peters |
| 2008/0244667 A1 | 10/2008 | Osborne |
| 2008/0273591 A1 | 11/2008 | Brooks |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0297669 A1 | 12/2008 | Zalewski et al. |
| 2008/0306903 A1 | 12/2008 | Larson et al. |
| 2008/0320523 A1 | 12/2008 | Morris et al. |
| 2008/0320540 A1 | 12/2008 | Brooks et al. |
| 2009/0025027 A1 | 1/2009 | Craner |
| 2009/0030802 A1 | 1/2009 | Plotnick et al. |
| 2009/0031335 A1 | 1/2009 | Hendricks et al. |
| 2009/0083279 A1 | 3/2009 | Hasek |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl |
| 2009/0100493 A1 | 4/2009 | Jones et al. |
| 2009/0133048 A1 | 5/2009 | Gibbs et al. |
| 2009/0141696 A1 | 6/2009 | Chou et al. |
| 2009/0150210 A1 | 6/2009 | Athsani et al. |
| 2009/0150917 A1 | 6/2009 | Huffman et al. |
| 2009/0151006 A1 | 6/2009 | Saeki et al. |
| 2009/0158311 A1 | 6/2009 | Hon et al. |
| 2009/0172776 A1 | 7/2009 | Makagon et al. |
| 2009/0185576 A1 | 7/2009 | Kisel et al. |
| 2009/0187939 A1 | 7/2009 | Lajoie |
| 2009/0193486 A1* | 7/2009 | Patel et al. .............. 725/114 |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas |
| 2009/0225760 A1 | 9/2009 | Foti |
| 2009/0235308 A1 | 9/2009 | Ehlers et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2009/0296621 A1 | 12/2009 | Park et al. |
| 2010/0012568 A1 | 1/2010 | Fujisawa et al. |
| 2010/0027560 A1 | 2/2010 | Yang et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0043030 A1 | 2/2010 | White |
| 2010/0083329 A1 | 4/2010 | Joyce et al. |
| 2010/0083362 A1 | 4/2010 | Francisco et al. |
| 2010/0086020 A1 | 4/2010 | Schlack |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122274 A1 | 5/2010 | Gillies |
| 2010/0122276 A1 | 5/2010 | Chen |
| 2010/0125658 A1 | 5/2010 | Strasters |
| 2010/0131973 A1 | 5/2010 | Dillon et al. |
| 2010/0135646 A1 | 6/2010 | Bang et al. |
| 2010/0138900 A1 | 6/2010 | Peterka et al. |
| 2010/0169977 A1 | 7/2010 | Dasher et al. |
| 2010/0199312 A1 | 8/2010 | Chang et al. |
| 2010/0217613 A1 | 8/2010 | Kelly et al. |
| 2010/0218231 A1 | 8/2010 | Frink et al. |
| 2010/0219613 A1 | 9/2010 | Zaloom et al. |
| 2010/0251304 A1 | 9/2010 | Donoghue |
| 2010/0251305 A1 | 9/2010 | Kimble et al. |
| 2010/0269144 A1 | 10/2010 | Forsman et al. |
| 2010/0280641 A1 | 11/2010 | Harkness et al. |
| 2010/0287609 A1 | 11/2010 | Gonzalez et al. |
| 2010/0313225 A1 | 12/2010 | Cholas |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0078001 A1* | 3/2011 | Archer ............ G06Q 30/02 705/14.2 |
| 2011/0078005 A1* | 3/2011 | Klappert ............ G06Q 20/02 705/14.23 |
| 2011/0078731 A1* | 3/2011 | Nishimura .............. 725/39 |
| 2011/0090898 A1 | 4/2011 | Patel et al. |
| 2011/0093900 A1 | 4/2011 | Patel |
| 2011/0099017 A1 | 4/2011 | Ure |
| 2011/0103374 A1 | 5/2011 | LaJoie et al. |
| 2011/0107379 A1 | 5/2011 | Lajoie et al. |
| 2011/0110515 A1 | 5/2011 | Tidwell et al. |
| 2011/0126018 A1 | 5/2011 | Narsinh et al. |
| 2011/0126244 A1 | 5/2011 | Hasek |
| 2011/0138064 A1 | 6/2011 | Rieger et al. |
| 2011/0145049 A1 | 6/2011 | Hertel et al. |
| 2011/0173053 A1 | 7/2011 | Aaltonen |
| 2011/0173095 A1 | 7/2011 | Kassaei |
| 2011/0178943 A1 | 7/2011 | Motahari et al. |
| 2011/0191801 A1 | 8/2011 | Vytheeswaran |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0239253 A1 | 9/2011 | West et al. |
| 2011/0265116 A1 | 10/2011 | Stern et al. |
| 2011/0276881 A1 | 11/2011 | Keng et al. |
| 2011/0277008 A1 | 11/2011 | Smith |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030363 A1 | 2/2012 | Conrad |
| 2012/0124606 A1 | 5/2012 | Tidwell et al. |
| 2012/0144416 A1 | 6/2012 | Wetzer et al. |
| 2012/0185899 A1 | 7/2012 | Riedl et al. |

(56) References Cited

U.S. PATENT DOCUMENTS

| | | |
|---|---|---|
| 2013/0024891 A1 | 1/2013 | Elend et al. |
| 2013/0046849 A1 | 2/2013 | Wolf et al. |
| 2013/0097647 A1 | 4/2013 | Brooks et al. |
| 2013/0117692 A1 | 5/2013 | Padmanabhan et al. |
| 2013/0311464 A1 | 11/2013 | Nix et al. |
| 2014/0074855 A1 | 3/2014 | Zhao et al. |
| 2014/0201799 A1 | 7/2014 | Smith |
| 2015/0040176 A1 | 2/2015 | Hybertson et al. |

FOREIGN PATENT DOCUMENTS

| | | |
|---|---|---|
| JP | A-2005-519501 | 6/2005 |
| JP | A-2005-339093 | 12/2005 |
| JP | A-2008-015936 | 1/2008 |
| JP | A-2009-211632 | 9/2009 |
| JP | A-2010-502109 | 1/2010 |
| JP | A-2010-079902 | 4/2010 |
| JP | A-2012-505436 | 3/2012 |
| JP | A-2012-523614 | 10/2012 |
| WO | WO 2001/010125 | 2/2001 |
| WO | WO 2001/039505 | 5/2001 |
| WO | WO 2005/015422 | 2/2005 |
| WO | WO 2005/031524 | 4/2005 |
| WO | WO 2007/060451 | 5/2007 |
| WO | WO 2012/021245 | 2/2012 |
| WO | WO-2012114140 A1 | 8/2012 |

OTHER PUBLICATIONS

DLNA Interoperability Guidelines version 1.5 Mar. 2006 pp. 1-23.
OpenCable Specifications—Tuning Resolver Interface Specification—OS-SP-TRIF-I01-080130 Jan. 30, 2008 pp. 1-50.
UTF-32 IBM retrieved from http://publib.boulder.ibm.com/infocenter/iseries/v5r3/index.jsp?topic=%2Fnls%2Frbagsutf32.htm.on Aug. 28, 2013.
Security Assertion Markup language (SAML) Specification (Version 2.0 released in 2005) as SAML Core: S. Cantor et al. Assertions and Protocols for the OASIS Security Assertion Markup Language (SAML) V2.0. OASIS Standard Mar. 2005. Document ID saml-core-2.0-os (http://docs.oasis-open.org/security/saml/v2.0/saml-core-2.0-os.pdf).
SAML Binding: S. Cantor et al. Bindings for the OASIS Security Assertion Markup Language (SAML) V2.0. OASIS Standard Mar. 2005. Document ID saml--bindings-2.0-os (http://docs.oasis-open.org/security/saml/v2.0/saml-bindings-2.0-os.pdf).
"Select a Channel to start watching", Videophiles: Curate your own online video channel with expressive, easy to use tools; © 2014 Redux, Inc. All rights reserved; http://www.redux.com/; 2 pages.
DOCSIS 3.0 Management Features Differences Technical Report CM-TR-MGMTv3 0-DIFF-V01-071228, pp. 1-62.
DOCSIS 3.0 OSSI Configuration Management Technical Report CM-TR-OSSIv3 0-CM-V01-080936 pp. 1-84.
MPEG Headers Quick Reference, http://dvd.sourceforge.net/dvdinfo/mpeghdrs.html, Mar. 6, 2006.
Siebenlist F., et al., "Global Grid Forum Specification Roadmap towards a Secure OGSA," Jul. 2002, pp. 1-22.

\* cited by examiner

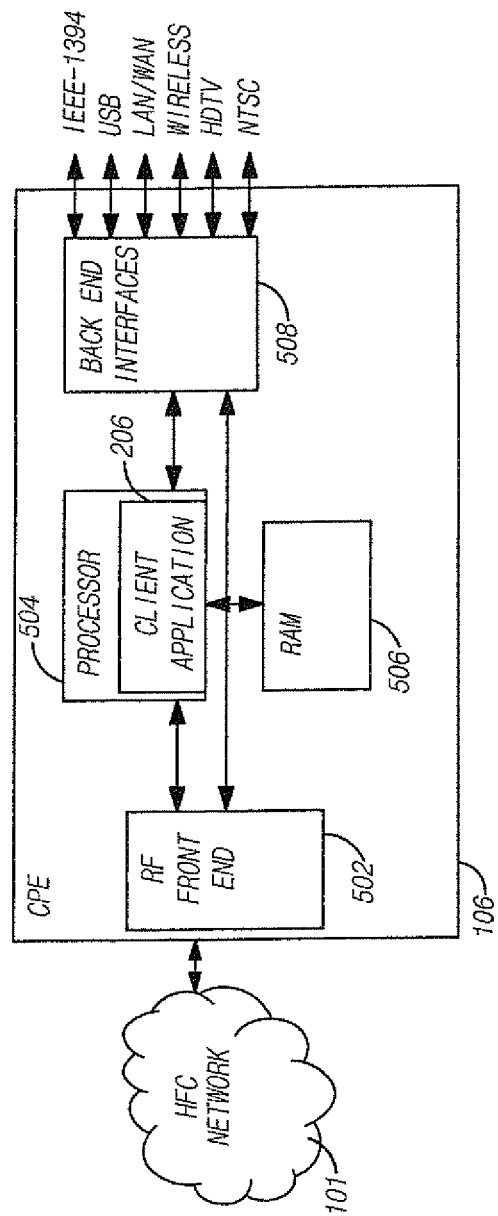

METHODS AND APPARATUS FOR ENABLING MEDIA FUNCTIONALITY IN A CONTENT DELIVERY NETWORK

PRIORITY AND RELATED APPLICATIONS

This application is a continuation of and claims priority to U.S. patent application Ser. No. 12/582,653, published as U.S. Patent Application Publication No. 2011/0090898, and issuing as U.S. Pat. No. 8,396,055 on Mar. 12, 2013, which is incorporated herein by reference in its entirety. This application is related to co-owned and co-pending U.S. application Ser. No. 12/582,619 filed contemporaneously herewith on Oct. 20, 2009 and entitled "Gateway Apparatus and Methods for Digital Content Delivery in a Network", which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content-based networks such as cable or satellite networks. More specifically, the present invention relates in one exemplary aspect to methods and apparatus for delivering programming content along with media applications relating thereto via a cable television or satellite network.

2. Description of Related Technology

The proliferation of the Internet and increased connection technologies such as broadband have contributed to the development of a new media source for information and entertainment. Accordingly, new and interesting opportunities for providing television viewers with advanced features, applications and services arise.

So-called "Interactive TV" or "iTV" includes techniques for allowing viewers to interact with television content. In an iTV paradigm, various levels of interactivity may be provided. For example, low interactivity comprises current technologies for changing channels, increasing or reducing volume, and turning on or off the television content. Moderate interactivity may include services such as on-demand, pay-per-view, etc. where a user may search and select to view particular content. High interactivity may include, for example, providing an audience the ability to affect or interact with the television content. One exemplary embodiment of such high interactivity iTV includes real-time on-screen voting, in which audience votes create decisions that are reflected in how the program continues.

Enhanced TV (ETV) is one example of iTV. ETV is used primarily with respect to two-screen solutions (i.e., TV and PC services). Generally, users of these ETV services have their television and computer in the same room, and navigate their web browser to a particular program-specific website that is synchronized to the live program by the broadcast television network. Alternatively, a computer may have a television tuner card, or a television may offer a web browser. ETV services are currently offered by ABC™, ESPN™ and Jacked.com™ for a number of popular programs such Monday Night Football™, Sunday Night Football™, The Academy Awards™, etc. Similar services are offered for selected programs by other networks.

However, such two screen solutions may only provide supplemental information and/or may not enable a user to effect live programming. Further, the ETV two screen solutions do not present a user with one single unified interface for interaction with content.

Voice communication over Internet protocol (VoIP) networks (as well as IP telephony, voice over broadband (VoBB), and broadband telephony), is a communications service which enables voice, facsimile, and/or voice-messaging applications to be transported via the Internet, rather than the public switched telephone network (PSTN). VoIP requires an analog telephone adapter (ATA) to connect between an IP network (such as a broadband connection) and an existing telephone jack in order to provide service. Alternatively, VoIP may be provided via a dedicated VoIP phone which is connected directly to an IP network (using e.g., WiFi or Ethernet). In another alternative, a softphone may be used for VoIP communications. A softphone refers to software installed on a computer. In any of the above-referenced alternatives, a computer or telephone device is necessary for establishing a connection to the IP network.

Hence, what is needed is a user-friendly mechanism for viewing television content and simultaneously interacting with one or more media features or applications, including interactive television applications. Such methods and apparatus would advantageously be useful in conjunction with one another and be provided via a single user device. Exemplary methods and apparatus may further be useful in providing for the sending and receiving of instant messages, SMS messages, and/or voice messages (including making VoIP telephone calls) from a user's television display.

SUMMARY OF THE INVENTION

The present invention addresses the foregoing needs by providing methods and apparatus for enabling media applications in an enhanced network In a first aspect of the invention, a method of operating a content based network so as to provide a substantially unified user interface environment for a plurality of different applications and services is disclosed. In one embodiment, the method comprises providing a plurality of media applications; rendering user interfaces associated with the plurality of applications on a user premises display device via communication between user premises equipment and a network servlet associated with the plurality of applications; receiving requests for the services from the user premises equipment; and in response to the requests, providing services associated with the applications to a user of the premises equipment via the user interfaces.

In a second aspect of the invention, content-based network architecture for providing interactive media applications to a plurality of user devices is disclosed. In one embodiment, the architecture comprises a server entity disposed at a headend of the network, the server entity running at least one proxy application; a plurality of interactive media applications; and a plurality of user devices, the user devices in communication with the server entity via the network and each running at least a client application for displaying individual ones of the plurality of interactive media applications. In one variant, the client application is adapted to enable the interaction and the display of one or more of said plurality of interactive media applications via communication with the proxy application.

In a third aspect of the invention, a proxy server apparatus for use in a content-based network is disclosed. In one embodiment, the apparatus comprises a first interface configured to communicate with a plurality of client devices via the network; a second interface configured to communicate with a plurality of media applications disposed on one or more devices of the network; and a processor configured to run at least one computer program thereon. In one variant, the computer program is adapted to receive a request from one of the plurality of client devices to access one of the plurality of media applications; determine whether the requested media application is compatible with the requesting client device; if the requested media application is compatible with the requesting client device, refer the client device to the requested application for substantially direct communication therebetween; and if the requested media application is not compatible with the requesting client device, facilitate communication therebetween via at least one proxy process.

In a fourth aspect of the invention, a client premises equipment (CPE) for use in a content based network comprising a plurality of media applications is disclosed. In one embodiment, the CPE comprises a network interface receiving a plurality of content for display; a display device displaying the plurality of content; and a processor. In one variant, the processor has at least one software process running thereon configured to request access to at least one of the plurality of media applications; receive one or more pages associated with the at least one media application; and direct the display device to display the one or more pages simultaneously with the display of the content.

In a fifth aspect of the invention, a method of enabling communication between a client device of a cable television network and an interactive media application disposed at a headend of the network is given. In one embodiment, the method comprises receiving a request from the client device to access the interactive media application; determining one or more capabilities of the client device; and determining whether the interactive media application is compatible with the one or more capabilities of the client device. If the interactive media application utilizes a content format which is also used by the client device, sending the client device information enabling the client device to communicate directly to the interactive media application; and if the interactive media application utilizes a content format which is not also used by said client device, translating communications between a format used by the interactive media application and a format used by the client device.

In a sixth aspect of the invention a computer readable apparatus is given. In one embodiment, the apparatus comprises a medium with a plurality of computer instructions disposed thereon which, when executed, enables communication between a client application and a network servlet.

In a seventh aspect of the invention a method of doing business is given. In one embodiment, the method comprises providing one or more media applications to subscribers at a premium. In another embodiment, the method comprises generating revenue from an entity based on at least interaction between a user and one or more applications.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 5 is a functional block diagram illustrating one embodiment of a CPE for use in the architecture of FIG. 2.

DETAILED DESCRIPTION OF THE INVENTION

Figure 1:
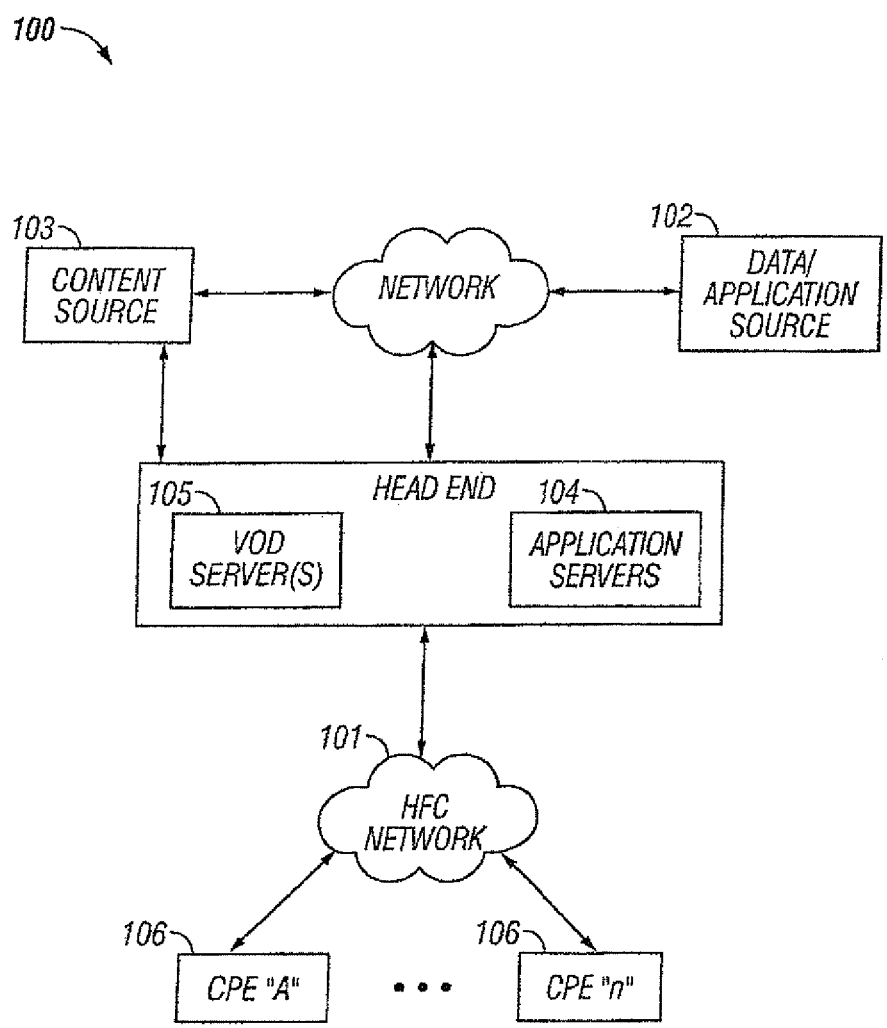
FIG. 1 is a functional block diagram illustrating an exemplary HFC cable network configuration useful with the present invention.

Reference is now made to the drawings, wherein like numerals refer to like parts throughout.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. Multiple regional headends may be in the same or different cities.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "media feature" and "media application" refers without limitation to any application or service which delivers or transmits one or more types of media such as voice, video, audio, SMS/text, data files, or other data types to or from a user.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay. 3GPP, 3GPP2, WAP, SIP, UDP, FTP, RTP/RTCP, H.323, etc.).

As used herein, the term "network entity" refers to any network entity (whether software, firmware, and/or hardware based) adapted to perform one or more specific purposes. For example, a network entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or out-of band, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "on-demand" or "OD" is meant to include any service that enables real, quasi-real time (e.g. "trick" mode delivery) or even non-real time delivery of content such as audio and/or video programs at any resolution, or data. Such content may be, for example, stored or temporarily cached on a server, or streamed directly from a source, and may be in response to a user-initiated event, service profile or configuration, headend event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the terms "Session Initiation Protocol" and "SIP" refer without limitation to the Session Initiation Protocol described in RFC 3261 entitled "SIP: Session Initiation Protocol" dated June 2002, incorporated herein by reference in its entirety. SIP may also utilize other protocols, such as the Session Description Protocol (SDP) described in RFC 4566 entitled "SDP: Session Description Protocol" dated July 2006, incorporated herein by reference in its entirety.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n.

Overview

In one salient aspect, the present invention discloses methods and apparatus for providing interactive media features or applications in a communications network (such as a cable or satellite network). In one embodiment, the invention provides a solution for integrating all IP based services offered by a network operator (e.g., cable or satellite MSO) into a user's premises media delivery equipment (e.g., Home Video Service System). This integrated premises media delivery system and environment advantageously enhances the user's convenience and experience in interacting with a variety of different applications such as VoIP phone service, instant messaging service(s), email, calendaring or scheduling services, search engines, address books or other information repositories, etc. This capability is enabled in part by leveraging new and now ubiquitous "wide screen" televisions and premises broadband capability, as well as wireless capabilities on portable devices.

In one particular implementation of the invention, various of the foregoing interactive "media" applications are disposed at one or more headend entities; also provided is a servlet application which facilitates communication between the various applications and one or more client applications resident on the user's premises system. In this manner, a user at his/her premises or client device, may access and interact with various ones of the applications in an integrated fashion.

In another implementation, individual ones of the interactive applications are in communication with an internet host server in order to obtain data therefrom via a gateway device located at e.g., the headend of the network. In other words, the gateway device requests and receives internet data and/or content from the host servers on behalf of the media application(s). The data and/or content is then processed as required and, via the servlet, delivered to one or more client devices. For example, the content may be de-encapsulated from a first container format, and re-encapsulated into a second format for delivery to the client device. The content may also optionally be transcoded and/or transrated if desired.

The servlet application, in one variant, serves as a proxy for various ones of the applications which utilize a different content format than the client device. The servlet application will refer the client device (such as by the SIP REFER method) to a media application which utilizes the same content format as the client device. For example, if the media application provides standard HTTP APIs, then the client device may communicate directly therewith.

In another embodiment, one or more of the interactive media applications is configured to utilize the Enhanced TV Binary Interchange Format (EBIF). Further, the client application running on the client device(s) may comprise an EBIF user agent. The user agent enables a user of the client device to view and interact with various EBIF pages of the particular media application(s) of interest.

One of the exemplary interactive media applications is a search application, which enables a user to search the internet for data relating to displayed program or advertising content. For example, the user may use the search application simultaneous with the playing of a commercial for a restaurant to find the nearest location and/or directions, or other information about the restaurant (such as reviews, Zagat™ rating, etc.).

Another media application useful in various embodiments of the present invention is a real-time web-based micro-blogging application, which enables a user to post, view and navigate micro-blogs from the user's CPE (e.g., set top box or converged media device) simultaneously with viewing programming and advertising content.

Yet another media application useful with the invention is a so-called "request for information" or RFI application. In one embodiment, the RFI application enables the user to select to receive additional information about a product or service, such as via a "telescoping" function.

Methods for utilization, and a business rules engine for directing the use of the each of the aforementioned applications, are also described.

DETAILED DESCRIPTION OF EXEMPLARY EMBODIMENTS

Exemplary embodiments of the apparatus and methods of the present invention are now described in detail. While these exemplary embodiments are described in the context of a hybrid fiber coax (HFC) cable architecture having an multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Bearer Network Architecture—

FIG. 1 illustrates a typical content-based network configuration with which the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
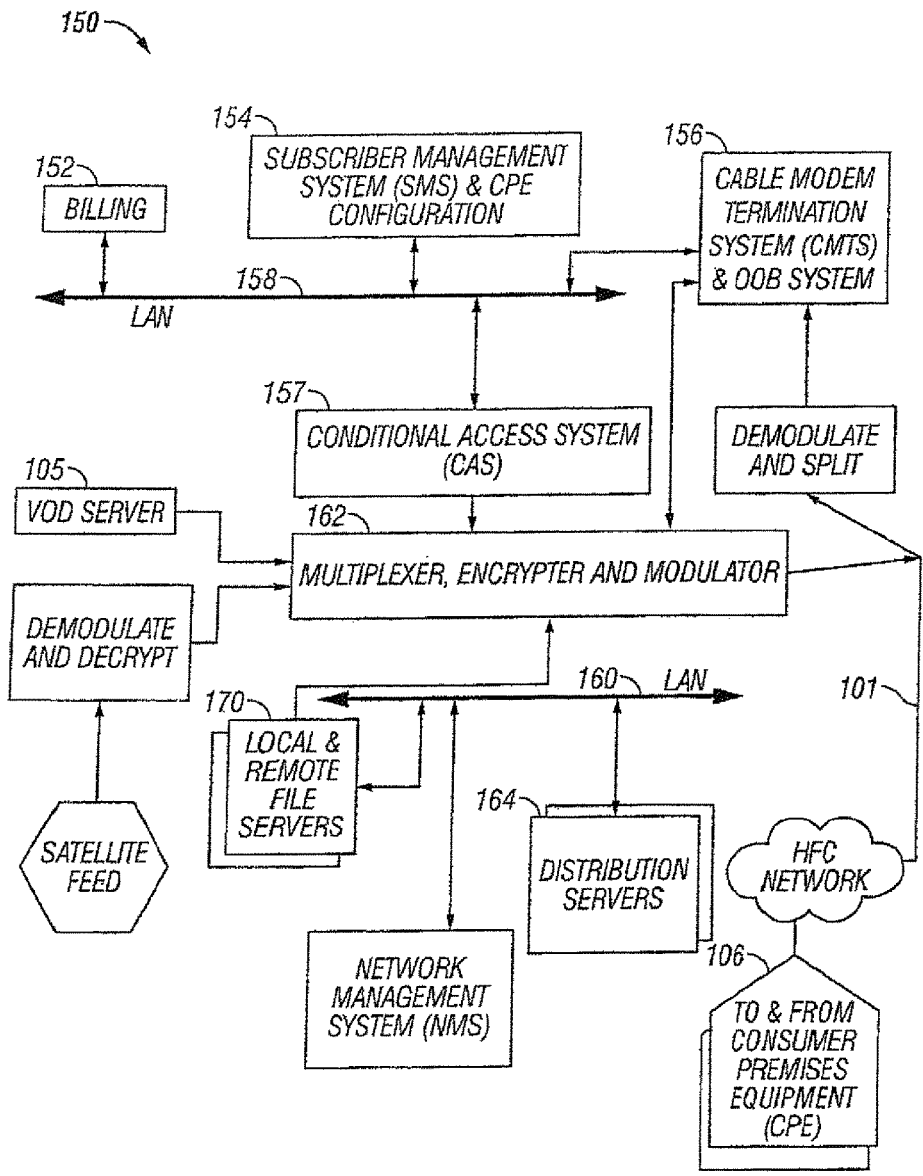
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
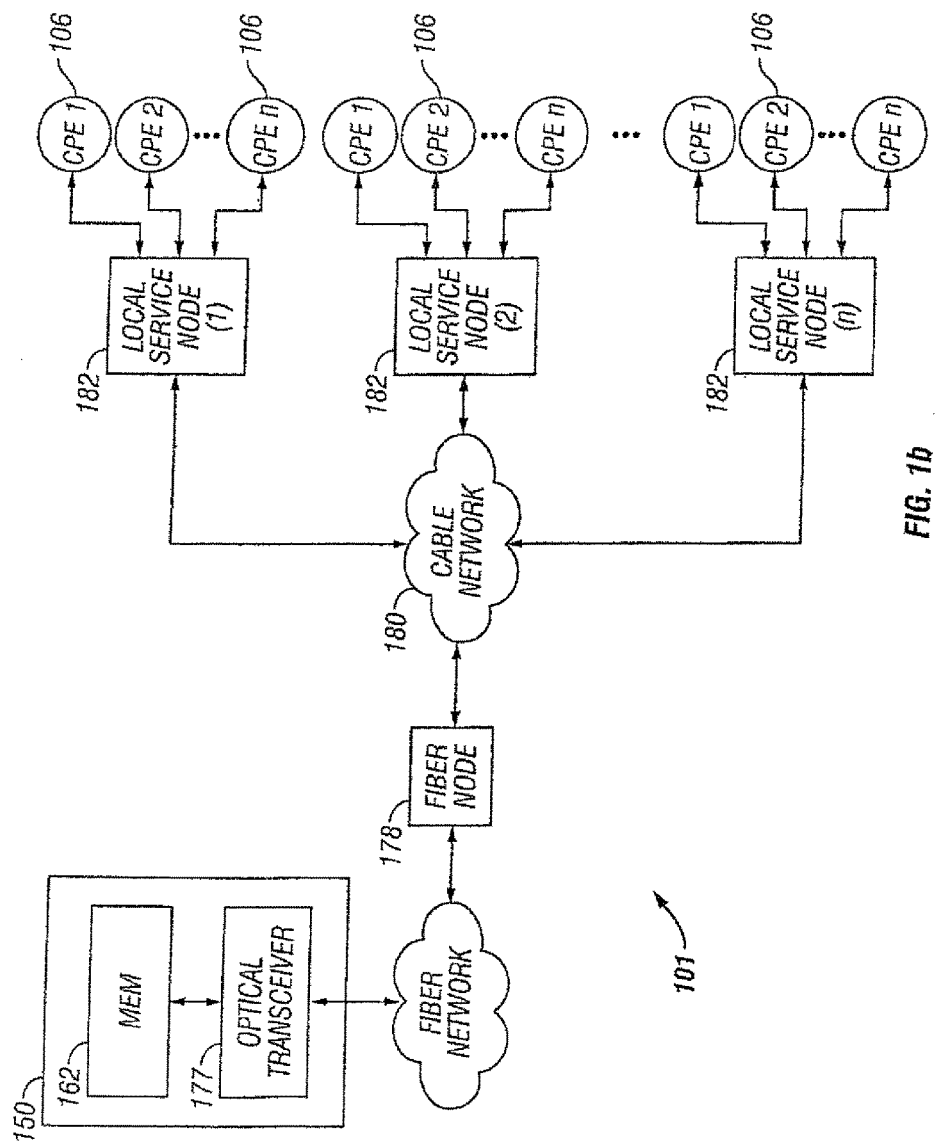
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
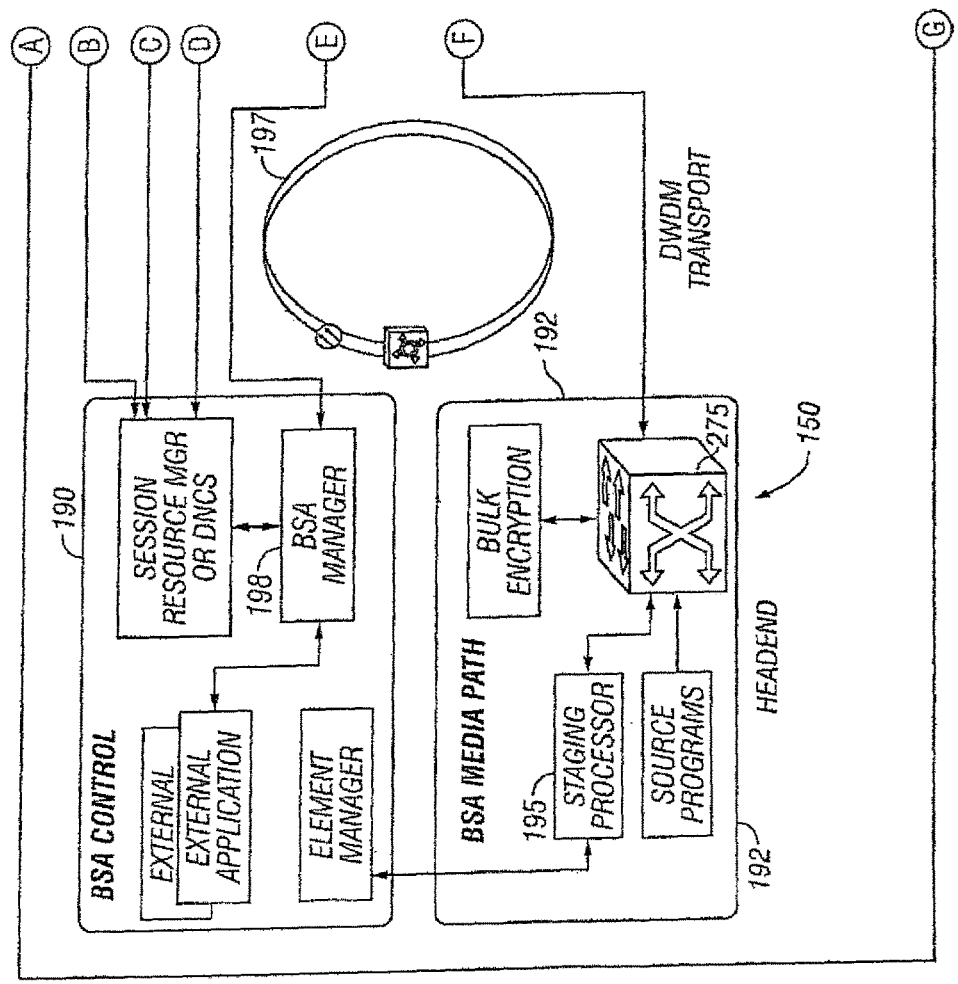
FIG. 1c is a functional block diagram illustrating one exemplary broadcast switched architecture (BSA) network useful with the present invention.
Figure 1C:
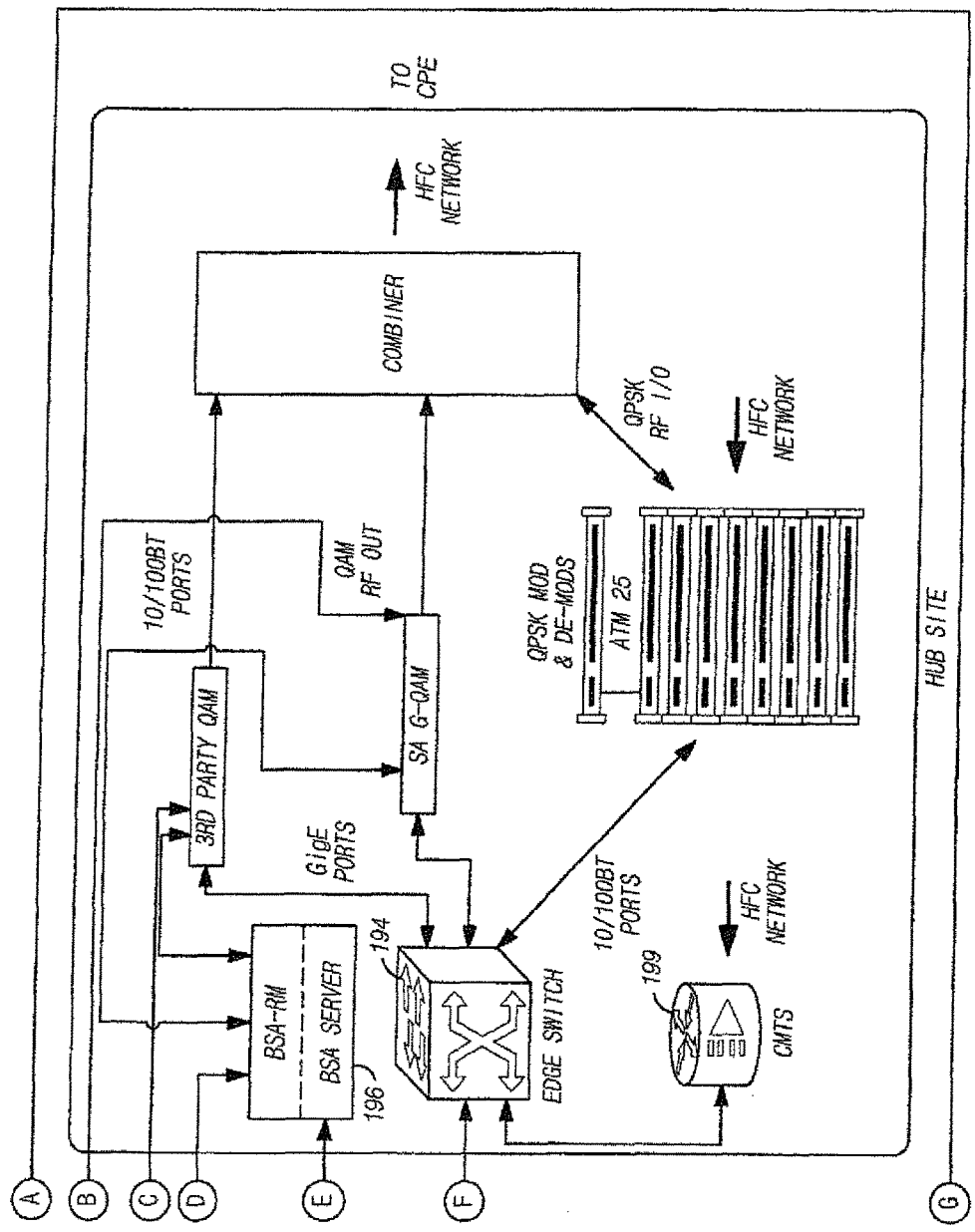

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048, 334, entitled "APPARATUS AND METHODS FOR MULTI-STAGE MULTIPLEXING IN A NETWORK", now issued as U.S. Pat. No. 7,602,820, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1c illustrates exemplary switched network architecture also useful with the present invention. While a so-called "broadcast switched architecture" or BSA network is described as the content delivery mechanism in one embodiment of the invention, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VoD) systems, BSA programs are streamed to a service group (contrast: switch) only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler than VoD. Commercials or other programming segments cannot be skipped, and program bitrates can be treated as in more conventional systems.

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VoD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In one exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1a and 1c also deliver Internet data or content (such as IPTV content) services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG-2. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device (CPE 106) for viewing on the television, and also as packetized IP data over the DOCSIS QAMs to the user's PC or other IP-enabled device via the user's cable modem. Alternatively, in-band delivery over one or more QAMs via a transport stream (MPTS) using MPEG-2 encapsulation of H.264 or other encoded data may be used consistent with the invention; see e.g., the exemplary methods and apparatus described in co-owned and co-pending U.S. application Ser. No. 12/582,619 filed Oct. 20, 2009 and entitled "Gateway Apparatus and Methods for Digital Content Delivery in a Network", previously incorporated herein.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement, and in fact such "in band" delivery may be readily used consistent with the present invention as well. The CPE 106 are each configured to monitor the particular assigned RF channel (such as via a port or socket ID/address, or other such mechanism) for IP packets intended for the subscriber premises/address that they serve.

Network Architecture—

Figure 2:
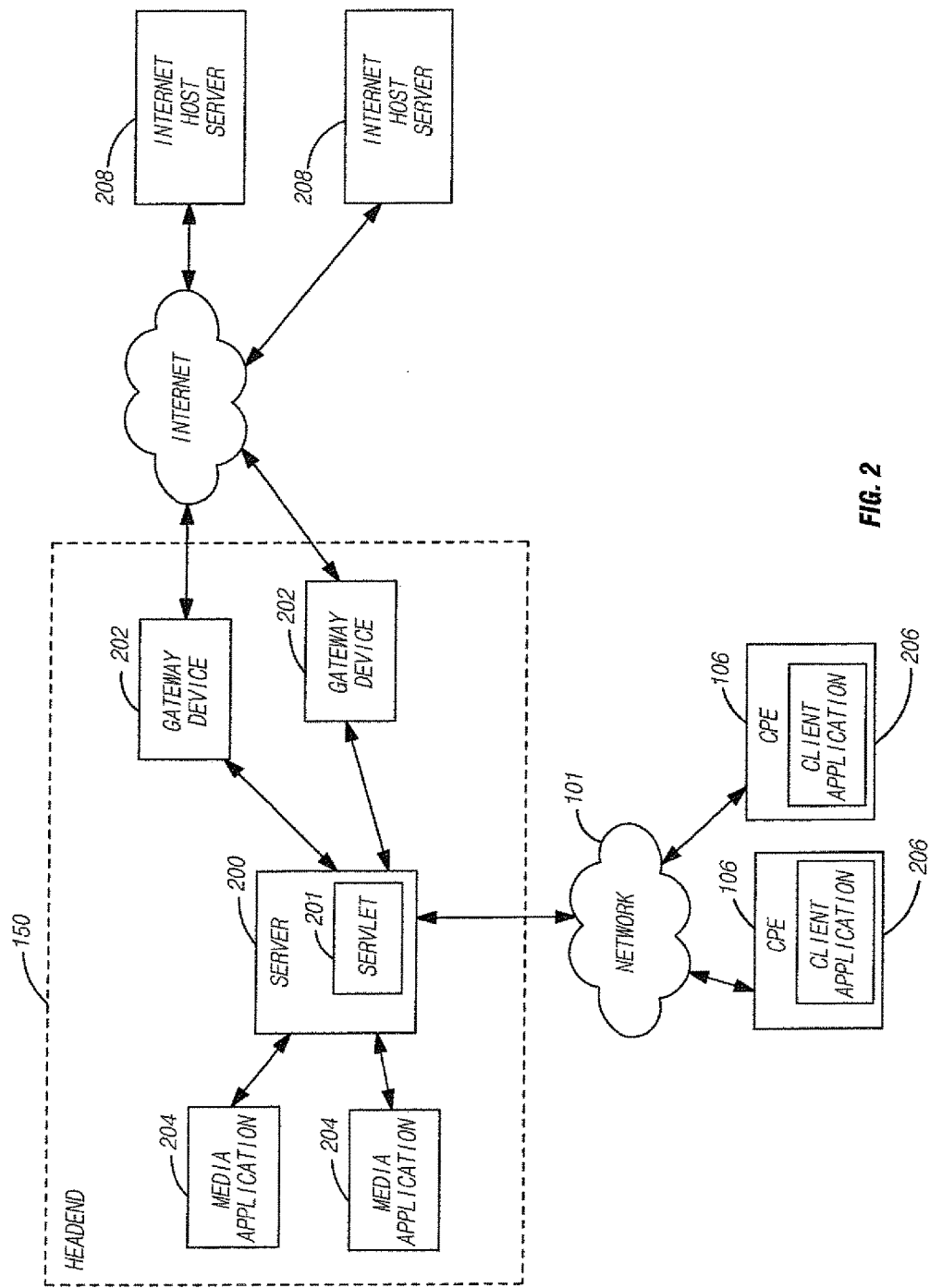
FIG. 2 is a functional block diagram illustrating one embodiment of a network architecture useful with the present invention.

FIG. 2 illustrates one embodiment of a network architecture utilized for providing enhanced media features and applications according to the present invention.

As shown, the network comprises a Java servlet 201 running on a server entity 200 located at the headend 150 of a network. The servlet 201 is in communication with several CPE 106 via an HFC network 101. The servlet 201, in one embodiment, acts as a proxy for communication between the CPE 106 and various media applications 204 also located at or in communication with the headend 150. Users associated with the CPE 106 may access the media features and applications 204 using client software applications 206 running on the CPE 106 (discussed below). The CPE 106 and server 200 communicate via the HFC network 101 either via an out-of-band upstream RF channel, an upstream DOCSIS channel, or a separate transport such as a wireless or other IP network (not shown). Exemplary media applications 204 will be discussed in greater detail below.

The media applications 204 in one embodiment comprise applications utilizing the Enhanced TV Binary Interchange Format (EBIF), the latter as described in CableLabs OpenCable Application Platform (OCAP) publication entitled "Enhanced TV Binary Interchange Format 1.0" OC-SP-ETV-BIF1.0-I04-070921, issued Sep. 21, 2007, which is incorporated herein by reference in its entirety. The EBIF content format, inter alia, defines an optimized collection of "widget" and byte code specifications for pages within a media application 204, similar to web pages, but specialized for use within an enhanced television or interactive television system. It is via the EBIF content format in the present embodiment that the media applications 204 may comprise viewable and "inter-actable" pages, although it will be appreciated that other formats and protocols may be used consistent with the invention.

EBIF is a binary application format that is device and network independent and provides a portable application to ITV applications. EBIF applications package all the graphic directives to render the application on a client device as well as lightweight run-time byte code event driven procedures that can be processed on the user agent on client device to enable interactive applications. EBIF can be considered equivalent to HTML/Javascript pages on the internet except in binary form.

The server 200 is, in the illustrated embodiment, also adapted to directly or indirectly communicate with a gateway device 202. The gateway device 202 is in communication with several internet host servers 208 via an internet (such as e.g., the Internet). The host servers 208 store internet data and content which, as will be discussed in greater detail below, is delivered from the host server 208 to the gateway device 202, and utilized by the media applications 204. Specifically, the host servers 208 provide necessary internet data and content to the media applications 204 in order to accomplish the aforementioned user viewing and interaction capabilities. In other words, a CPE 106 running a client application 206 provides a substantially unified environment by which as user may access any one of the media applications 204, the latter which, via the gateway device 202, access internet content and data for use in providing the function of the specific media application 204.

In the illustrated embodiment, the servlet 200 comprises computer software run the server entity 200 of the network headend 150. The server entity 200 may comprise an Open-Cable-compliant network server or controller module adapted for use at the headend or hub site(s) of FIGS. 1-1c, although the server may comprise other types of devices (e.g., VoD or application servers, SRM or other supervisory processes, etc.) within the network as previously described.

The server 200 may take any number of physical forms, comprising for example one of a plurality of discrete modules or cards within a larger network headend, edge or hub device of the type well known in the art. The server 200 may also comprise firmware, either alone or in combination with other hardware/software components such as those previously described. Alternatively, the server 200 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The server 200 may also be integrated with other types of components (such as satellite transceivers, encoders/decoders, etc.) and form factors if desired.

Moreover, different cable or satellite system headends may share components between them, and/or have multiple ones of components installed for e.g., redundancy/failover protection, different tasking or service, etc.

It is appreciated that various subsystems and components shown in FIG. 2 can be combined with others, or functions performed thereby distributed across different functional (e.g., hardware or software) entities already within the content delivery network.

In one embodiment, communication between the client application 206 of the CPE 106 and the applications 204 running of the headend 150 via the servlet proxy 200 running on the server 200 utilize an OOB modem and/or a QAM modulator and QAM channels. It is further appreciated that, however, that communication between the various entities of the present invention may be accomplished via literally any communications channels, the aforementioned being merely exemplary in nature.

It can also be appreciated that the present invention may be practiced using any configuration or combination of hardware, firmware, or software, and may be disposed within one or any number of different physical or logical entities. For example, the functionalities associated with the various media applications 204 (described in detail below) may take the form of one or more computer programs (e.g., "stand-alone" network and client processes). Alternatively, such computer programs may have one or more components distributed across various hardware environments at the same or different locations, such as where a network process is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

Server and Servlet—

Figure 3:
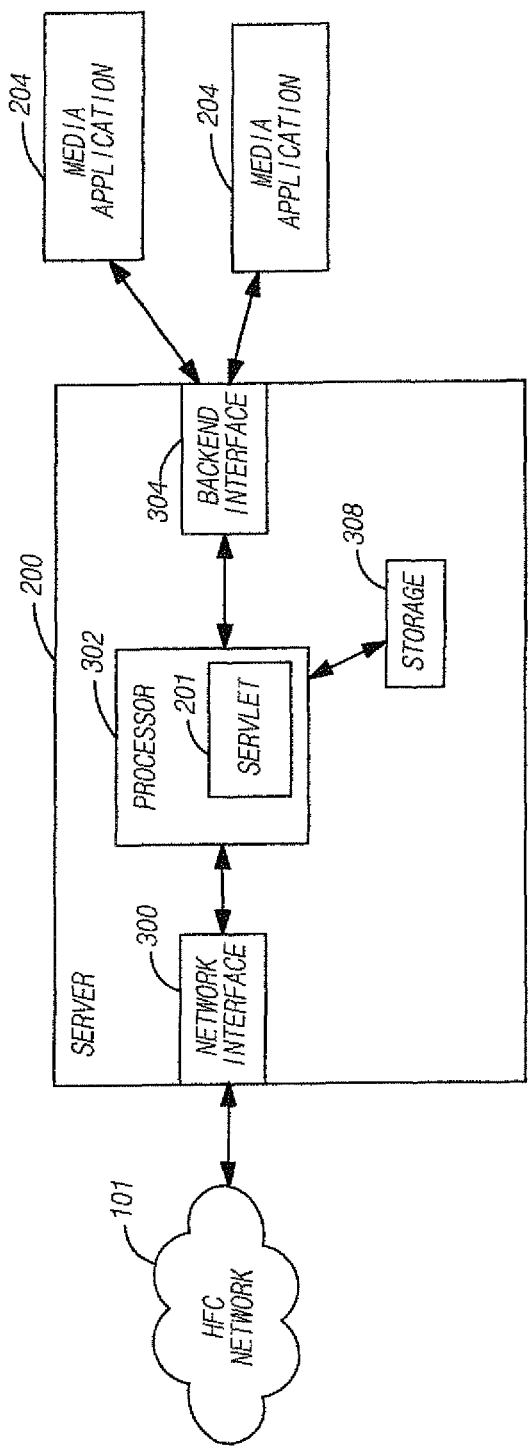
FIG. 3 is a functional block diagram illustrating one embodiment of a servlet for use in the architecture of FIG. 2.

Referring now to FIG. 3, one embodiment of the server 200 shown in FIG. 2 is illustrated and described. As shown in FIG. 3, the server 200 comprises a digital processor(s) 302 and associated storage 308, a network interface 300 for interfacing with the HFC network 101 and one or more "back end" interfaces 304 capable of interfacing with the various media applications 204 of the network or a third party.

In one embodiment, the network interface 300 and/or the back-end interface(s) 304 comprise a plurality of interfaces for use with other network apparatus such as RF combiners, IP routers and other packet network devices, network management and provisioning systems, local PCs, etc. In other variants, the interfaces 300, 304 may comprise e.g., an IEEE-1394 interface, a USB interface, a LAN interface, an ASI/GBE interface, etc., depending upon the particular implementation.

Other components which may be utilized within the server 200 include amplifiers, board level electronic components, as well as media processors and other specialized SoC or ASIC devices. Support for various processing layers and protocols (e.g., 802.3, DOCSIS MAC, OOB channels. DHCP, SNMP, H.323/RTP/RTCP, VoIP, SIP, etc.) may also be provided as required, such as in support of data and "rules" interchange between the server 200 and one or more of the media applications 204 and/or CPE 106 (discussed below).

Figure 3A:
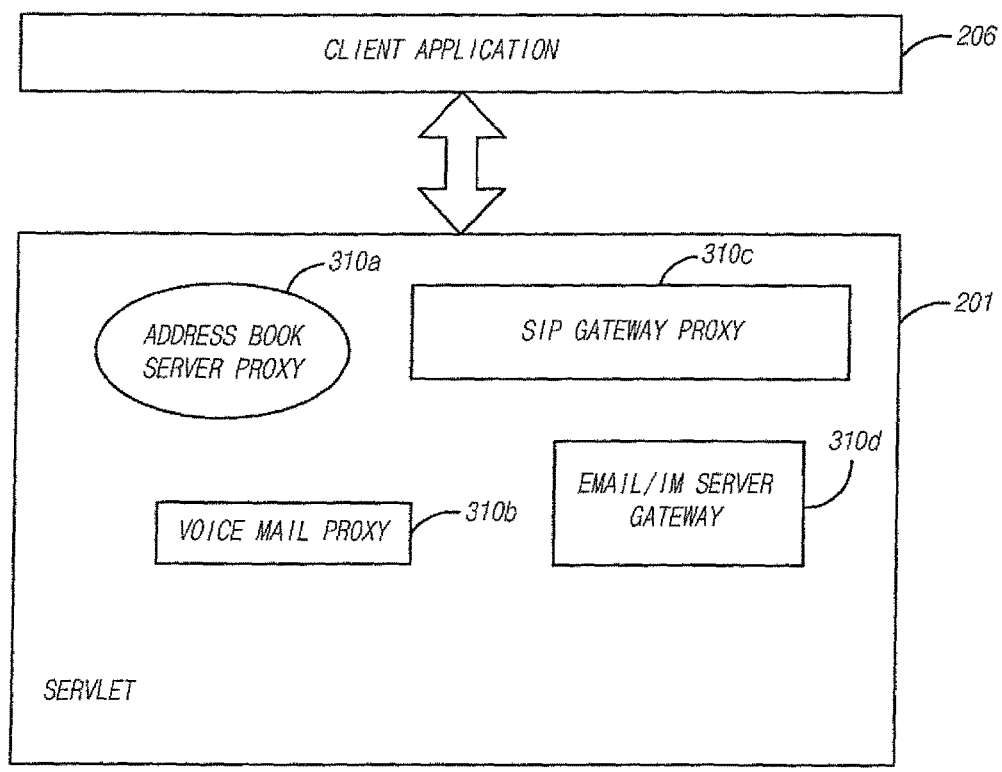
FIG. 3a is a functional block diagram illustrating interaction between the servlet of FIG. 3 and a CPE.

As illustrated in FIG. 3, the server 200 runs at least a servlet 201. In one embodiment, the servlet 201 is one or more Java programming language objects that dynamically process requests and construct responses. In one specific implementation (see FIG. 3a), the servlet 201 acts as a proxy between the CPE 106 and various ones of the media applications 204 which utilize a content format that is not readable and/or useable by the CPE 106. In the illustrated example, the servlet 201 comprises an "Address Book" proxy 310a, a "Voice Mail" proxy 310b, a "SIP Gateway" proxy 310c and an "Email/IM Server Gateway" (or "SMS Gateway") proxy 310d. However, it will be appreciated that the servlet 201 may comprise a proxy to any number and/or type of media applications 204, the above being merely illustrative of the broader principles. Exemplary backend servlet "Address Book" and "SIP Gateway" interfaces are described at Appendices I and II, respectively. An exemplary client to "SMS Gateway" is given at Appendix III.

Figure 3B:
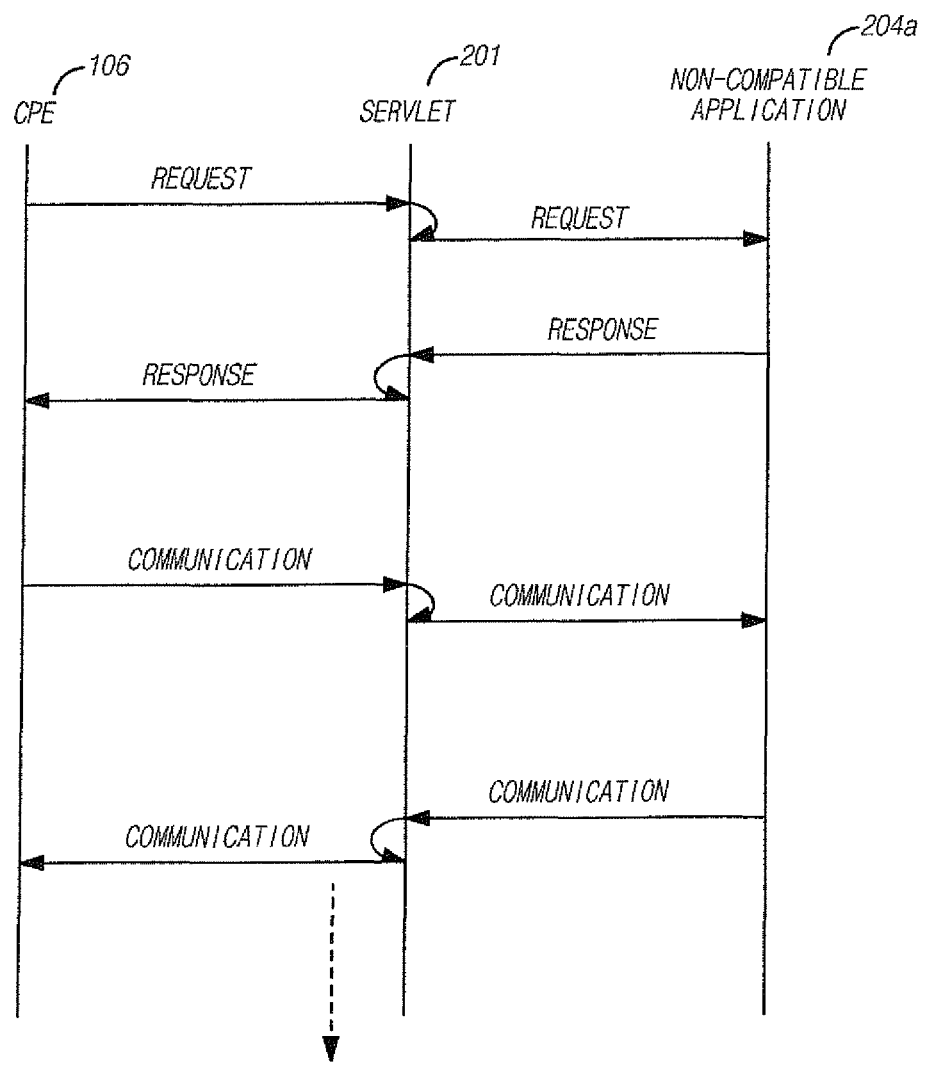
FIG. 3b is a functional block diagram illustrating communication between the CPE, servlet and at least one non-compatible media application.

According to the illustrated embodiment, the servlet 201 enables communication between the CPE 106 (client application 206) and the media application 204 by converting messages between the two formats. Exemplary communication between the CPE 106 and a non-compatible media application 204a via the servlet 201 is illustrated in the ladder diagram of FIG. 3b. As shown, the CPE 106 requests access to a non-compatible media application 204a. The servlet 201 converts the request to a suitable format for transmission to the target application 204a. The application 204a responds back to the servlet 201, which converts and transmits the response to the CPE 106 in the appropriate format. Subsequent communication between the client application 206 running on the CPE 106 and the non-compatible media application 204a utilizes the servlet 201 for format conversion. Hence, in this capacity, the servlet acts as a protocol translator of sorts between heterogeneous entities on the network which might not otherwise communicate.

For example, a user may, via the client application 206 running on the user's CPE 106, request access to an email application which returns content in e.g., XML format. Assume for the purposes of this example that the request is sent in e.g., EBIF format, and that the CPE 106 is unable to decode XML content. The servlet 201 translates the CPE 106 request from EBIF to XML, and sends the request on to the email application. The email application can then respond, and communication can be facilitated between the EBIF client application 206 and the XML email application via the servlet 201. An exemplary communication is as follows:

```
<?xml version="1.0" encoding="UTF-8"?>
<data        xmlns:xsi="http://www.w3.org/2001/
   XMLSchema-instance"
   xsi:
      noNamespaceSchemaLocation="incomingmail.xsd">
   <incomingmail>
      <row time="10000">
         <sender>scottland612</sender>
         <subject>hello</subject>
      </row>
      <row time="30000">
         <sender>scottland2</sender>
         <subject>hello</subject>
      </row>
   </incomingmail>
</data>
```

Figure 3C:
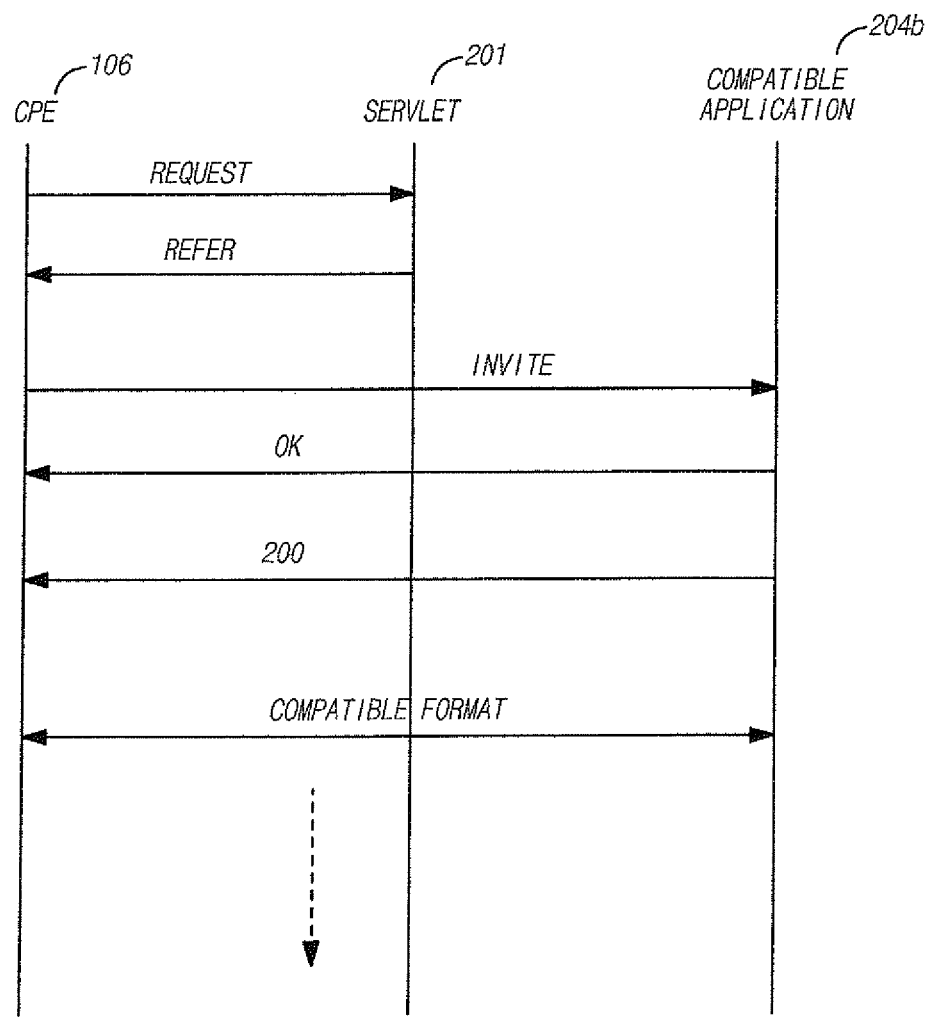
FIG. 3c is a functional block diagram illustrating communication between the CPE, servlet and at least one compatible media application.
Figure 3D:
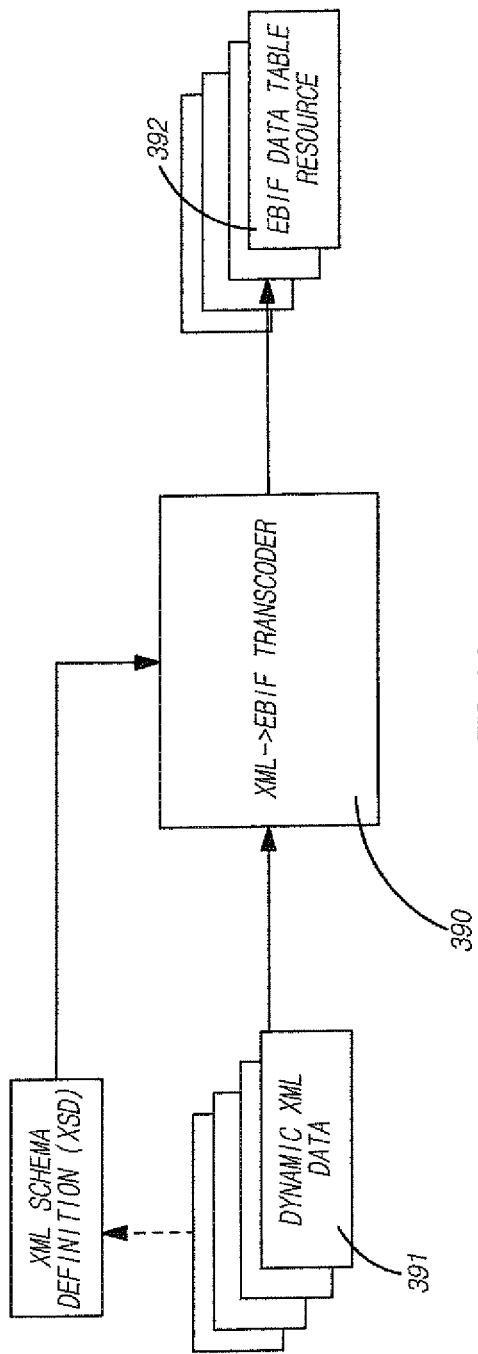
FIG. 3d is a functional block diagram illustrating one embodiment of transcoding mechanisms for use within the present invention.

The XML data that is returned as part of the response for a request to a web service by the CPE is transcoded to EBIF data by an intermediate web application 390 as illustrated in FIG. 3d. As shown, a transcoded component is provided with a XML schema definition based on which it can take the input XML data 391 and convert into binary data tables 392, as per the previously incorporated EBIF specification. The binary data can then be easily processed by the EBIF user agent on the CPE 106. The XML data returned back provides a reference to the XML schema definition.

For those media applications 204 which utilize a content format which is compliant with the CPE 106, the servlet 201 does not act as a proxy, but instead redirects the CPE 106 to communicate directly with the application 204. Communication between a compatible media application 204b and the CPE 106 (client application 206) is illustrated in FIG. 3c in the context of an exemplary SIP (Session Initiation Protocol) session. As shown, the CPE 106 requests access to a compatible media application 204b. The servlet 201 responds by sending a SIP REFER message back to the CPE 106. The REFER message indicates to the CPE 106 that it may directly contact the compatible application 204b, and in some instances provides information useful in assisting the CPE 106 in doing so, such as address information of the application 204b, device capabilities, etc. The CPE 106 may then send an INVITE message to the compatible application 206. The compatible application 206 and the CPE 106 share the same content/messaging format, hence are able to communicate directly. Accordingly, the INVITE message is received and understood, and an acknowledgement or approval message is returned ("OK") as well as a connection success message ("200"). If there is a problem with the communication a failure message may be returned instead. Once successful communication is established, the client application 206 running on the CPE 106 and the compatible application 204b may continue to communicate utilizing the compatible format, with the servlet (proxy) being removed from the process.

Incoming email or instant messages are delivered as triggers to the user device. Exemplary trigger are disclosed in previously referenced OCAP publication entitled "Enhanced TV Binary Interchange Format 1.0" OC-SP-ETV-BIF1.0-I04-070921, issued Sep. 21, 2007, and incorporated herein by reference in its entirety. A data resource is packaged in the trigger payload. In one embodiment, the triggers may comprise IP triggers delivered through IP OOB channel.

As one example of the foregoing process, a user may, via the client application 206 running on the user's CPE 106, request access to a SIP-based application (e.g., VoIP or the like). Messaging using HTTP protocol is mapped into the SIP protocol, which is implemented in the SIP application, which advantageously makes the SIP processes transparent to the user. Thus, if the CPE 106 request is sent using HTTP protocol and the CPE 106 is capable of decoding HTTP messages, communication between the SIP application and CPE 106 may occur directly between these entities, and requires no proxy device (e.g., servlet 201). Accordingly, if the request is made to the servlet 201, the servlet 201 simply refers the CPE 106 to the SIP application, and allows these other entities to communicate. While the SIP communications could be passed via the servlet proxy if desired, this approach is generally much less efficient (both in terms of bandwidth and processing overhead required) than direct communication. Such indirect or proxied communication may be useful, however, where there is no direct communication path between the media (SIP) application and the client, such as where an equipment failure has occurred, or that communication channel is bandwidth-constrained. The proxied communication may also be utilized where the CPE is on a private network and does not have a direct connection with the SIP application and/or for other reasons such as security-authentication, optimize bandwidth usage by light-weight messaging between CPE and proxy, etc.

Gateway Device—

Figure 4:
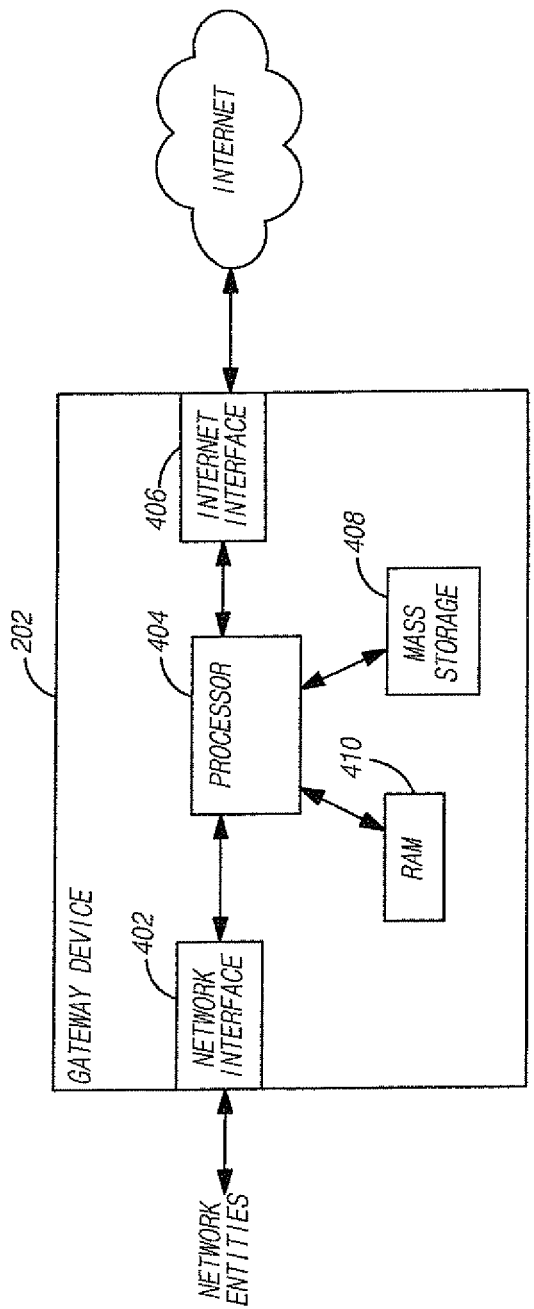
FIG. 4 is a functional block diagram illustrating an exemplary gateway device for use in the architecture of FIG. 2.

An exemplary embodiment of the gateway device 202 of FIG. 2 is illustrated and described with respect to FIG. 4. As shown, the gateway device 202 comprises a digital processor(s) 404 and associated RAM 410, a storage device 408, a network interface 402 for interfacing with other devices of the HFC network 101 (such as e.g., the server 200) and an internetworking interface 406 capable of interfacing with other devices via an internet (such as e.g., the Internet). As noted above, the network interface 402 may comprise components for use with other network apparatus such as RF combiners, IP routers and other packet network devices, network management and provisioning systems, local PCs, etc. The back-end or internetworking interface 406 of the gateway device 202 may comprise e.g., an IEEE-1394 interface, a USB interface, a LAN interface (e.g., IEEE Std. 802.3), an ASI/GBE interface, etc., depending on the particular implementation.

In one embodiment, the gateway device 202 may be of the type described in co-owned, co-pending U.S. application Ser. No. 12/582,619 filed Oct. 20, 2009 and entitled "Gateway Apparatus and Methods for Digital Content Delivery in a Network", previously incorporated herein by reference in its entirety. As discussed therein, the gateway device may be configured to de-multiplex or de-encapsulate internet, content and re-encapsulate or re-multiplex the content into an appropriate encapsulation formation for the receiving CPE 106. The gateway device may be further configured to de-encode internet content, and re-encode the content into a format compatible with the receiving device (e.g., H.264 to MPEG-2 or RealPlayer).

The processor 404 of the gateway device 202 of the illustrated embodiment is further configured to run at least software which, when executed, enables the gateway device 202 to communicate with the various internet host servers 208. These components and communication functions are readily implemented by those of ordinary skill in the cable and embedded system fields, and accordingly not described further herein.

The processor 404 further comprises computer software which enables the device 202 to interact and communicate with one or more media applications 204 located at a network headend 150. Communication between the device 202 and applications 204 may proceed via a servlet 201 proxy (running on a server 200). Data and content obtained from the internet host servers 208 may thereby be transmitted to the applications 204. In one embodiment, the media applications comprise EBIF-enabled applications (as discussed previously herein). Data and received from the internet host servers 208 via the gateway device 202 may be rendered in any number of formats. Hence, the received data and/or content may be converted at e.g., the server 200, to a format compatible with the applications 204 if necessary. In an alternative embodiment, the gateway device 202 may convert the content to EBIF-based content (such as in the embodiment described in previously referenced U.S. application Ser. No. 12/582,619 filed Oct. 20, 2009 and entitled "Gateway Apparatus and Methods for Digital Content Delivery in a Network".

CPE—

Referring now to FIG. 5, an exemplary embodiment of an improved CPE 106 according to the present invention is illustrated. As shown in the simplified diagram of FIG. 5, the device 106 generally comprises and OpenCable (OCAP)-compliant embedded system having an RF front end 502 (including tuner and demodulator/decryptors) for interface with the HFC network 101 of FIGS. 1-1c, digital processor(s) 504, storage device 506, and a plurality of interfaces 508 (e.g., video/audio interfaces, IEEE-1394 "FireWire", USB, serial/parallel ports, etc.) for interface with other end-user apparatus such as televisions, personal electronics, computers, Wi-Fi or other network hubs/routers, etc. Other components which may be utilized within the device (deleted from FIG. 5 for simplicity) include various processing layers (e.g., DOCSIS MAC or DAVIC OOB channel, MPEG, etc.), as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 5 is also provided with an OCAP 1.0-compliant application and Java-based middleware which, inter alia, manages the operation of the device and applications running thereon. It will be recognized by those of ordinary skill that myriad different device and software architectures may be used consistent with the functions of the present invention, the device of FIG. 5 being merely exemplary. For example, different middleware (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. These functions may also be integrated with the aforementioned client application 206 if desired.

In the illustrated embodiment, the digital processor 504 is adapted to run at least one client application 206. The client application 206 enables a user to request to access individual ones of the media applications 204 available at the network headend 150, including interaction with the application 204 (such as e.g., searching/browsing internet content, requesting internet content, communicating in real-time with other users, etc.). In another embodiment, the client application 206 is further utilized in streaming requested internet data and/or content to the user for viewing on the CPE 106 or an associated display device (or for storage to a premises recording device such as a DVR).

Figure 5A:
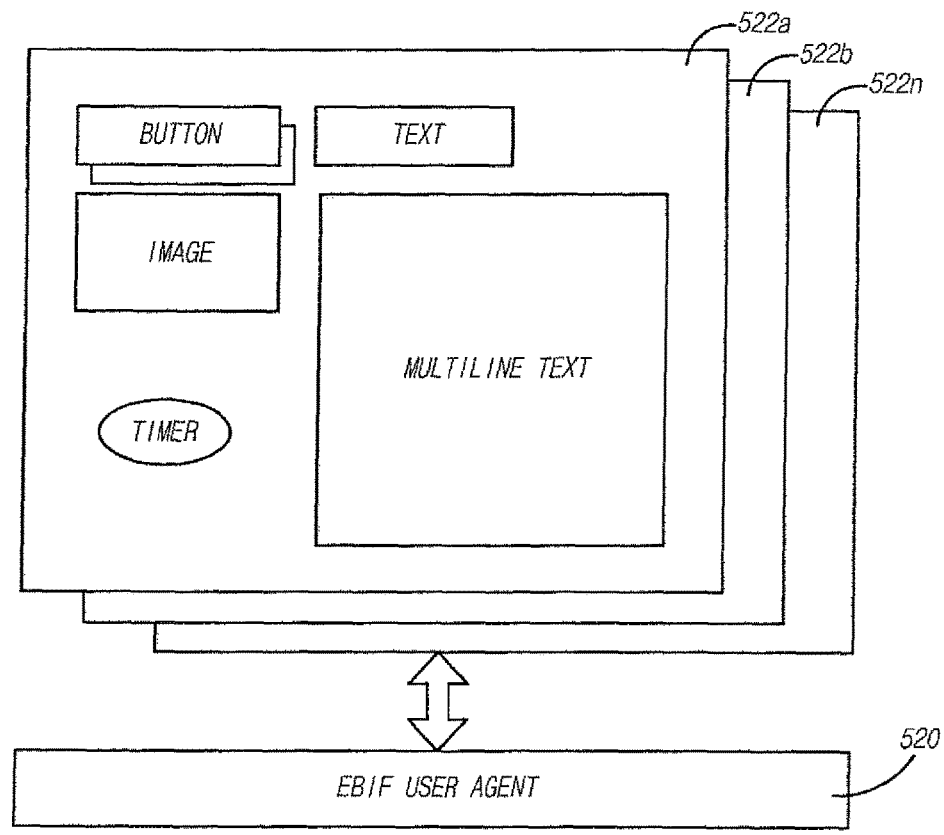
FIG. 5a is a functional block diagram illustrating the interaction between an exemplary user agent of the CPE of FIG. 5 and at least one media application.

The client application 206 may further comprise EBIF capabilities of the type previously described. As illustrated in FIG. 5a, the user interface may then comprise an ETV/EBIF user agent 520 which is adapted to acquire, decode, present, and execute "widgets" and actions contained in an EBIF resource file, such as those which comprise the various pages 522a, 522b, 522n of the aforementioned media applications 204. The "widgets" herein being of the type described in previously referenced OCAP publication entitled "Enhanced TV Binary Interchange Format 1.0" OC-SP-ETV-BIF1.0-I04-070921, issued Sep. 21, 2007, and incorporated herein by reference in its entirety.

It is via the user agent 520 that the different media pages 522a, 522b, 522n of the application(s) 204 are presented to an end-user. For example, the media pages 522a, 522b, 522n may comprise user interfaces which are displayed to the user when an application 204 is run. These applications, and displayed user interfaces will be discussed in greater detail below. The user agent 520 may further provide, along with its host hardware environment, one or more mechanisms for an end-user to navigate and interact with the media content of the applications 204 (e.g., a program or content guide, interactive on-screen icons or processes).

In yet another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. As discussed therein, the CPE may be adapted to function as a home gateway device, (such as the "Furnace" product offered by Applicant hereof). One advantage of leverage the home gateway device is that it for certain applications using the home gateway device offloads a more centralized computing/processing to more distributed computing/processing by using the gateway device in the home while still supporting the less capable CPE devices within the home.

In a still further embodiment, the CPE 106 comprises a media bridge apparatus, such as for example that described in co-owned and co-pending U.S. patent application Ser. No. 12/480,597 filed on Jun. 8, 2009 and entitled "Media Bridge Apparatus and Methods", which is incorporated herein by reference in its entirety. These and other functionality of the CPE 106 will be discussed subsequently herein at a section entitled "Alternate Implementations" and FIG. 12.

Methodology—

Figure 6:
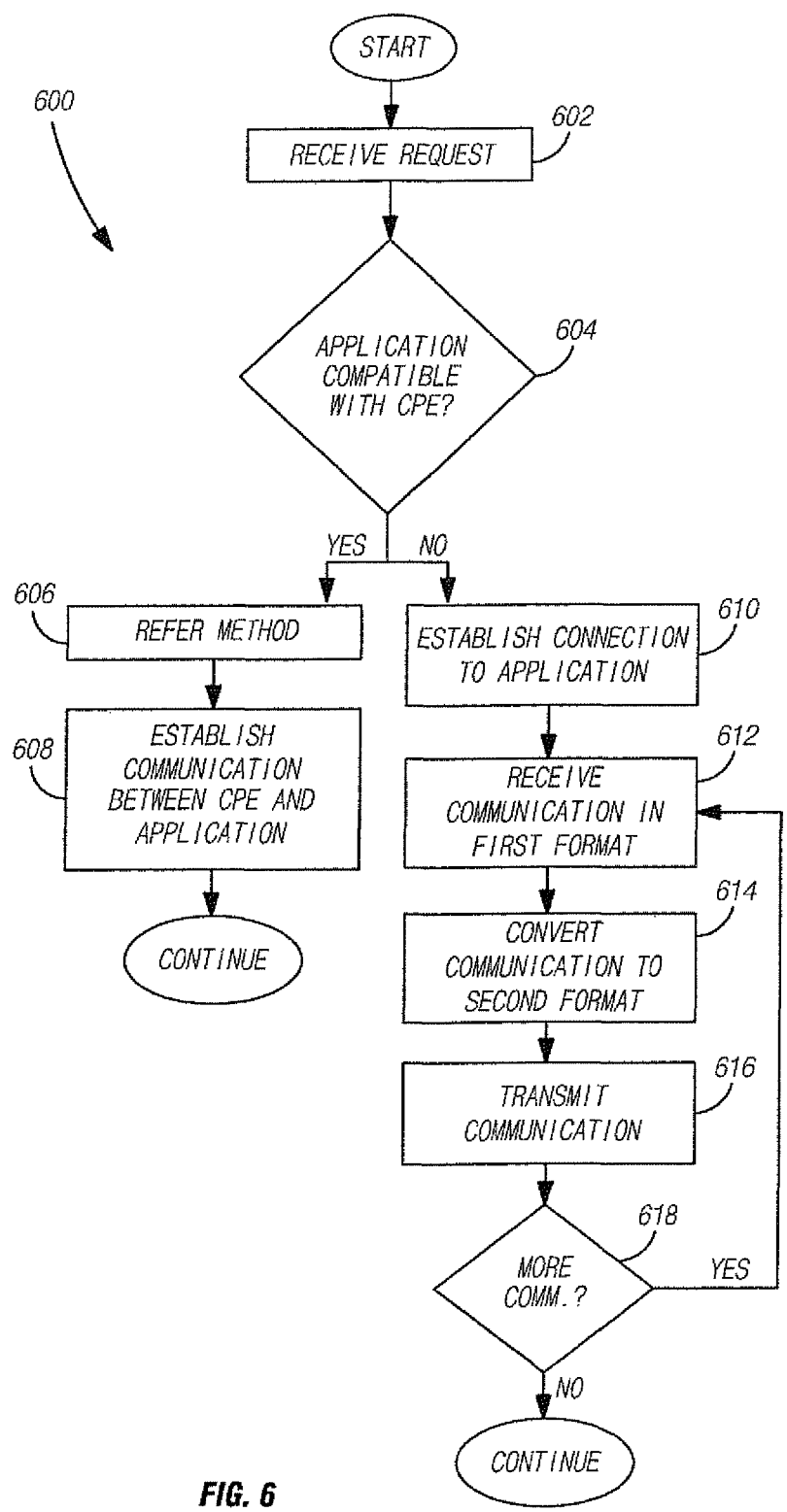
FIG. 6 is a logical flow diagram illustrating one embodiment of the method of utilizing a servlet to facilitate interactivity between a CPE and at least one media application.

FIG. 6 illustrates an exemplary method of utilizing a servlet 201 to facilitate interactivity between a CPE 106 and at least one media application 204 according to the invention.

As illustrated, per step 602, a request to access a particular one of the media applications 204 is received at the servlet 201 from a CPE 106. In one embodiment, Internet standard HTTP/HTTPs is utilized as the foundation for data communication, although other protocols may be used with equal success.

Next, at step 604 it is determined whether the content and data format utilized by the application 204 is compatible with those of the CPE 106. In one embodiment, the servlet 201 makes this determination by evaluating a table of the format utilized by the various available media applications 204, and/or the individual CPE 106. Information for the table may be provided from the network 101 (e.g., via a database which correlates a given CPE, as identified by its MAC or IP address, and its capabilities, such as may be determined at installation or startup), the CPE 106 themselves (e.g., via a profiling process or entity running on the CPE), and/or derived by the servlet 201 or other application running on the server 200. In one embodiment, a capabilities profile may be periodically or situationally generated by the CPE 106 and transmitted to the server 200 or other headend entity such as is described in co-owned, co-pending U.S. patent application Ser. Nos. 11/363,578, 11/363,577, and 11/364,147 each entitled "METHODS AND APPARATUS FOR SELECTING DIGITAL ACCESS TECHNOLOGY FOR PROGRAMMING AND DATA DELIVERY" and filed on Feb. 27, 2006, each of the foregoing incorporated herein by reference in its entirety.

If it is determined that the selected media application 204 and CPE 106 utilize a common format, at step 606, the servlet 201 refers the client application 206 of the CPE 106 to the application 204 (e.g., using the SIP "REFER" methodology previously described). Then, per step 608, communication is established between the applications 206, 204.

Alternatively, if it is determined that the media application 204 and CPE 106 utilize different data formats, at step 610 the servlet 201 establishes a connection to the media application 204. Then, when communications are received from either entity (step 612), they are converted to the format of the intended recipient (step 614), and transmitted thereto (step 618). For example, if a communication is received from the media application 204 in the format employed by the application 204 (at step 612), then per step 614, the communication is converted to a format used by the CPE 106 and transmitted to the CPE 106. Alternatively, if a communication is received from the CPE 106 in a format used therein (step 612), the communication is converted to a format used by the media application 204 at step 614, and transmitted thereto at step 616. In one embodiment, the conversion comprises de-encoding and re-encoding the communication contents or protocol translation. In another embodiment, the media content may be repackaged without decoding and re-encoding, instead the media content may be transferred from one container format to another contain format, as discussed above in previously incorporated co-owned, co-pending U.S. patent application Ser. No. 12/582,619 filed Oct. 20, 2009 and entitled "Gateway Apparatus and Methods for Digital Content Delivery in a Network". In addition, where necessary, any content associated with the communication (e.g., media content) may be transcoded and/or transrated if required. For example, the data/media content may be decoded and re-encoded to a format that is suited for the CPE.

Next per step 618, it is determined whether more communications are to be set between the client application 206 (of the CPE 106) and the media application 204. If so, the method continues again at step 612, and subsequent communications are received, converted and transmitted.

Searching Application—

In one embodiment, at least one of the media applications 204 comprises a searching application. The searching application may comprise for example an EBIF-based application which facilitates searching of the internet simultaneously with receiving and displaying programming and/or advertising content.

Figure 7A:
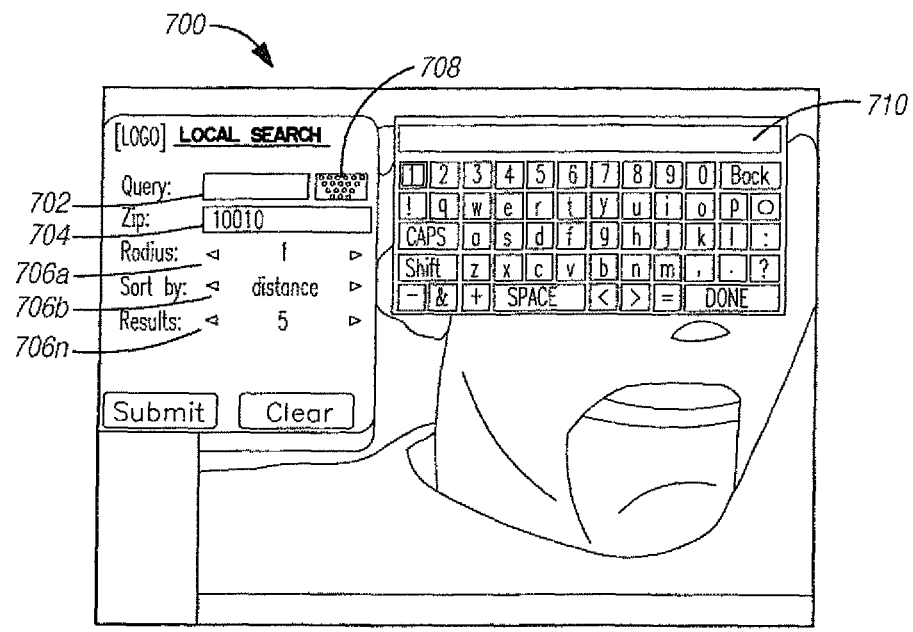
FIGS. 7a-7b are graphical illustrations of exemplary pages associated with an exemplary search application for use with the present invention.
Figure 7B:
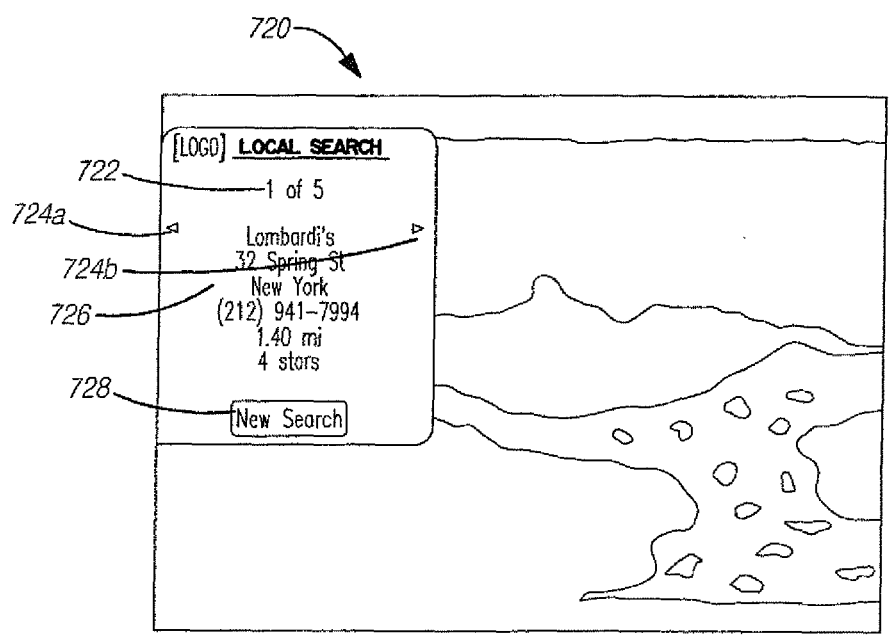

FIGS. 7a and 7b illustrate a user interface associated with an exemplary the searching application, associated with a viewing device such as an HD television. The user may access the search application at any time via pressing one or more remote control keys associated with his/her on-screen display. Alternatively, the user may be presented with an option to open the user search box or page 700 simultaneous to viewing particular programming or advertising content.

As illustrated in FIG. 7a, the search box or page 700 enables the user to enter search criteria (such as e.g., the name of a business) at a search query entry box 702. The user may enter the information via remote control keys. For example, each numeric remote control key may correspond to one or more letters and numbers much like a telephone keypad; the user may then scroll through the letters and numbers by pressing the key several times. The user may also (or instead) be presented with a graphical on-screen keyboard function 708, which when selected displays a key pad 710 which the user may scroll through (using remote control keys such as up, down, right, left, volume up, volume down, etc.) and select letters, numbers, special characters, etc. (using e.g., an "enter" key on the user's remote control).

However, in another embodiment, the search application is adapted to utilize metadata associated with the programming or advertising content to determine the appropriate query without requiring the user to enter any information, or enter minimal information (such as a confirmation). For instance, the programming or advertising content may include XML-based metadata which contains a search string that is appropriately formatted to return results related to the content of the advertisement, thereby saving the user the effort of having to key it in (and perhaps use information which is not optimized for the search).

The user also enters a zip code or other location information at e.g., the location entry box 704. In one embodiment, the location of the user may be known or derived from the client application 206 (e.g., via pre-stored fixed location data), which communicates the location of the user to the headend 150. This location may be fixed or mobile, depending on the nature of the (ultimate) client device with which the user is interacting. For instance, in one variant, the user is utilizing a mobile handset (e.g., 3G smartphone) to interface with a premises CPE (or directly with the servlet), and the user's location is obtained via GPS fix, or association with a WLAN node (AP) or cellular base station.

Additional information and criteria may be entered at additional information boxes 706a, 706b, 706n. The first additional information box 706a allows a user to set a radius for the search. In other words, the user may dictate that the search should only extend a certain distance from the center point of the given location (e.g., zip code). The second additional information box 706b allows the user to sort results, such as by distance, alphabetically, etc. The third additional information box 706n allows the user to set results display options. For example, the user may set the application to only show the 5 closest matches, etc. Although only three additional information boxes 706a, 706b, 706n are shown, it is appreciated that others may be utilized consistent with the present invention to enable the user to adjust the number, type and quality of the results of a search.

The information entered at the user search page 700 is sent, via the client application 206 running on the user's CPE 106, to the search application at the headend 150 (including via any intermediary nodes or proxies). According to the method discussed with respect to FIG. 7c below, search results are returned.

FIG. 7b illustrates an exemplary search results page 720. As shown, the search results page 720 displays the results of a search for the queried business given the location (e.g., zip code) and other parameters set at the user search page 700. The page 720 provides results list information 722 and navigation tools 724a, 724b to the user. The results list information 722 displays to the user his current position within the returned results list (e.g., 1 of 5). The navigation tools 724a, 724b permit the user to view additional results, and navigate among the provided results. With each individual result, descriptive information 726 is displayed; the descriptive information may include, inter alia, name, address, contact information, distance from the given location, directions, ratings, etc.

The exemplary search results page 720 also provides a mechanism for beginning a new search 728. In one embodiment, upon selection of the new search mechanism 728, the user is returned to the user search page 700. It will be appreciated that the aforementioned descriptive information may also be made interactive. For example, the user may select the business's rating in order to view other users' comments regarding the business, as well as post comments regarding his experience at the given business (such as by the real-time communication and/or instant messaging applications discussed below). Other interactive mechanisms include enabling the user to access directions to the business (such as by utilizing the internet content delivery application discussed below), request information regarding the business be sent to another device (such as by utilizing the RFI application discussed below), and/or contact the business directly (such as via the telephone calling application discussed below). In this fashion, many of the media functions are both interactive and integrated to the extent that they are logically coupled to one another via the user's client application software environment. This advantageously obviates the user having to invoke a separate application (e.g., by returning to another screen or menu, etc.), thereby saving time and effort, and enhancing user experience.

As is illustrated in FIGS. 7a and 7b, the various pages 700, 720 of the search application are displayed over or on top of the currently viewed programming or advertising content (i.e, in an essentially opaque fashion). However, it is appreciated that the application may be adapted to generate somewhat transparent displays, and/or move them to a portion of the screen not utilized by the already displayed content. For example, the application may run on e.g., half of the screen with the current program or advertising being displayed on the other half. Alternatively, a "ticker" or PIP-type approach may be utilized. The foregoing allow the user to continue viewing the present content and see/interact with the menus/boxes simultaneously, thereby maintaining greater logical continuity and association (where applicable).

Figure 7C:
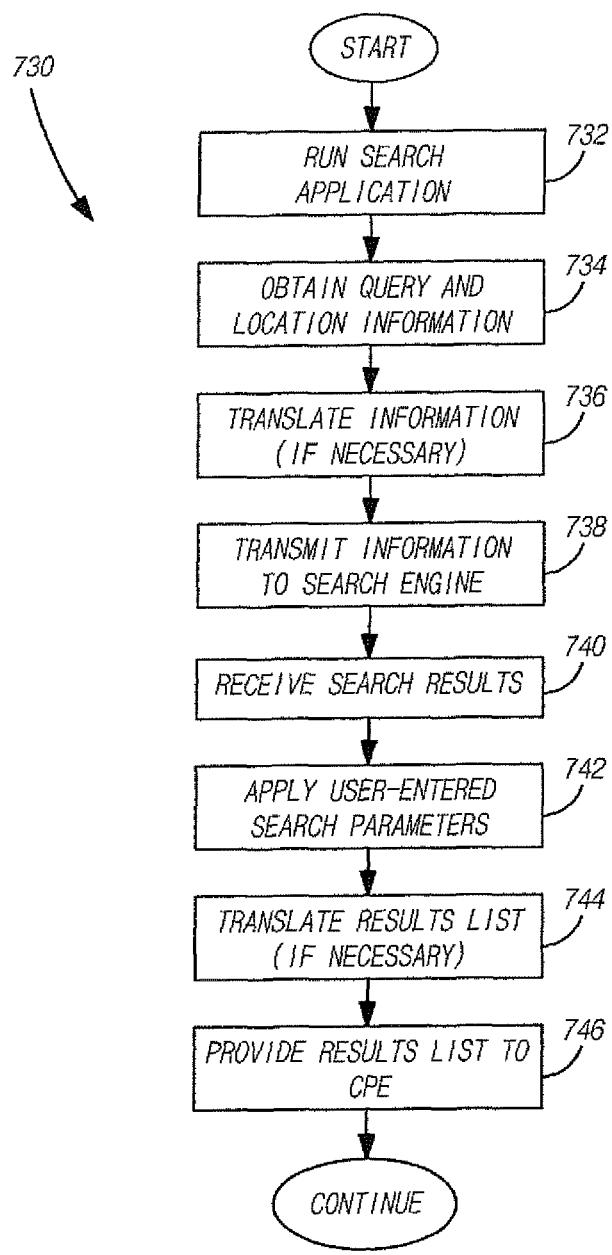
FIG. 7c is a logical flow diagram illustrating one embodiment of the method of utilizing a media application for performing a search consistent with the present invention.

Moreover, the "focus" of the various windows or boxes can be changed, such that a given window in focus (i.e., selected for interaction by a user) is made preeminent over the other windows, at least to the degree of coverage of that window or box.

one embodiment of the method 730 of utilizing the searching application is given at FIG. 7c. As illustrated, per step 732, the search application is run at the user CPE 106. In one implementation, the application is run according to the method disclosed above with respect to FIG. 6. Specifically, communication between the search application (at the headend 150) and the client application 206 occurs via the servlet 201, using either the SIP REFER method, or direct communication. The communication of the applications enables the search application to be displayed to the user and accessed thereby.

At step 734, the query and location information is obtained. In one embodiment, obtaining this information is obtained from the user's entering the information at the user search page 700. Alternatively, the information may be known or derived by the client application. If necessary the query and location information are then translated to a format understood and utilized by the search application (step 736).

Next, per step 738, the query information and location information are transmitted, via a gateway device 202, to an internet host server 208 having a search engine running thereon. The searching application accesses an API of an internet search engine (such as e.g., Yahoo™, Google™, Dogpile™, Bing™, WebCrawler™, MetaCrawler™, Lycos™, etc.) and enters information relating to both the user's location (e.g., zip code) and the queried business. Search results are returned at step 740. The search parameters entered by the user at the user search page 700 are then applied to the returned results to arrive at a results list (step 742). For example, the number of results may be reduced in accordance with the user's entered parameters. Also, one or more specific businesses may be eliminated from the results list based on distance, rating, etc.

Per step 744, the results list is translated, if necessary, to a format capable of being displayed on the user's CPE 106, and per step 746, the results are so displayed (such as via the search results page 720 illustrated in FIG. 7b).

Micro-Blogging Application—

In another embodiment of the invention, at least one of the media applications 204 comprises a real-time (RT) web-based micro-blogging application. Micro-blogging is a form of blogging wherein the messages (whether audio, textual, photographic or video) updated in the blog are smaller in size than a traditional blog. The micro-blogging application comprises in one variant an EBIF-based application which facilitates posting and viewing of comments simultaneous to receiving and displaying programming and/or advertising content. The RT communication application advantageously bridges the gap between social networking (and communicating/messaging with friends and other websites), and watching cable or satellite TV services in real time. This "bridging" permits both functions to occur simultaneously via the same interface (e.g., user's CPE), thereby greatly enhancing the user's convenience.

Figure 8A:
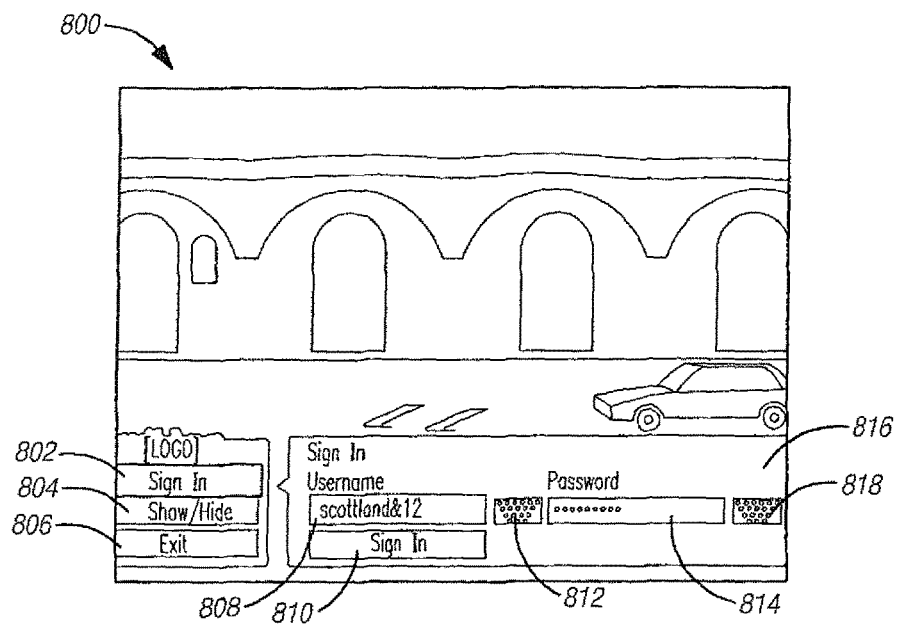
FIGS. 8a-8b are graphical illustrations of exemplary pages associated with an exemplary real-time web-based micro-blogging application for use with the present invention.
Figure 8B:
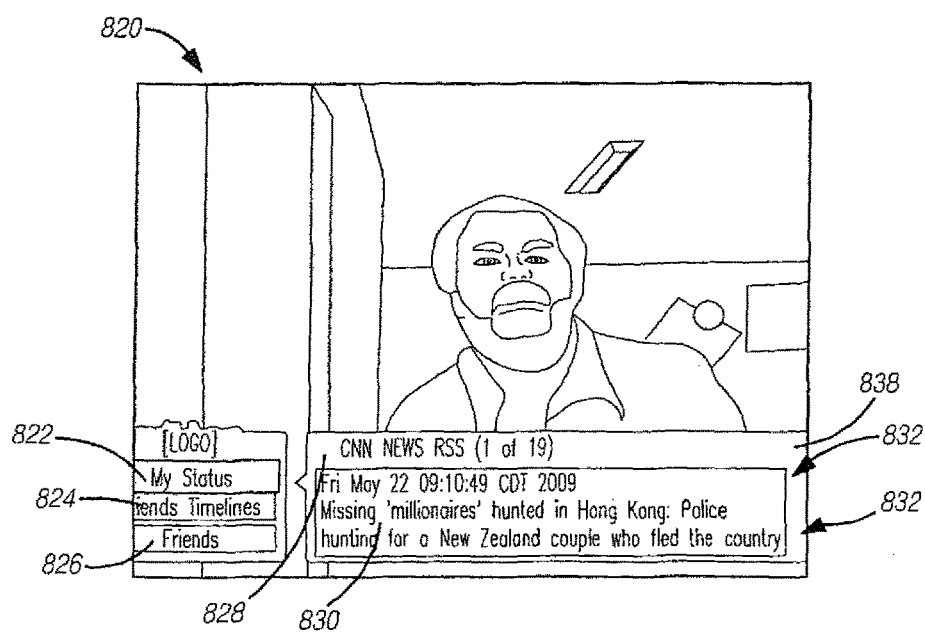

FIGS. 8a and 8b illustrate an exemplary user interface associated with the micro-blogging application. The user may access the micro-blogging application at any time via pressing one or more remote control keys. Alternatively, the user may be presented with an option to open the micro-blogging application simultaneous to viewing particular programming or advertising content (such as via a pop-up window, on-screen icon, etc.).

FIG. 8a illustrates an exemplary sign-in page 800 of the micro-blogging application. As shown, the sign-in page 800 enables a user to sign into the user's pre-existing profile of an online account for real-time social networking and web log (e.g. micro-blogging) communications.

Existing exemplary online accounts include, inter alia, Twitter™, Plurk™, Jaiku™, Identi.ca™, Pownce™, Facebook™, MySpace™, LinkedIn™, XING™, etc.; however, it is appreciated that other types and functions of sites may be utilized as well. Via buttons on the user's remote control, the user selects the sign-in tool 802 which, upon selection, initiates the sign-in sheet 816. At the sign-in sheet 816, the user enters his/her username (or user ID) at the username box 808, and password at the password box 814. The user's may enter a username and password directly into the box using one or more remote control keys or alternatively, may select a keypad tool 812, 818 associated with the boxes 808, 816. The key pad tool 812, 818 brings up a key pad screen which enables a user to navigate from among letters, numbers and symbols to more easily enter the required information (such as is illustrated by key pad 710 of FIG. 7a). Once the information is entered, the user may select the sign-in tool 810 to submit his username and password. If these are entered correctly, the user will be allowed access to the micro-blogging application and will be logged into the user's pre-established micro-blog account.

Also illustrated at FIG. 8a, the user may select the show/hide feature 804 to have the sign-in page 800 and/or the below described communications page 820 hidden from view, such as when the user desires to view the simultaneously running programming and/or advertising content. The user may also exit the micro-blogging application by selecting the exit tool 806. Upon selection of this tool 806, communication between the micro-blogging application and the client application 206 (whether direct or via the servlet 201) is terminated.

Referring now to FIG. 8b, an exemplary communications page 820 of the micro-blogging application is illustrated. As shown, the communication page 820 provides the user with the option to enter micro-blog or status via the micro-blog/status tool 822. Although not shown, it is appreciated that selection by the user of the micro-blog/status tool 822 causes a key pad or other mechanism for enabling the user to enter text to be displayed. The entered text may also be displayed for the user prior to confirmation that the micro-blog (entered text) be posted to the user's profile.

Also illustrated in FIG. 8b, at the communications page 820, the user may select a tool for reviewing prior postings of his/her "friends" (the friends timeline tool 824). A tool for viewing current postings by the user's "friends" is also given (friends tool 826). As illustrated, when the user selects to view the current or past postings of his/her friends, these postings will be presented in a communication sheet 828. The communication sheet 828 lists the username of the friend which has posted the micro-blog. For example, if User A views the micro-blogs of User B, User B's username will be listed at on the communication sheet 828. It is appreciated that a user's friends may comprise other individuals, groups, television stations, news sources, celebrities, entities, etc. Using the navigation tools 832, the user may scroll through a particular friend's postings and/or related postings. A "friends of friends" functionality (not shown) may also be provided, wherein a given user may be linked or made aware of one or more of the friends of User B.

It is appreciated that in order to view a particular micro-blog, the user must add the blogging user as a "friend". Accordingly, in one embodiment the micro-blogging application further provides a page (not shown) for searching and adding such friends. In an alternative embodiment, only those other users whom the user has established as friends at a website associated with the underlying social network or micro-blog website (e.g., Twitter, etc.) may be viewed via the micro-blogging application. The user may further enter, delete and/or search for "friends" at the appropriate website.

As is illustrated in FIGS. 8a and 8b, the various pages 800, 820 of the micro-blogging application can be displayed over or on top of the currently viewed programming or advertising content (i.e., in a substantially opaque manner). However, it is appreciated that the application may be adapted to be somewhat transparent and/or be moved to a portion of the screen not utilized by the displayed content. For example, the application may run on e.g., half of the screen with the current program or advertising being displayed on the other half. As noted above, other techniques such as tickers, etc., may be used as well with this and other displays described herein.

Figure 8C:
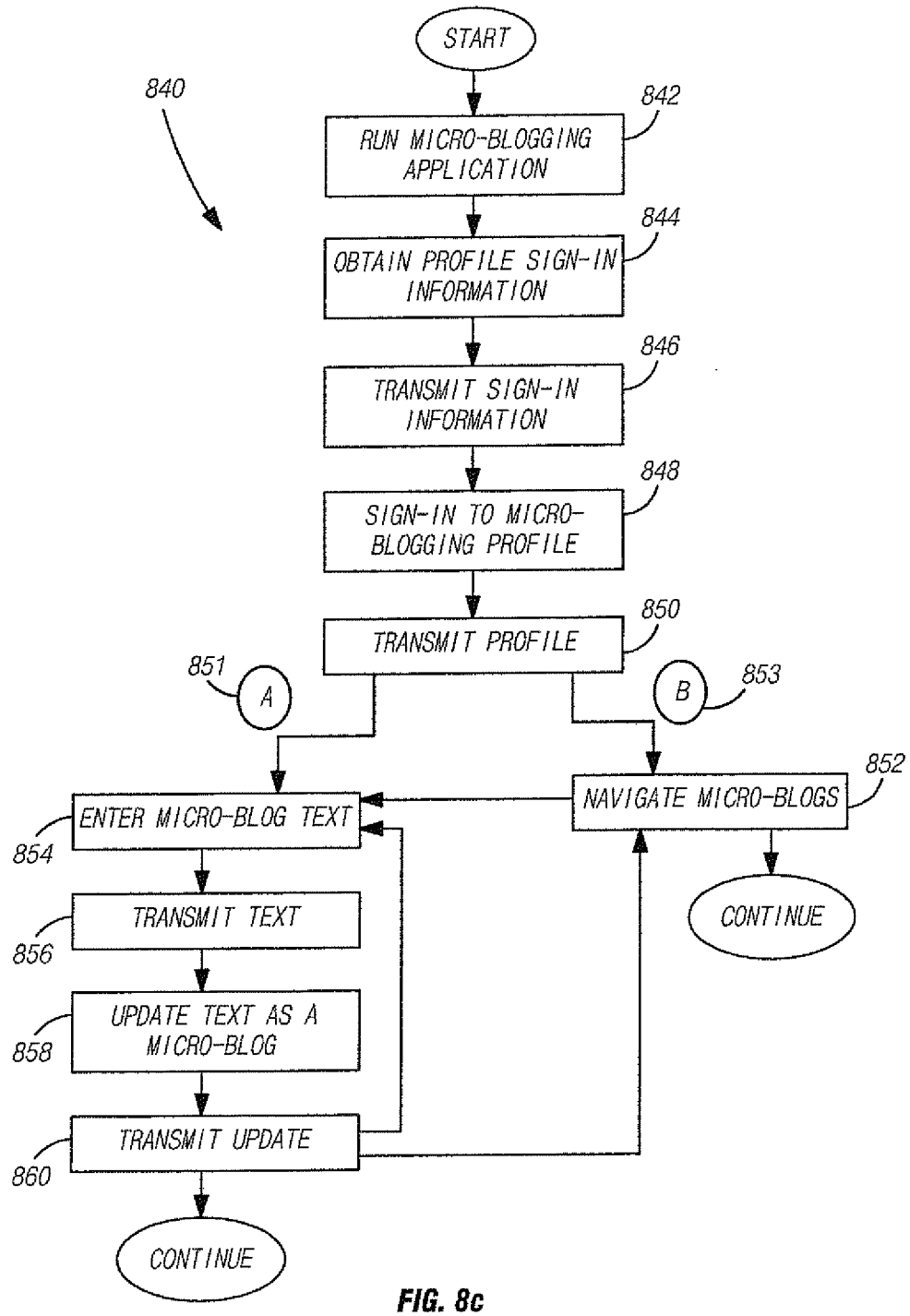
FIG. 8c is a logical flow diagram illustrating an exemplary method of utilizing a media application for performing real-time web-based micro-blogging consistent with the present invention.

Referring now to FIG. 8c, an exemplary embodiment of the method 840 of utilizing a media application for performing real-time web-based micro-blogging is given. As illustrated, per step 842, the micro-blogging application is run. In one variant, the application is run according to the method disclosed above with respect to FIG. 6. Specifically, communication between the micro-blogging application (at the headend 150) and the client application 206 occurs via the servlet 201.

Once the application has begun running, at step 844 profile sign-in information is obtained from the user. The sign-in information enables the user to sign into his/her profile with a social networking or micro-blogging website. The sign-in information may include for example a user ID or user name, and password or other authentication information (e.g., challenge question answer, selection of a graphical image or icon, etc.) entered by the user and/or known or derived by the client application 206. In one embodiment, the user enters sign-in information at a sign-in page 800 of the micro-blogging application (FIG. 8a). The profile sign-in information is then transmitted to an internet host server 208 associated with the social networking or micro-blogging website at step 846. The information may be transmitted using a gateway device 202 in communication with the servlet 201 and/or micro-blogging application. The host server 208 determines whether the provided user information comprise an appropriate user and password pair; if so the user is logged into his/her profile (step 848). In one embodiment, if the user ID or username and password are determined by the host server 208 not to match or not to exist, an error message may be returned to the user. The user may also be prompted to re-enter the sign-in information. Once logged in, the user's profile is translated (if necessary) and transmitted to the user's CPE 106 at step 850 for use thereby.

Per logical flow pathway B 853, the user may navigate micro-blogs posted by his/her friends (step 852). In one embodiment, the user navigates at e.g., a communications page 820 illustrated in FIG. 8*b*. The user may also post his/her own micro-blogs per logical flow pathway A 851. To post a micro-blog, the user enters micro-blog text at step 854, the text is then translated (if necessary) and per step 856 transmitted to the host server 208. The host server then updates the user's profile to reflect the micro-blog (step 858). Per step 860, the updated profile is translated (if necessary) and transmitted to the user so that the micro-blog may be displayed. The user may continue to navigate other micro-blogs (step 852) and/or enter additional micro-blogs (step 854).

Request for Information (RFI) Application—

In another embodiment, at least one of the media applications 204 comprises a request for information (RFI) application. The RFI application may be for example an EBIF-based application which enables a user to interact with displayed programming and/or advertising content, and request to receive additional information about the content (or otherwise relating to the content in some fashion).

Figure 9A:
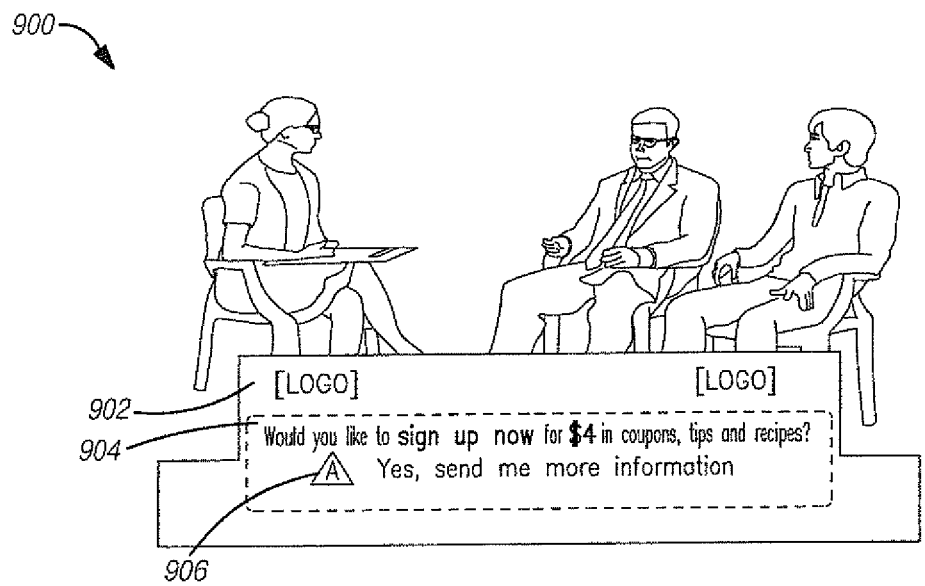
FIGS. 9a-9c are graphical illustrations of exemplary pages associated with a request for additional information (RFI) application for use with the present invention.
Figure 9B:
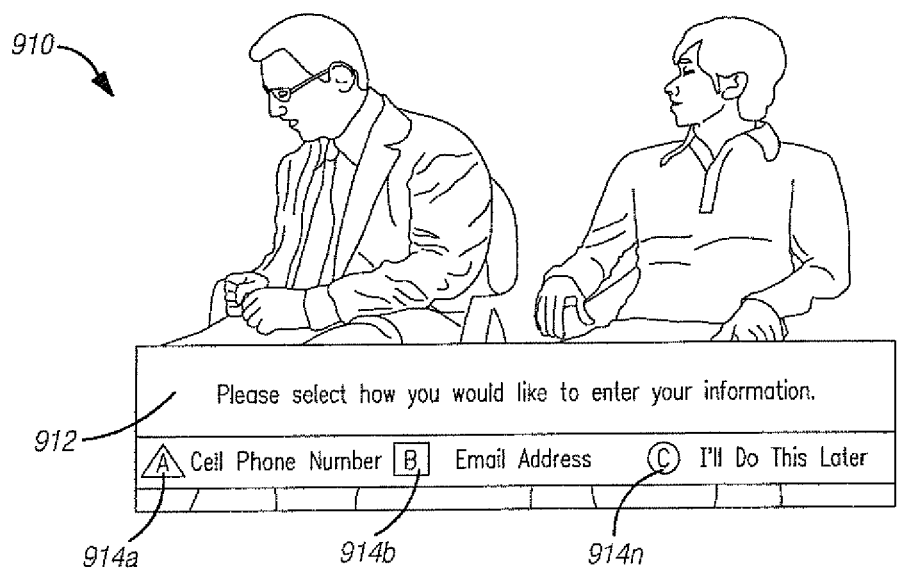
Figure 9C:
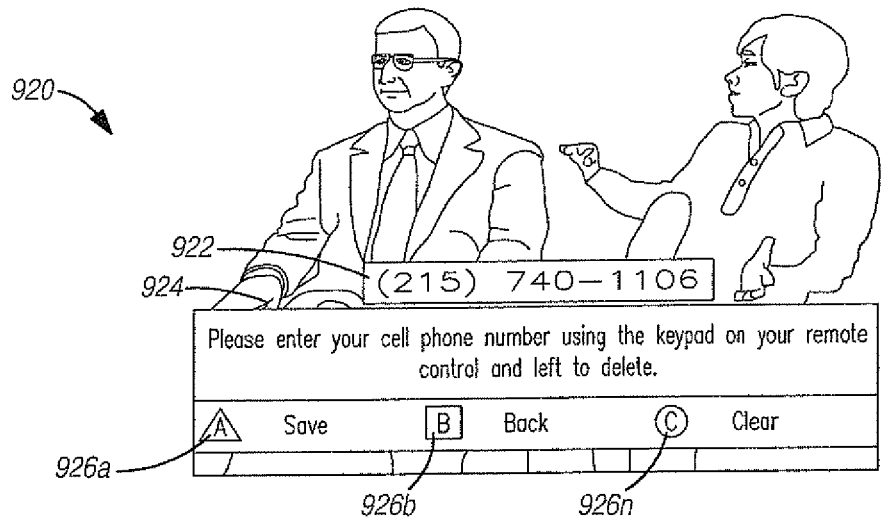
Figure 9D:
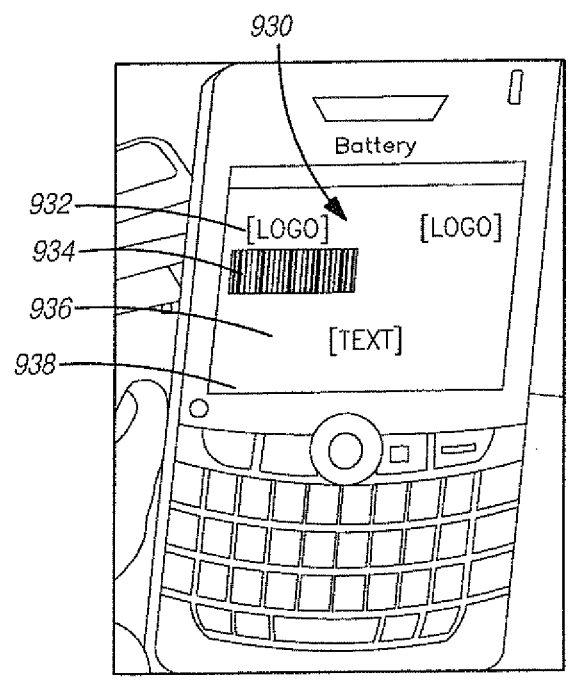
FIG. 9d is a graphical illustration of and exemplary additional information display via which a user may receive additional information in conjunction with using an RFI application.
Figure 9E:
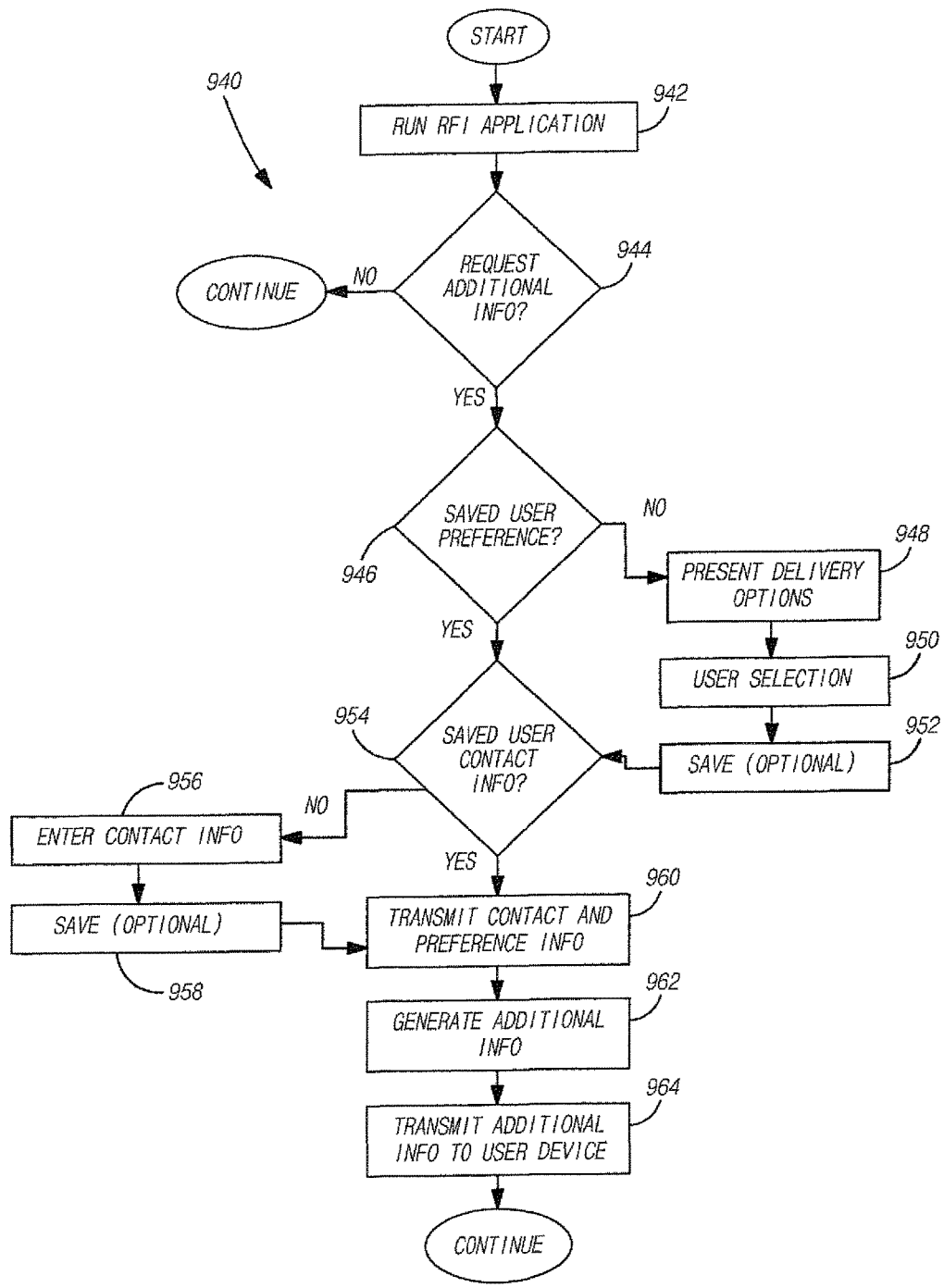
FIG. 9e is a logical flow diagram illustrating an exemplary method of utilizing a media application for requesting additional information consistent with the present invention.

FIGS. 9*a*-9*c* illustrate exemplary user interfaces associated with an RFI application; FIG. 9*d* illustrates exemplary additional information which a user may receive in conjunction with the RFI application. The user, may access the RFI application at any time via pressing one or more remote control keys. Alternatively, the user may be presented with an option to open the RFI application simultaneous to viewing particular programming or advertising content.

Referring now to FIG. 9*a*, an exemplary request inquiry page 900 is shown. As shown, at the request inquiry page 900, product information 902, and offer information 904 are displayed to the user. The product information 902 describes the offered product. Product information 902 may be text, pictures (such as a logo), video clips, audio clips, telescoping advertisements, etc. The offer information 904 describes the offer, and queries the user as to whether he/she would like to receive the offer (i.e., additional information). For example, the offer information 904 may ask whether the user would like a additional information in the form of a coupon, special offer, telephone or e-mail solicitation, discount, etc. The user may select the request option or function 906 to receive the additional information. In one embodiment, a tool may be given for declining to receive the additional information (not shown). Alternatively, the request inquiry page 900 may have an expiration, e.g., may only be displayed for a limited amount of time. Once the time for the offer has expired, the request inquiry page 700 will no longer be displayed to the user.

The time limit associated with an offer may be correlated to the length of a simultaneously running advertisement content. Alternatively, length of time may be chosen by e.g., the advertiser, content source, or MSO. For example, a certain advertiser may seek to have interactive offers displayed via the RFI application during specific programming content. For instance, a local sports store may seek to have the RFI application offer viewers of a sports telecast (baseball game) additional information in the form of a coupon for e.g., a baseball glove. Accordingly, at designated times during the telecast, for prescribed lengths of time, the RFI application may appear indicating that the viewer may select to receive the coupon.

Alternatively, the user may simply be made aware that a one or more advertisers have offers which they may view simultaneously to the sporting event by selecting one or more buttons on the remote control. In this manner, the viewer may be presented with a list of advertisers having available offers via the RFI application; e.g., arranged in alphabetical order, according to price paid by the advertiser for higher placement, or any number of other schemes.

If, at FIG. 9*a*, the user selects the request option 906 (i.e., requests to receive the offered additional information), then the user will be presented with the delivery preference page 910 illustrated at FIG. 9*b*. As shown, the delivery preference page 910 gives the viewer instructions 912 for the entry of contact information. In the illustrated embodiment, the viewer is given several options for the mode of delivery of the additional information. The user may select from among these options using the contact information option selection functions 914*a*, 914*b*, 914*n*. Although the illustrated embodiment gives only cell phone and email delivery options (as well as an option to remind the user to enter contact information at a later time 914*n*), other delivery options may be utilized in conjunction with the present invention as well such as without limitation PSTN/landline or VoIP phone, SMS/text message, postal ("snail") mail, MSO website (e.g., the "Roadrunner" website maintained by the Assignee hereof), courier, etc. Each delivery option being described and having a selection option 914*a*, 914*b*, 914*n* associated therewith on the delivery preference page 910. It is further appreciated that in one embodiment, the user's selection of a preference at the delivery preference page 910 will be saved by the RFI application and/or the client application 206 for future use, thereby enabling the user to bypass the delivery preference page 910 if desired. Moreover, more complex schemes for delivery (not shown) are contemplated by the invention; e.g., cell phone on weekdays between 7:00 am and 9:00 pm, and e-mail otherwise, and so forth.

Referring now to FIG. 9*c*, a contact information entry page 920 is illustrated. As shown, at the information entry page 920 the user is given instructions for entering contact information 924. Following the instructions, the user uses his/her remote control to enter contact information; as the information is entered, it is displayed at the contact information entry display 922. In one embodiment, the user may be further provided with a tool or option for displaying a key pad for the entry of contact information. The user may utilize various entry options 926*a*, 926*b*, 926*n*, while entering contact information, including saving the entered contact information 926*a*. In one embodiment, the user's contact information for the preference entered (e.g., email, telephone, etc.) is saved by e.g., the client application 206 and/or the RFI application may for future use. This information may be stored in a client database and linked anonymously to the particular preference and user. In this manner, all future client interactions with the RFI application may be "one-click", e.g., the user need only select to receive the additional information, no other information being required once the user selects the option to receive the information.

The entry options further allow the user to backspace or delete the last entered character 926*b*, clear all of the entered characters 926*n*. It is noted that the illustrated options 926*a*, 926*b*, 926*n* are exemplary in nature and are in no way intended to be limiting; other options may be provided such as e.g., options to confirm the entered characters are correct (not shown), enter additional contact information (not shown), etc.

As is illustrated in FIGS. 9*a* and 9*b*, the various pages 900, 910, 920 of the RFI application are displayed over or on top of the currently viewed programming or advertising content (i.e., opaque). However, it is appreciated that the application may be adapted to be somewhat transparent, and/or be moved to a portion of the screen not utilized by the displayed content as previously described. For example, the application may run on e.g., half of the screen with the current program or advertising being displayed on the other half, utilize transient display boxes, be in the form of a ticker, and so forth.

The additional information requested via the RFI application is transmitted to one or more user devices. For example, the additional information may be transmitted via the HFC network 101 to CPE 106 via a network configuration similar to that discussed above with respect to FIG. 2. Alternatively, the additional information may be transmitted to a portable device (e.g., cellular telephone, PMD, etc.) via the methods and apparatus discussed in co-owned, co-pending U.S. patent application Ser. No. 11/258,229 filed Oct. 24, 2005 and entitled "Method and Apparatus For On-Demand Content Transmission and Control Over Networks", which is incorporated herein by reference in its entirety. As discussed therein, a 3G IP multimedia system may be used to deliver data and/or content (including the above-referenced additional information) that is accessed or requested via the CPE 106. In other words, additional information may be viewed on a display at a user's television and simultaneously transmitted to a mobile device. Additional delivery mechanisms will be discussed in greater detail below.

Referring now to FIG. 9d, one example of additional information which a user may receive in conjunction with the RFI application is shown. In the illustrated embodiment, the additional information is in the form of an electronic coupon 930 sent to a user's mobile device. The electronic coupon 930 comprises in one variant product information 932, a machine readable data representation 934, and offer information 936. The electronic coupon 930 is displayed on the display 938 of the mobile device; however it will be appreciated that the electronic coupon 930 may be sent to a user's email inbox, television screen, or other display device, or even be maintained as a file (e.g., digitally signed or encrypted data file to confirm authenticity, the content of which the user cannot or does not need to see).

The product information 932 section of the electronic coupon 930 may comprise a logo, picture, audio clip, video clip, and/or other identifier for signaling to the user the product brand or product source. The offer information 936 section of the coupon 930 discloses any restrictions or rules associated with the coupon offer and/or describes the offer in greater detail. The data representation section 934 may comprise a 1 dimensional (1D) bar code, a 2 dimensional (2D) matrix code, or other symbologies used in automatic identification and data capture systems (AIDC) and capable read by an optical scanner or barcode reader. The data representation 934 contains information about the product and the offer (e.g., $1.00 off, 2 for the price of 1, etc.), which is read by the scanning device. In the illustrated embodiment, the user need only present the electronic coupon 930 displayed on the mobile device to a cashier, who may then read the data representation 934 and implement the offer (e.g., give the user a discount, etc.). The exchange may also simply comprise uploading the aforementioned (signed and/or encrypted) file to a point-of-sale or other device (e.g., via wired or wireless link from the mobile device), wherein the file can be read and authenticated, and the offer implemented.

The electronic coupon 930 of FIG. 9d is merely exemplary of additional information that the user may receive. The additional information may take any number of other forms, such as for example text information, an additional video/audio or video/audio clip, a physical e.g., paper coupon or other material which may be delivered via regular mail, email, to the user's mobile device having a display, to the user's television, via a USB key or RFID device, and so forth.

One embodiment of the method 940 of utilizing the RFI application to receive additional information is given at FIG. 9d. As illustrated, per step 942, the RFI application is run at the user CPE 106. In one implementation, the application is run according to the method disclosed above with respect to FIG. 6. Specifically, communication between the RFI application (at the headend 150) and the client application 206 occurs via the servlet 201, using either an direct (e.g., SIP REFER) method or indirect (e.g., proxied) communication, although this is not a requirement.

Next, per step 944, the user is queried as to whether he/she would like to receive additional information. In one embodiment, the user is queried via presentation of a request inquiry page 900 as described previously with respect to FIG. 9a. If the user elects to receive additional information, at step 946, the RFI application running at the headend 150 (or the client application 206) determines whether the user's preferences have been saved. This may comprise searching a client database for the particular user and checking for saved delivery preferences. If the user has not saved a delivery preference, then at step 948, the delivery options are presented to the user. In one embodiment, the delivery options are presented to the user via a delivery preference page 910 as illustrated in FIG. 9b. At the delivery preferences page 910, the user selects one of the presented delivery options (step 950). At step 952, the user's delivery preference selection may be optionally saved to a client database associated with the RFI application at the headend 150 or at the CPE 106.

Per step 954, it is next determined whether contact information for the user has been saved. This may comprise searching a client database for the particular user (e.g., MSO subscriber database or billing system), and checking for saved contact information. If the user is not associated with any saved contact information, per step 956, the user is requested to enter contact information. In one embodiment, the user is requested to do so via a contact information entry page 920 illustrated in FIG. 9c. Once the contact information is entered, it is optionally saved at step 958 to a client database such as is described above.

At step 960, the contact and preference information (whether pulled from the client database or entered by the user) is translated if necessary to the proper format, and transmitted to a processing entity associated with the RFI media application via the network. The RFI processing entity uses the preference information to generate additional information in an appropriate format (step 962). For example, if the user prefers to receive information at his mobile device, an SMS or text message may be generated; if the user prefers to receive information to an email address, an XML- or HTML-based message may be generated. The contact information is used to determine where to send the generated message so that it may be routed to the appropriate user device (step 964). For example, if the contact information is an email address, the generated message will be transmitted via a gateway device 202 to an internet host server 208 associated with the user's email account. If the contact information is a mobile phone number, the generated message will be transmitted via a gateway device to a server associated with the messaging service for the user's mobile device (e.g., such as that provided by the a cellular service provider).

In one embodiment, a user device outside of the cable network may be contacted and information sent thereto via the point-to-point or session-based approach discussed in co-owned, co-pending U.S. patent application Ser. No. 11/258,229 filed Oct. 24, 2005 and entitled "METHOD AND APPARATUS FOR ON-DEMAND CONTENT TRANSMISSION AND CONTROL OVER NETWORKS", which is incorporated herein by reference in its entirety. For instance, a video clip may be queued at a VOD server and accessed by the mobile user via an on-demand type paradigm.

In another variant, a FLO (forward link only) wireless broadcast system such as the exemplary MediaFLO™ system manufactured by Qualcomm Inc. of San Diego, Calif. may be used to deliver wireless broadcast media or data to a mobile user's handset.

It is also noted that the requested information delivered to the user may also be interactive in nature; e.g., may include on-screen interactivity features such as icons or hyperlinks, etc. by which the user can contact a sales or other representative, be taken to an advertiser's website or other network location, initiate a voice call, text or email with a point of contact, etc.

Internet Content Application—

In another embodiment of the invention, at least one of the media applications 204 comprises an internet content (IC) delivery application. The IC delivery application may be for example an EBIF-based application which facilitates browsing, streaming and viewing of internet content (such as e.g., YouTube or similar video clips, vlogs, etc.).

Figure 10A:
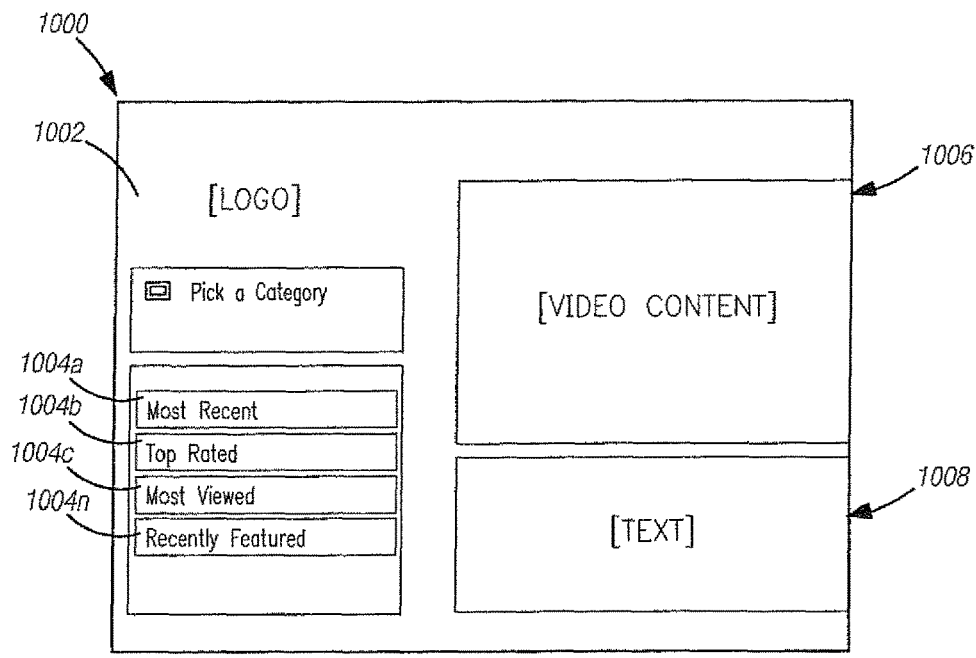
FIGS. 10a-10b are graphical illustrations of exemplary pages associated with an internet content delivery application for use with the present invention.
Figure 10B:
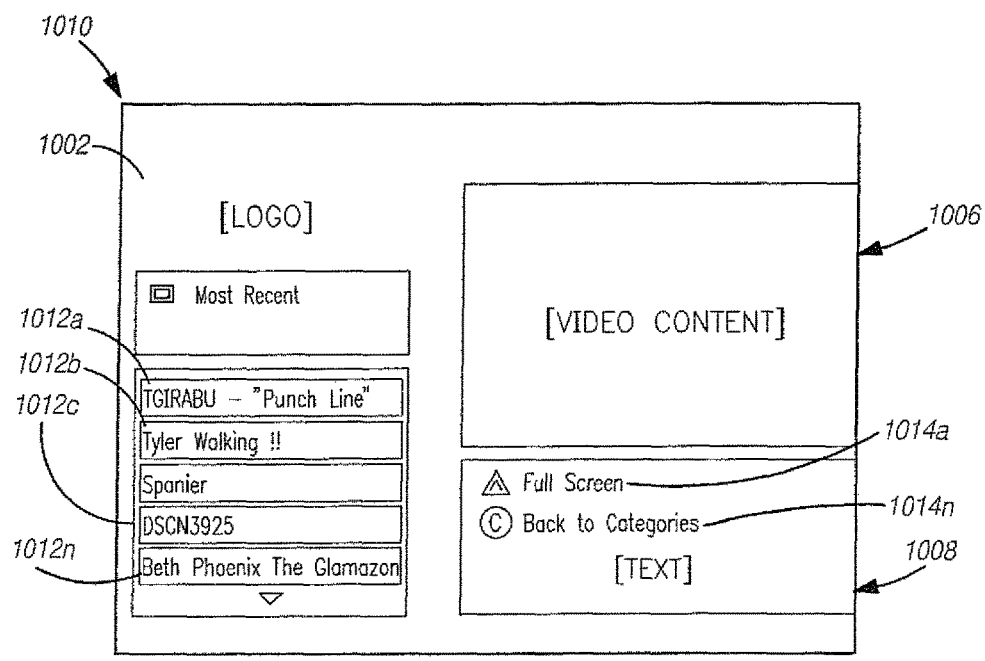

FIGS. 10*a* and 10*b* illustrate exemplary user interfaces associated with the IC application. The user, may access the IC application at any time via pressing one or more remote control keys.

FIG. 10*a* illustrates an exemplary category selection/searching page 1000. The category selection/searching page 1000 is presented to the user when he/she accesses the IC application. In the illustrated embodiment, the searching page 1000 presents the user with information regarding the internet content source 1002 and a number of categories of content 1004*a*, 1004*b*, 1004*c*, 1004*n*. The user may select any of the given categories of content 1004*a*, 1004*b*, 1004*c*, 1004*n* in order to be taken to a content results page (described below with respect to FIG. 10*b*). In another embodiment, the user may also be presented with a feature for searching the internet content source for particular content. The user may enter search criteria and be returned a list of results in a content results page (such as that described herein below).

The category selection/searching page 1000 also displays content in the viewing area 1006. Accordingly, a user may view selected content while searching/selecting a category 1004*a*, 1004*b*, 1004*c*, 1004*n* for future viewing. In another embodiment, as the category selection/searching page 1000 is loaded, and a user begins searching an advertisement may be selected and automatically played in the viewing area 1006. Information regarding or describing a currently playing video may be displayed in the video information area 1008. Additionally, other textual information, such as instructions, advertisements, etc. may be displayed in the video information area 1008.

In yet another embodiment, methods and apparatus for providing contextually related secondary content in addition to the selected content may be utilized in conjunction with the present invention, as is described in co-owned, co-pending U.S. patent application Ser. No. 11/198,620 filed Aug. 4, 2005 and entitled "Method and Apparatus For Context-Specific Content Delivery", which is incorporated herein by reference in its entirety. As discussed therein, in one exemplary embodiment, the primary content comprises video clips or segments viewed by users of a network (e.g., Internet), and the secondary content comprises advertising selected at least in part based on metadata associated with the primary content. The metadata is provided by, e.g., the content originator or network operator, and is sent to a third party network entity (e.g., advertising server) which returns contextually specific advertising matching the search terms. In one variant, the search term is simply one or more keywords drawn from the metadata and used as an input to a search engine. In another variant, more sophisticated analysis of the metadata is performed so as to ostensibly reduce the number of irrelevant or marginally relevant "hits" returned by the search engine/advertising server.

The aforementioned secondary content insertion may utilize methods and apparatus for providing a seamless visual integration/transition from the primary content to the secondary content. Thus, instead of placing the returned secondary content (e.g., advertising) in an ancillary position around the primary content (e.g., video player window), the secondary content may be placed within the display context of the primary content itself. The two different contents (e.g., encoded video & XML advertising) may be further configured to appear as a single, integrated and seamless visual experience.

In yet another embodiment, methods and apparatus for enhancing advertising or promotional penetration into a particular demographic of a network subscriber pool may be utilized with the present invention, as is described in co-owned, co-pending U.S. patent application Ser. No. 12/284,757 filed Sep. 24, 2008 and entitled "Methods and Apparatus for User-Based Targeted Content Delivery", which is incorporated herein by reference in its entirety. As discussed therein, the exemplary methods and apparatus utilize a direct correlation between the subscribers in the network and the target demographic (or psychographic) to provide secondary content. Thus, instead of relying solely on an externally-based analysis or model such as Nielsen, which assumes that a particular demographic or psychographic of the subscriber pool will be accessed when advertising in association with a particular program (as in the prior art), advertising may advantageously be placed within the delivered program lineup based on data and information gleaned from the target audience itself (e.g., subscribers in a cable or satellite network). This approach affords, inter alia, the ability to target certain demographics at various levels of granularity, ranging from a per-subscriber basis to the network subscriber pool as a whole. The MSO or other network operator may also provide an advertiser with data relating to the number and type of viewer "impressions" for their advertising or promotional content. This type of information may be useful to the advertiser (or even the MSO) in assessing the efficacy of their advertisement or promotion.

Moreover, in one variant of the present invention selects the content of interactive links included with the advertisements or elements that can be telescoped by the subscriber. For instance, a process running on any of the above-referenced entities may determine various context elements from the metadata associated with an advertisement and select two or three interactive links or "pointers" to items of interest or particular relevance based thereon. The interactive links are then presented to the user in a telescoping window, so that a user may e.g., obtain more information, contact the advertiser, locate the advertised business, etc. Additionally, the selection of the telescoping advertisement itself may be based on the subscriber demographics/psychographics, and/or the context of the program content associated with the advertisement as previously described.

Figure 10C:
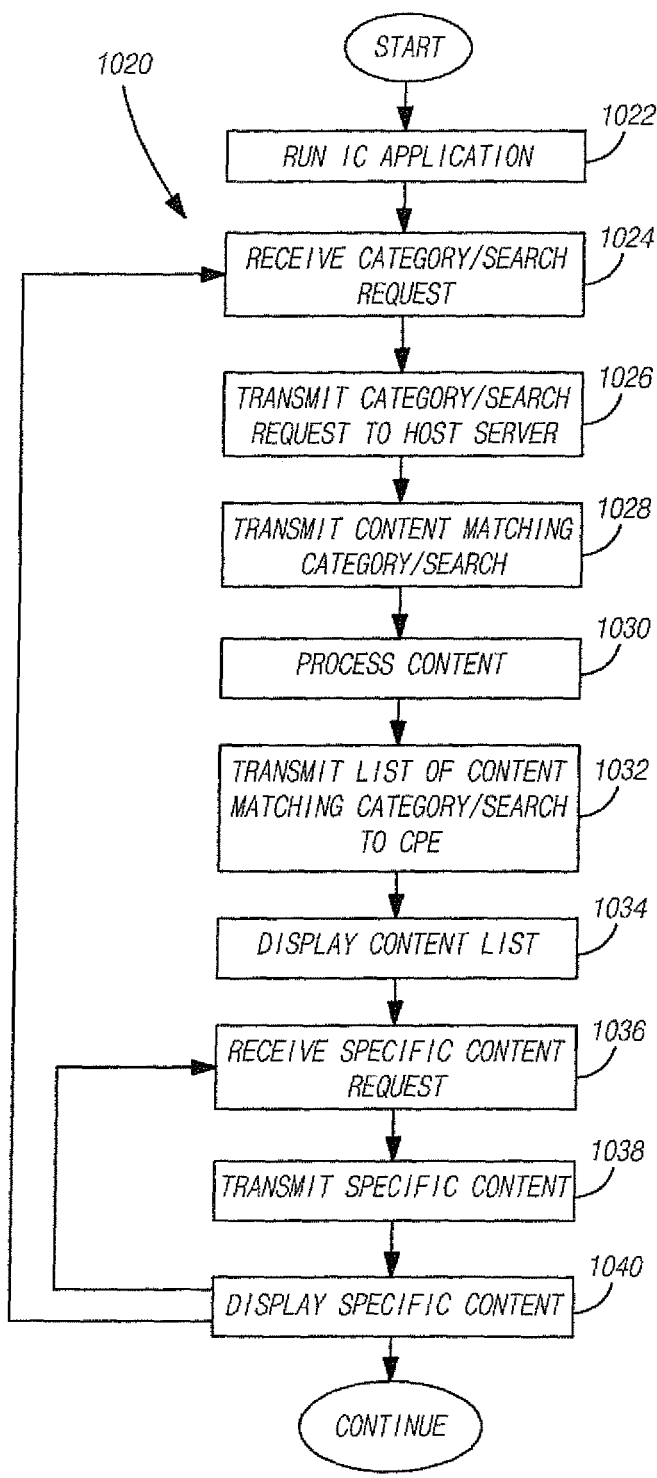
FIG. 10c is a logical flow diagram illustrating an exemplary method of utilizing a media application for receiving internet content consistent with the present invention.

Referring now to FIG. 10b, a content results page 1010 is illustrated. As shown, at the content results page 1010, the user is provided with a list of selectable content 1012a, 1012b, 1012c, 1012n for viewing. Using one or more remote control keys, the user can select desired content which is then displayed in the viewing area 1006. At the content results page 1010, the video information area 1008 may be configured to display video playback options 1014a, 1014n. In the illustrated embodiment, the user may select an option to view the video content in full screen 1014a. The user may also select to be returned to the category selection/searching page 1014n. It is appreciated, however, that other options may also be given such as e.g., functions or tools for performing "trick modes" (such as rewind, fast-forward, pause, etc.), for recording the internet content to a storage device associated with the CPE 106, etc. (such as via a DVR, PVR, nPVR, etc.), the illustrated options 1014a, 1014n being merely exemplary in nature.

one embodiment of a method 1020 of utilizing the IC application is given at FIG. 10c. As illustrated, per step 1022, the IC application is run at the user CPE 106. In one embodiment, the application is run according to the method disclosed above with respect to FIG. 6. Specifically, communication between the search application (at the headend 150) and the client application 206 occurs via the servlet 201, using either an direct (e.g., REFER) method or indirect (e.g., proxied) communication.

Next, at step 1024, a category and/or search request is made by the user at e.g., the category selection/searching page 1000. For example, the user may select the category for the most viewed or most popular content. The category and/or search request is then transmitted to an internet host server 208 associated with the content (step 1026). In one embodiment, the request is translated (if necessary) and transmitted to a processor running the IC application at the headend 150, which then forwards the request to the gateway device 202. The gateway device 202 then establishes communication with the host server 208 and sends the request for the content. As noted previously, the gateway device 202 may be of the type described in co-owned, co-pending U.S. patent application Ser. No. 12/582,619 filed Oct. 20, 2009 and entitled "Gateway Apparatus and Methods for Digital Content Delivery in a Network" previously incorporated herein.

Per step 1028, the host server 208, in response to receiving the request (step 1024) determines the content matching the user's category and/or search criteria and transmits the matching content back to the gateway device 202 which forwards it on to the IC application (or processor associated therewith). At step 1030, the content is processed such as by de-multiplexing and re-multiplexing described above. A CPE 106 readable interactive list of the processed content may also be generated. In one embodiment, the processing step may be performed by the gateway device 202 such as is described in the aforementioned U.S. patent application Ser. No. 12/582,619 filed Oct. 20, 2009 and entitled "Gateway Apparatus and Methods for Digital Content Delivery in a Network". In another embodiment, the content may be processed at e.g., the server 200 or other headend entity.

At step 1032, the list of content matching the user entered criteria is presented to the user. In one embodiment, the list of content is displayed (step 1034) to the user in a content results page 1010 such as is illustrated at FIG. 10b. From the content list, the user may select content for viewing. The user's request for specific content from among the listed content is received at the headend IC application (step 1036) and in response to the request, the specific content is transmitted back to the user's device (step 1038). Once received, the user device (CPE 106) displays the requested content. The user may select to receive additional content from the previously described content list and/or may be returned to the category/search page 1000 in order to request alternative categories of content and/or enter additional or different search criteria.

It will also be appreciated that while the foregoing methodology of FIG. 10c is substantially user-driven (i.e., predicated upon user inputs or requests given for the most contemporaneously), other approaches may be used consistent with the invention. For example, in one variant, a search/recommendation engine such as that described in co-owned and co-pending U.S. patent application Ser. No. 12/414,576 filed Mar. 30, 2009 and entitled "Recommendation Engine Apparatus and Methods", which is incorporated herein by reference in its entirety, may be utilized with the present invention. As discussed therein, targeted to a particular user (or group of users) within a content-based network may be identified and recommended.

Network Architecture for Telephone and Messaging Applications—

Figure 11:
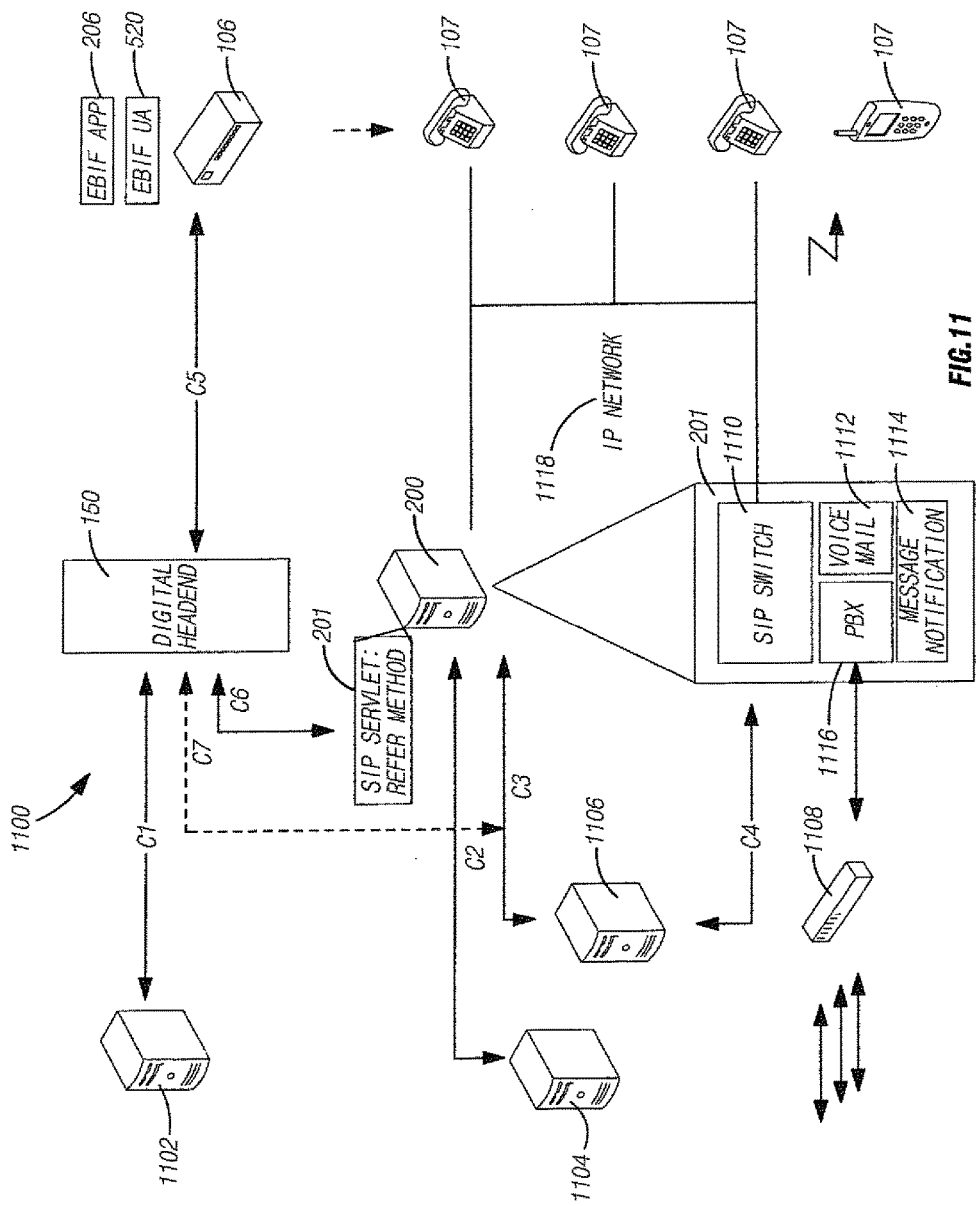
FIG. 11 is a functional block diagram illustrating a second exemplary network architecture useful with the present invention.

Referring now to FIG. 11, one implementation of a network architecture 1100 for use with the media application functions of the present invention is illustrated. As shown, the network architecture comprises at least one CPE 106 in communication with a server 200 via the digital headend 150 of a network 101 (e.g., cable or satellite network).

The network architecture 1100 of FIG. 11 is specifically aimed at providing a platform for the utilization of media applications 204 which enables the high degree of integration as previously described; e.g., by providing a substantially unified system for inter alia: (i) the storage and retrieval of contact information and other "address book" data, (ii) initiating and receiving telephone calls from a CPE 106 (such as a user's set top box), and (iii) sending email messages, short message service (SMS) messages, and/or instant messages. These applications will be discussed in greater detail below.

The server 200 runs a servlet 201 application which, in one embodiment, utilizes the method discussed above with respect to FIG. 6 to establish and/or facilitate communication between the requesting CPE 106 and the selected media application 204. For example, for certain ones of the applications 204, the SIP REFER method discussed above may be used to establish communication between the CPE 106 and an application 204. In FIG. 11, the CPE 106 and the SMS gateway (or Email/IM Server Gateway) 1102 communicate using a REFER method connection at the servlet 201. The servlet 201 may also act as a proxy between the CPE 106 and other media applications 204 which utilize a content format that is not readable and/or useable by the CPE 106. As illustrated, the servlet 201 comprises a "SIP switch" proxy 1110, a "Voice Mail" proxy 1112, a "Message Notification" proxy 1114, and a "PBX" proxy 1116. However, it will be appreciated that the servlet 201 may serve as a proxy to any number and/or type of media applications 204, the given applications being merely exemplary.

As is also illustrated in FIG. 11, the server 200 is in communication with an address book server 1104, a telephony/call gateway 1106, and a PSTN/SIP gateway 1108. These devices are therefore accessible by the CPE 106 via the aforementioned proxy function of the servlet 201 running on the server 200.

The telephony/call gateway 1106 is, via an IP network 1118, able to establish communication between the CPE 106 and SIP devices 107, and/or between a SIP device associated with the user of the CPE 106 and other SIP devices 107. The PSTN/SIP gateway 1108 enables backward compatibility for non-SIP PSTN (e.g., POTS) devices.

Figure 11A:
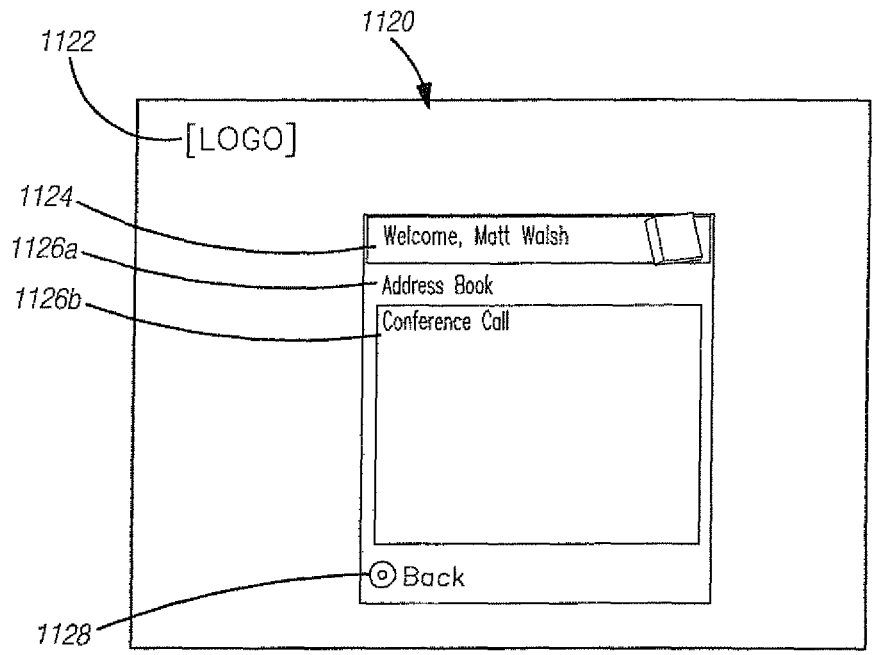
FIG. 11a is a graphical illustration of an exemplary applications options page for use with the network architecture of FIG. 11.

Referring now to FIG. 11*a*, an exemplary telephone and messaging options user interface page 1120 is given. The telephone messaging options page may be associated with e.g., an address book application, a telephone calling application, and/or an SMS/IM messaging application, and may be presented to a user upon pressing of one or more remote control keys or selecting an on-screen menu function. In other words, the exemplary telephone and messaging options page 1120 may be employed by the user to access any one of a number of communications related applications.

At the telephone and messaging options page 1120, the user is presented with several application options 1126*a*, 1126*b*. In the illustrated embodiment, the user may select the first option 1126*a* to open the address book application, and/or the second option 1126*b* to open the telephone calling application (both described in detail below). These applications may be linked as well, such that selection of an entry in the address book application display instantiates the telephony application and automatically dials the number. It is appreciated that other options may likewise be presented to the user at the options page 1120 the foregoing being merely exemplary. For example, options for instant messaging and/or sending SMS messages may be given at the options page 1120 as well.

The options page 1120 of the illustrated embodiment comprises a logo area 1122 where a logo for the cable provider or other advertisement may be displayed. The options page 1120 also indicates in the user description area 1124 the particular user signed in to the service. It is appreciated that one or more tools may be provided for enabling the user to switch between other profiles to access different contact information (such as in an address book application) and/or different features. For example, certain users may be denied the ability to e.g., make phone calls, etc. An option or tool 1128 for exiting the options page may also be provided.

Address Book Application—

In one embodiment, at least one of the media applications 204 in communication with the servlet 201 comprises an address book application. The address book application may be e.g., an EBIF-based application which enables a user to store, organize, and retrieve contact information for the user's family, friends, co-workers, etc. As noted above with respect to FIG. 11*a*, the address book application may be accessible to a user via e.g., a telephone and messaging options page 1120, such as by selection of the address book application option 1126*a*.

The address book application is associated with a storage entity (not shown), which can be local or remote from the user's CPE. A user may enter names and contact information entries which are then saved under the user's profile. In an alternative embodiment, a single CPE 106 or associated device may be provided with a single premises profile, all of the contacts for that premises being listed in the address book. Once contacts are stored, the user may navigate through the entries to find specific contacts.

Figure 11B:
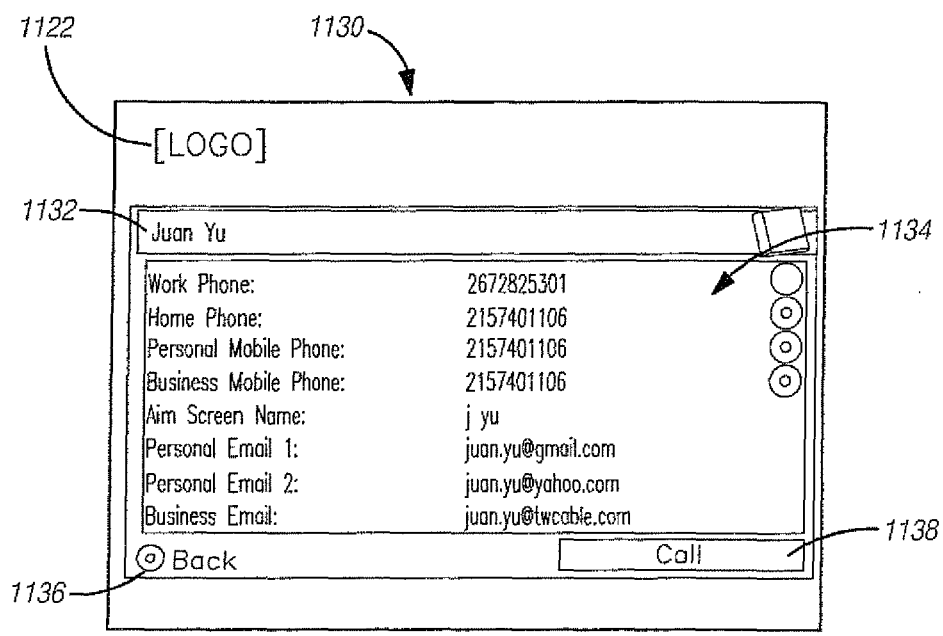
FIG. 11b is a graphical illustration of an exemplary contact information page associated with an application for storing, organizing, and retrieving contact information for use with the present invention.

Referring now to FIG. 11*b*, an exemplary contact information page 1130 associated with the address book application is illustrated. As shown, at the contact information page 1130, similar to the options page 1120, the user is presented with a logo area 1122 where a logo for the cable provider or other advertisement may be displayed. The contact information page 1130 lists a selected contact name 1132, and contact information 1134 for the contact. In the illustrated example, the contact information includes entries for phone numbers, email addresses and screen names for various instant messaging services. It is appreciated that other information may be entered and presented at the contact information page 1130 as well. For example, a physical address, mailing address, photo, video clip, as well as birthday, and other information may be collected and stored.

A tool or function 1136 for exiting the contact information page 1130 is also given. In one embodiment, using this tool 1136 may return a user to the options page 1120 of FIG. 11. Alternatively, the user may be returned to an alphabetical listing by name of all the contacts in the user's address book (not shown). Options for accessing other applications given selected contact information may also be given. For example, the contact information page 1200 gives the user a tool for calling 1138 the listed contact. Other tools may also be implemented consistent with the present invention including tools for sending text or SMS messages, or sending instant messages (not shown).

Telephone Calling Application—

In one embodiment of the invention, the aforementioned address book application is linked to the user's internet/phone account profile. The user can then use the calling tool 1138 to initiate a phone call via a telephone calling application. In one variant, the user of the calling tool 1138 clicks on or selects an icon on the display via the remote control or a function key on the remote control; the key or icon being pre-designated to initiate a session to call the designated number (so called "click 2 call"). Alternatively, the user can make a call directly from the telephone and messaging options page 1120 discussed in FIG. 11*a*.

The telephone calling application is, in one embodiment, an EBIF-based application which facilitates telephone connections between two VoIP or SIP-enabled phones. However, it will be appreciated that, via a PSTN/SIP gateway 1108, communication with non-SIP enabled phones may also be facilitated.

In one embodiment, the telephone calling application first initiates a telephone call to the user's telephone. For example, the EBIF application may initiate a request to a click-to-call service which based on the MAC address of the CPE in the incoming request, looks up the corresponding household, and the SIP phone associated to the household. Once the home phone number is available to the servlet, the SIP call setup can be done by the servlet using the third party call control setup protocol as part of the SIP specifications. This can be done either by sending a REFER method to the subscriber device of the calling party and that will initiate a call setup to the destination number, called party. Instead of the REFER method the call can also be setup by the servlet sending a SIP INVITE to the calling party SIP device and once the subscribe picks-up the home phone and OKs the session, another INVITE message is sent to the destination number passed in the EBIF application. The request and the call setup are completed by sending the SDP for opposite devices.

In another variant of the application, such as video conferencing to work from the television device, the digital set-top CPE device itself is SIP enabled and through the EBIF application, a user can initiate a SIP session for a video conference from the CPE device to the remote destination number/address.

When the user picks up the receiver, the application will then cause the called party or parties (such as in a telephone conference) to be dialed. In an alternative embodiment, the telephone conversation utilizes a video capturing device (e.g., a webcam) for enabling video calls directly from a television screen. It is appreciated that the video capturing device may also transmit audio data (alone or in combination with video data) to the called party such as via a microphone associated with the webcam.

SMS/IM Application—

In yet another embodiment, the aforementioned address book application is linked to the user's internet messaging profile or internet/phone account. The user can then use a function or tool for initiating the SMS or IM application to send SMS messages between the user's device (CPE 106) and a SIP-enabled phone, or to send instant messages from the CPE 106 to another user's web-enabled device (such as computer, mobile device, etc.). Alternatively, the user can select to send instant messages or SMS messages directly from the telephone and messaging options page 1120 discussed in FIG. 11a.

The SMS/IM application may comprise a separate stand-alone application, or alternatively be integrated into single application with other of the media applications 204 discussed above. The SMS/IM application is in one variant an EBIF-based application which facilitates transmission of text messages between devices. In one embodiment, the user may send and receive IM or SMS messages at his CPE 106 simultaneous to receiving and displaying programming and/or advertising content.

Figure 11C:
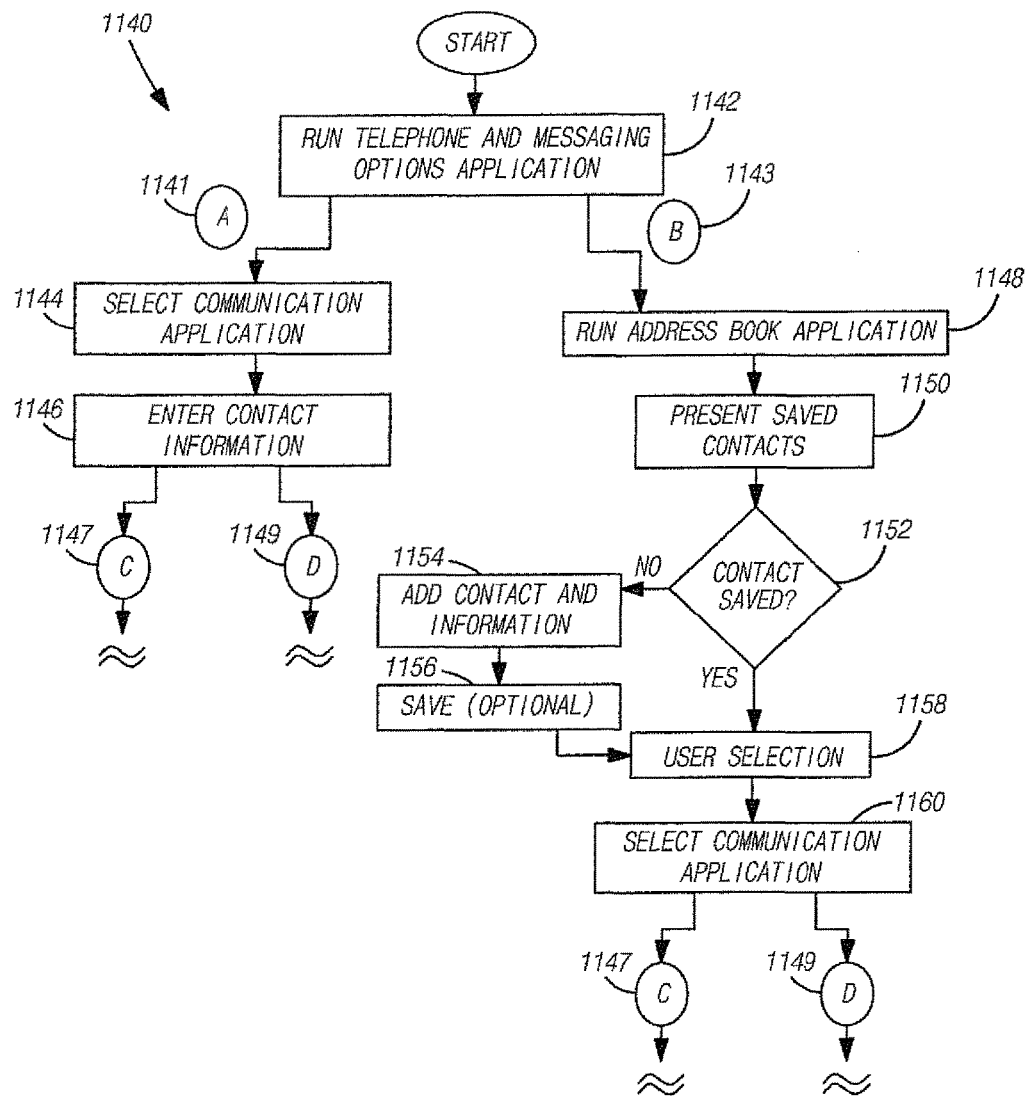
FIG. 11c is a logical flow diagram illustrating one embodiment of the method of utilizing a media application to perform telecommunication or other messaging consistent with the present invention.
Figure 11C:
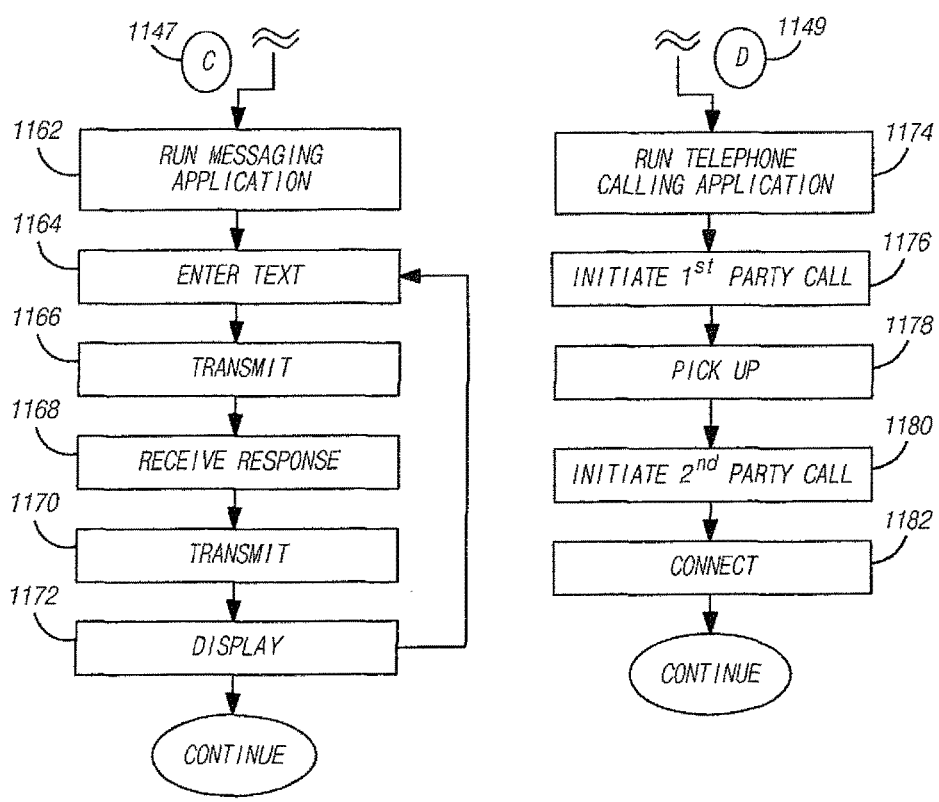
Figure 11D:
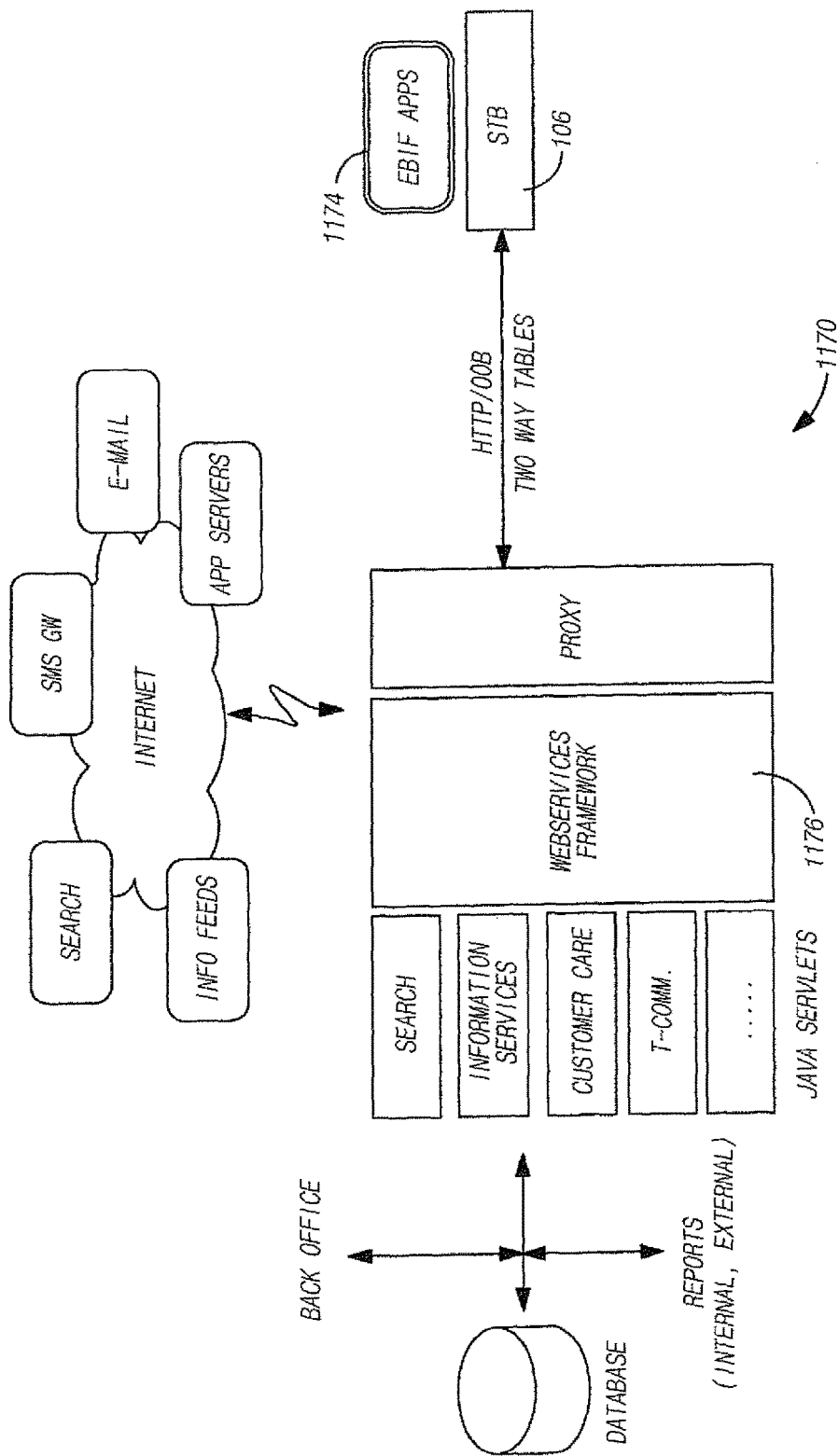
FIG. 11d is a functional block diagram illustrating one embodiment of a framework for utilizing SMS applications according to the present invention.

FIG. 11d illustrates one embodiment of a framework 1170 for utilizing SMS applications. Using SMS/MMS, which is a session-less service, a subscriber can compose an outgoing message using the CPE at home, and send messages to any person who is capable of receiving SMS/MMS messages on their CPE 106 or client device, irrespective of their service provider. The message from the CPE is carried in the illustrated embodiment over HTTP to a SMS Gateway in the headend, and the SMS Gateway routes the SMS/MMS message to an appropriate carrier, which will then deliver the message to the addressed CPE within the carrier. The SMS/MMS service can be associated with the VOIP phone number and/or the mobile phone number as part of the bundled services subscribed by the household if desired.

For the incoming SMS/MMS message service, the subscriber can provide their VOIP and/or mobile phone number associated with the household account as "address/ID" for such service enabled on their account. For an incoming message, the message is delivered to the SMS Gateway from the external network, and within the service network the message is delivered to all the CPEs associated on the account (including the phone device and the device connected to the TV set for video services). This message is delivered asynchronously as notification to video CPE using a connectionless protocol. The receiving application is in one variant an EBIF application 1174, and in this case the message is delivered as a UDP trigger to the CPE 106.

For receiving the incoming SMS/MMS messages, the CPE may be required to register with the gateway when it is turned on, so as to associate the CPE IP address with the subscriber account. In one embodiment, registration may occur according to the methods and apparatus discussed in co-owned U.S. Pat. No. 7,532,712 to Gonder, et al. issued May 12, 2009 and entitled "System and method for providing caller ID service in a multi-region cable network", which is incorporated herein by reference in its entirety, although other approaches may be used with equal success. For the instant messaging (IM) service/application, the subscriber using an application on the CPE (which can be an EBIF as previously noted) initiates a sign-on with the IM/chat server, and establishes a session for communication. In one embodiment, a model similar to that given in FIG. 11d may be used. On connecting with the IM session, the application can also pull-up the list of friends on the user account, and the current status of each friend. Once in a session, the application can send a message to the specific ID on the service, either from the list of available friends, or based on a specific ID entered by the user. The IM/chat service can for example either be provided by the service provider, or can be any service on the Internet. While in a session, the user can dismiss any graphics on the TV screen, and can watch full-screen video. The background application can still receive any incoming IM messages and non-intrusively display the message to the user, and/or can prompt the user to see the message with a visual notification.

The EBIF application 1174 for IM/chat in the illustrated embodiment connects to a service using a web services gateway 1176 within the network. The EBIF application sets up a session, and can send IM messages over HTTP to the gateway, and the gateway connects to the IM service using SIP or HTTP based interfaces. For the incoming IM, the CPE 106 can periodically poll the service for any new message (or for bandwidth efficiency, the IM gateway listens for any new notifications for messages/status update from the IM service, and then can route the messages to the CPE using the notification protocol similar to the SMS application).

Telephone and Messaging Methodology—

One embodiment of the method 1140 of utilizing the address book application to facilitate telephone calling and/or SMS or IM messaging is given at FIG. 11c.

As illustrated, per step 1142, the telephone and messaging options application is run. In one embodiment, the telephone and messaging options application comprises an application which causes the options page 1120 of FIG. 11a to be presented to the user. At the options page 1120, the user may select to enter contact information for a party (logical flow pathway A 1141) or use the address book application to find a saved contact or enter a new contact (logical flow pathway B 1143).

Per step 1144, the user selects the desired communication application. In the illustrated embodiment, the user may select to communicate via the instant messaging (IM) application or the SMS messaging application (logical flow pathway C 1147 discussed below), or via the telephone calling application (logical flow pathway D 1149 discussed below). The user is then prompted to enter contact information in the appropriate format (step 1146). For example, if the user elects at step 1144 to communicate via the instant messaging application, then, at step 1146, the user will be prompted to enter a screen name or email address for sending instant messaging communications.

Alternatively, if the user at the options page 1120 selects the address book option, then per step 1148, the address book application is run. In one embodiment, the application is run according to the method disclosed above with respect to FIG. 6. Specifically, communication between the address book application (at the headend 150) and the client application 206 occurs via the servlet 201, using either the direct (e.g., REFER) method or indirect (e.g., proxied) communication. Running the address book application (step 1148) causes the user to be presented with a list of contacts for which information has previously been stored (step 1150). The user determines whether the desired individual or group is among the saved contacts (step 1152). If the desired contact has not previously been saved, per step 1154, the contact name and information regarding the contact (such as telephone number, email address, etc.) is entered. Then, per step 1156, the entered information is saved. In one embodiment, saving the entered information comprises transmitting the information to a storage entity associated with the application either at the headend or the client device. The saved information is then updated to the previously described list of contacts. The user selects the desired contact from the (updated) contact list at step 1158. The user is then able to select the desired communication application 1160 based on the contact information known about the selected user. For example, if only a telephone number is saved in a particular contact's entry, the user will only be able to use the SMS messaging and telephone calling applications.

Logical flow pathway C 1147 illustrates the method associated with a user selecting to communicate via a messaging application (e.g., SMS messaging or instant messaging). As shown in FIG. 11c, per step 1162, the messaging application is run. In one embodiment, the application is run according to the method disclosed above with respect to FIG. 6. Specifically, communication between the messaging application (at the headend 150) and the client application 206 occurs via the servlet 201, using either a direct (e.g., REFER) method or indirect communication.

Next, at step 1164, the user is prompted to enter a textual message to be sent to the contacted individual. In one embodiment, this is accomplished by presenting the user with one or more pages associated with the application. Per step 1166, the entered text is then transmitted to the headend messaging application (e.g., SMS messaging application located at the headend). Also at step 1166, the message is transmitted on to a host server 208 associated with a device of the contacted individual so that the message may be passed to the device and thus, the individual. In one embodiment, transmission of the message from the media application 204 to the host server 208 utilizes a gateway device 202.

At step 1168, a response is received, and at step 1170 transmitted back to the user CPE 106 (e.g., set top box) for display thereon (or on a display device associated therewith) at step 1172.

Pathway D illustrates the method associated with a user selecting to communicate via a telephone calling application. As shown, per step 1174, the telephone calling application is run. In one embodiment, the application is run according to the method disclosed above with respect to FIG. 6. Specifically, communication between the telephone calling application (at the headend 150) and the client application 206 occurs via the servlet 201, using either the direct (e.g., REFER) method or indirect communication.

Next, at step 1176, a telephone call is initiated to the first party (e.g., the user). In other words, the system uses contact information known about user or entered by the user to dial the telephone number of the telephone associated with the user. When an application on the CPE initiates a call setup request to a servlet on the server, the servlet based on the MAC address looks up the home phone number associated with that CPE and the subscriber account. The destination phone number for the call is sent in the request from application. The destination phone number may be embedded in the application or the data can be fetched through other means. The call setup is then done based on the HOME phone number and DESTINATION phone number. At step 1178, the user picks up the telephone, which initiates the system to dial (step 1180) the second party (e.g., the called party). The two parties are then connected at step 1182.

In an alternative embodiment, the calling application simultaneously establishes a connection with both the user and the called party. According to this embodiment, both parties' lines will ring and, once picked up, the call is connected. The application accomplishes this in the manner discussed above.

Alternate Implementations—

Figure 12:
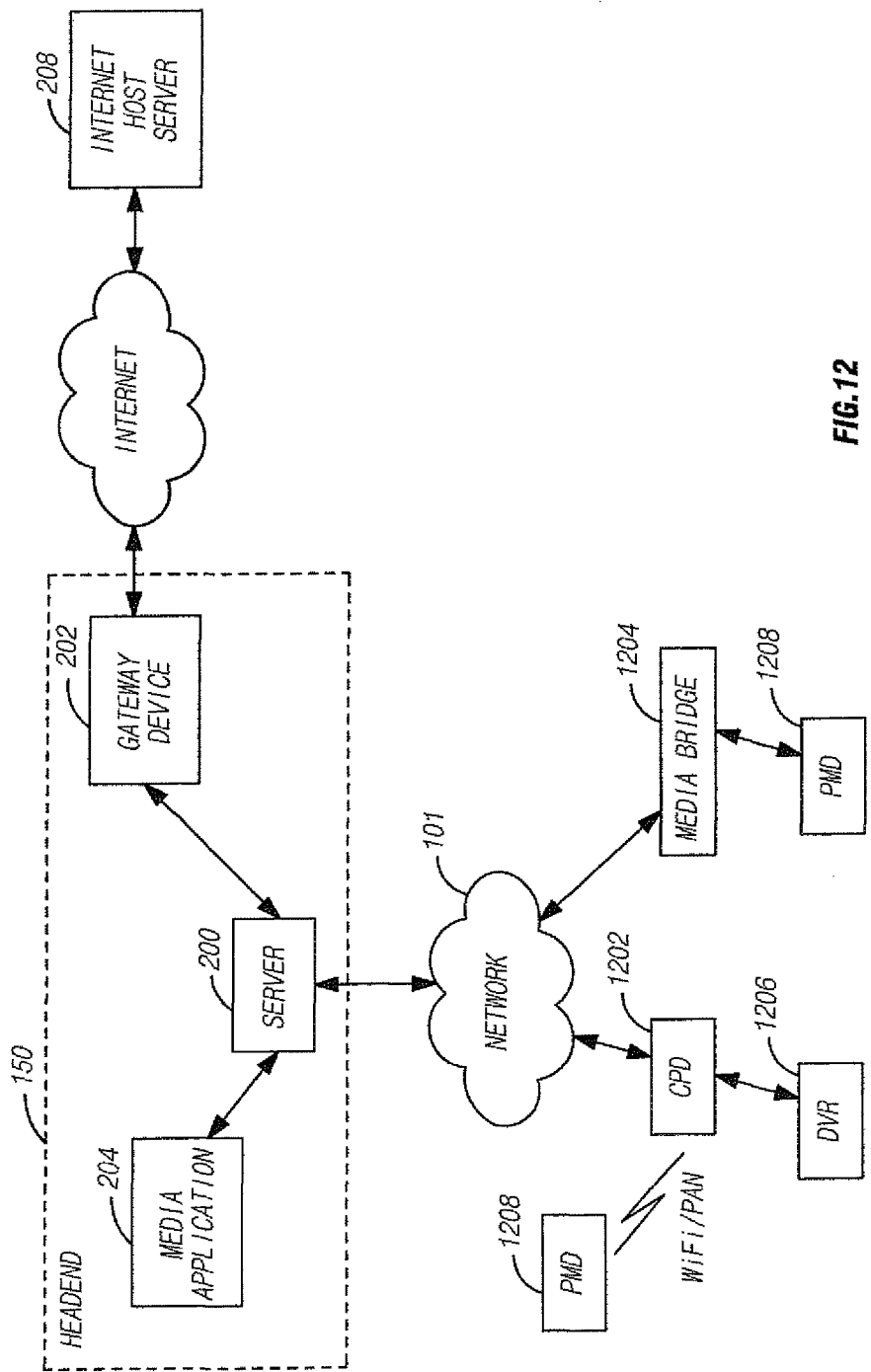
FIG. 12 is a functional block diagram illustrating another embodiment of a network architecture useful with the present invention.

Referring now to FIG. 12, another exemplary network architecture useful with the present invention is illustrated. As shown, the network architecture generally comprises a cable or satellite network having a headend 150. As discussed in greater detail above, the network headend 150 comprises a plurality of media applications 204, a server 200 and a gateway device 202. The gateway device 202 communicates with an internet host server 208 via the Internet. The server 200 provides data and content as well as access to the media applications 204 to a plurality of user devices via the network 101, including a CPD 1202 and media bridge 1204 (these being adapted to run at least a client application, such as client application 206 thereon for accessing and interacting with the media applications 204).

In the illustrated embodiment, a converged premises device (CPD) 1202 may be in communication with the server 200 via the network. The CPD 1202 may for example be of the type described in co-owned and co-pending U.S. patent application Ser. No. 11/378,129 filed Mar. 16, 2006 and entitled "METHODS AND APPARATUS FOR CENTRALIZED CONTENT AND DATA DELIVERY", previously incorporated herein by reference in its entirety. As discussed therein, the CPD 1202 comprises a WLAN (e.g., Wi-Fi) and/or PAN (e.g., Bluetooth or 802.15) wireless interface. Packetized (e.g., IP) traffic may be exchanged between the CPD 1202 and a portable media device (PMD) 1208 via, e.g. the WLAN/PAN interface. Hence, in one embodiment, additional information requested via the aforementioned RFI application may be sent to the PMD 1208 having a suitable complementary wireless interface (which may include e.g., a cellular telephone, smartphone, personal media player, handheld computers, PDA, etc.) via a wireless connection.

In another embodiment, internet content, such as that content selected via the aforementioned IC application, may also be delivered to the PMD 1208 via the WLAN or PAN interface of the CPD 1202. This may include delivery from the internet host server 208, or from the DVR 1206 or other storage device associated with the CPD 1202. Still further, it is appreciated that the PMD 1208 may transmit content to the CPD 1202 via the aforementioned WLAN/PAN connection. For example, a user at the PMD 1208 may upload video or other data to the CPD 1202 for publication to the internet host server 208 and/or storage at the DVR 1206 or other storage device.

In yet another embodiment, the architecture of FIG. 12 may be used to provide synchronization between an address book application running on the CPD 1202 and a similar or corresponding address book application running on the PMD 1208. In this way a user may enter address information at either a display on the user's television or into a PMD 1208 then, via the WLAN or PAN interface (or even a wireline interface such as a mini-USB cable) have the information shared and/or updated between the devices. For example, address book information (such as name and contact information) may be uploaded from, or alternatively downloaded to, a user's PMD, PDA or smartphone.

Also illustrated at FIG. 12, a media bridge apparatus 1204 is in communication with the network 101. The media bridge apparatus 1204 may be for example of the type disclosed in co-owned, co-pending U.S. patent application Ser. No. 12/480,597 filed Jun. 8, 2009 and entitled "Media Bridge Apparatus and Methods", previously incorporated by reference herein in its entirety. As discussed therein, the media bridging apparatus 1204 may acts as a connection between a PMD 1208 and a user's home network. This bridging apparatus 1204 may be used, for example, to convert content stored on the PMD 1208 to a format capable of being presented on a user's set-top box or other client device. The bridging apparatus may also be utilized for transmitting content to the PMD 1208 (such as by converting the content to a format capable of being stored/presented on the PMD 1208). In one embodiment, additional information requested via the aforementioned RFI application may be sent to the PMD 1208 (which may include e.g., an iPod™, handheld computer, smartphone, PDA, etc.) via a connection or interface between the PMD 1208 and bridge apparatus 1204.

In another embodiment, internet content selected via the IC application may also be delivered to the PMD 1208 via the media bridge 1204. In one variant, the internet content may be delivered to the PMD 1208 directly from the internet host server 208. Alternatively, internet content stored on a DVR 1206 or other storage device in the network may be provided to the PMD 1208. In a further variant, the PMD 1208 may transmit content to the bridge apparatus 1204 in order for the content to be stored at the DVR 1206 and/or published to the internet host server 208.

Additionally, the media bridge 1204 of FIG. 12 may be used to provide synchronization between an address book application running on the media bridge 1204 (or entity in communication therewith) and an address book application or function of the PMD 1208 or other mobile device. The user may enter name and contact information at a PMD 1208, the information is then uploaded to the address book application at the bridge 1204 (or via the bridge 1204 to a CPE 106). Further, contact information stored at the address book application (at a storage entity associated therewith) may also be downloaded to the PMD 1208 in a format capable of being displayed and/or stored thereon.

In another implementation (not shown), content and/or data may be distributed to or from a CPE 106 (or a cable modem associated therewith) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile-Broadband Wireless Access Systems Amendment 2: Physical and Medium Access Control Layers for Combined Fixed and Mobile Operation in Licensed Bands" which is incorporated herein by reference in its entirety). For example, multiple WiMAX base stations may be established by the MSO or other content provider. One or more of the WiMAX stations transmit programming or other content and/or data to the CPE 106 (which may including simultaneously, so as to ensure a robust signal is received and to potentially support any QoS requirements). In one embodiment, a CPE 106 having an associated cable modem may transmit receive out-of-band data via WiMAX transport. In yet another embodiment, in-band content and/or data may also be sent/delivered using the aforementioned WiMAX transport. In this fashion, the WiMAX transport acts as a wireless data "pipe" in parallel to the normal DOCSIS or in-band RF channels (e.g., QAMs) transmitted over the cable or satellite distribution network.

In the context of the present invention for example, the CPE 106 might transmit servlet requests destined for one or more media applications 204 via the cable network to the headend server entity 200, yet receive the requested content (e.g., YouTube video content or the like) via the WIMAX broadband interface. Alternatively, the WiMAX interface could be used to transmit the requests to the servlet 201 (via a WiMAX interface associated with the latter), with delivery of the requested content being via in-band RF QAMs. Various permutations of the foregoing will be recognized by those of ordinary skill given the present disclosure.

Subscriber Anonymity—

It will be recognized that various aspects of the present invention are optimally implemented by having user/CPE-specific data. To the degree that the aforementioned processes utilize subscriber-specific or CPE-specific data in its operation, such data can optionally be protected so as to maintain subscriber privacy. For example, the MSO might use a mechanism to anonymously identify and associate the aforementioned data with particular CPE (and hence individual subscriber accounts). In one embodiment, subscriber identities are optionally protected by hashing or encryption of the tuner address or the like prior to logging and storage. The stored "hashed" address or other parameter (e.g., MAC or TUNER ID, or even an IP address associated with the user's account) and associated events are therefore not traceable to a particular user account. The resulting obscured tuner address is repeatable so the necessary tuning location, and user activity tracking may be performed while still maintaining complete anonymity. Alternatively, all or portions of the user-specific (albeit anonymous) information may be stripped off before storage of the activity or configuration data within the historical database. See, e.g., co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, for exemplary implementation of such anonymous mechanisms.

Business Methods and "Rules" Engine—

In another aspect of the invention, implementation of the aforementioned media applications 204 (e.g., rendered as one or more computer programs) optionally includes an operations and/or business rules engine. This engine comprises, in an exemplary embodiment, a series of software routines running on a network device (such as e.g., server 200 or gateway device 202, and/or CPE 106) or other associated hardware/firmware environment that are adapted to control the operation and implementation of various aspects of the media applications 204. These rules may also be fully integrated within the delivery process itself, and controlled via e.g., a GUI on a PC connected to the network device or CPE 106. In effect, the rules engine comprises a supervisory entity which monitors and selectively controls the functioning of the media applications 204 so as to implement desired operational or business rules (e.g., optimization of system reliability, user experience, and/or profit/revenue).

The rules engine, when imposed, can be used to dynamically (or manually) control the media applications 204 (at the headend 150) and/or client application 206 (e.g., access to and services available via the applications 204).

For example, one rule implemented by the rules engine may comprise selectively servicing (or at least queuing first) media application requests from certain users first; e.g., those with a higher subscription priority or level under bandwidth-limited cases, and only after this tier of users is satisfied, servicing any remaining content requests. In one variant, subscribers are divided into tiers (a hierarchy), and certain tiers of the hierarchy are serviced to a prescribed level first. For instance, one rule might impose a requirement that all "premium" subscribers have their application requests serviced before lower-tier subscribers.

In another embodiment, secondary content providers (e.g., advertisers) pay a premium or provide other incentives to the MSO to have particular secondary content associated with one or more of the aforementioned applications. For example, an advertiser may pay a premium to have its advertisements search-enabled, such as by displaying the aforementioned search application. Advertisers and/or content sources may also pay a premium to have primary or secondary content linked to an application for providing a user with the option to receive additional information about a product or service associated with the content. Even the placement of a banner or icon of the given advertiser(s) on an MSO application page or GUI may be used as a basis for revenue generation by the MSO, akin to banner ads on internet websites.

Similarly, a more incremental approach can be applied, such as where various ones of the media applications are "graded" based on profit/revenue and/or operational considerations (i.e., those which earn most and/or give highest user satisfaction, etc. receive a higher grade), and the applications are allocated to subscribers based on such grade(s).

For example, an MSO may provide individual applications or combinations of the applications at different subscriber rates. In one embodiment, additional consideration may be required for access to certain ones of the applications and/or certain bundles of applications (so called "premium" services or applications).

In another aspect of the invention, a "click-through" or similar revenue model can be employed for determining payments or cost of the advertising or promotions presented to a user via one or more of the above-described applications. As is well known in the context of the Internet, click-through models in general generate revenue for a carrier based at least in part on the number of certain events that occur (e.g., clicks or interactions with a certain advertisement's hyperlink or website). Similarly, interactions by a subscriber with an entity associated with the MSO can be recorded and used as a basis for determining advertising pricing or other factors. This can be modeled multiple ways, such as where the more interactions that occur, the more the advertiser pays (based on ostensibly coupling the more interactions with more "impressions" and hence prospective value to the advertiser, and greater burden on the MSO infrastructure). In one variant, the aforementioned telescoping advertisements are used as the basis of this model; e.g., when a subscriber telescopes and advertisement/promotion, or interacts some other way with it, this is considered an affirmative show of interest (or at least impression).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

APPENDIX I

Exemplary Backend Servlet Address Book Interface
© Copyright 2009 Time Warner Cable, Inc. All rights reserved.

| Servlet HTTP APIs for STB client | Description |
|---|---|
| http://horshametag:8080/addbook/frndinfo/<br>u=userid&p=password<br>userid - User Name on Address book server<br>password - Password for the userid | Return example<br><Contacts><br><row><br><firstName>Scott</firstName><br><lastName>Miller</lastName><br><AimScreenName>scottland622</AimScreenName><br><WorkPhone></WorkPhone><br><HomePhone>434-381-5961</HomePhone><br><PersonalMobilePhone>215-292-3881</Personal.MobilePhone><br><BusinessMobilePhone></BusinessMobilePhone><br><PersonalEmail1>scott@temple.edu</PersonalEmail1><br><PersonalEmail2>guitardawg62283@hotmail.com</PersonalEmail2><br><BusinessEmail>scott.miller@twcable.com</BusinessEmail> </row><br><row><br><firstName>Jack</firstName><br><lastName>Miller</lastName><br><AimScreenName>AimScreenName</AimScreenName><br><WorkPbone></WorkPhone><br><HomePhone></HomePhone><br><PersonalMobilePhone></PersonalMobilePhone><br><BusinessMobilePhone></BusinessMobilePhone><br><PersonalEmail1>PersonalEmail1</PersonalEmail1><br><PersonalEmail2>PersonalEmail2</PersonalEmail2><br><BusinessEmail>BusinessEmail</BusinessEmail><br></row><br></Contacts> |

APPENDIX I-continued

Exemplary Backend Servlet Address Book Interface
© Copyright 2009 Time Warner Cable, Inc. All rights reserved.

| Servlet HTTP APIs for STB client | Description |
|---|---|
| http://horshametag:8080/addbook/ymsg/ i=ipaddress&u=username&p=password&a=logout | This is URL for logon to Yahoo IM/Email server |

APPENDIX II

Exemplary Backend Servlet SIP Gateway Interface
© Copyright 2009 Time Warner Cable, Inc. All rights reserved.

| Servlet HTTP APIs for STB client | Description |
|---|---|
| http://c2cserver:7001/CtConfPlus/click2conferenceplus.jsp/ confId=123&caller=2152342344&callee=6102356543 confID - the call ID caller - who initiate the call callee - who is called | This is URL initiating call to TWC SIP gateway in Herndon. |
| http://twcsipproxy:8080/TWC_SIP_PROXY/itInitiateCall/from=phone1&to=phone2&refer=phone3 from - who initiate the call to - who receive the call refer - | This is URL initiating a call through 3CX PBX SIP server |

APPENDIX III

Exemplary STB (Client) to SMS Gateway Interface
© Copyright 2009 Time Warner Cable, Inc. All rights reserved.

| Servlet HTTP APIs for STB client | Description |
|---|---|
| http://www.smseverywhere.com/sendsms.htm/newform=1&Subject=Hello&Send_to=21534556543&Message=Hello | This is URL to send. SMS message through a SMS gateway. |

What is claimed is:

1. A proxy server apparatus comprising:
a first data interface configured to communicate with a plurality of client devices via a digital content delivery network;
a second data interface configured to communicate with a plurality of interactive media applications disposed at a headend of said network digital content delivery; and
processor apparatus in data communication with said first data interface and said data second interface, said processor apparatus configured to run at least one computer program thereon, said computer program comprising a plurality of instructions which are configured to, when executed by said processor apparatus, cause said proxy server apparatus to:
  receive a request from one of said plurality of client devices to access one of said plurality of media applications;
  based at least in part on a determination that said one of said plurality of interactive media applications utilizes a content format which is used by said one of said plurality of client devices:
    generate a session-based protocol message, said session-based protocol message comprising information configured to indicate at least one mechanism by which a software process of said one of said plurality of client devices may establish a data communication session with said one of said plurality of interactive media applications;
    transmit said session-based protocol message to said one of said plurality of client devices, said session-based protocol message configured to indicate to said one of said plurality of client devices that said one of said plurality of client devices may communicate directly with said one of said plurality of interactive media applications via said established data communication session;
    receive data indicative of the established data communication session between said one of said plurality of client devices and said one of said plurality of interactive media applications, said established data communication session established via said at least one mechanism indicated in said session-based protocol message; and
    based at least in part on receipt of said data indicative of said established data communication session, remove said proxy server apparatus from further communication between said one of said plurality client devices and said one of said plurality of interactive media applications during at least a portion of said established data communication session; and
  based at least in part on a determination that said one of said plurality of media applications utilizes a content format which is not used by said one of said plurality of client devices:
    receive a first communication in a first container format utilized by said one of said plurality of interactive media applications, said first communication received from said one of said plurality of media applications;
    transfer said first communication to a second container format utilized by said one of said plurality of client devices to produce a repackaged first communication;
    transmit said repackaged first communication to said one of said plurality of client devices;
    receive a second communication in said second container format, said second communication received from said one of said plurality of client devices;
    transfer said second communication to said first container format to produce a repackaged second communication; and
    transmit said repackaged second communication to said one of said plurality of interactive media applications;

wherein said one of said plurality of client devices and said one of said interactive media applications each are configured to utilize said session-based protocol.

2. The proxy server apparatus of claim 1, wherein said information comprises at least one of: (i) address information of said one of said plurality of interactive media applications and/or (ii) a data format utilized by said one of said plurality of interactive media applications.

3. The proxy server apparatus of claim 1, wherein said one of said interactive media applications comprises an application configured to enable a user to send and receive instant messages or Short Message Service (SMS) messages at said one of said plurality of client devices.

4. The proxy server apparatus of claim 1, wherein said session-based protocol comprises a Session Initiation Protocol (SIP).

5. The proxy server apparatus of claim 1, wherein said one of said plurality of interactive media applications comprises an application configured to enable a user to make digital telephone calls from said one of said plurality of client devices.

6. A client device, comprising:
a network data interface configured to receive a plurality of content for display;
a display device configured to display said plurality of content; and
processor apparatus in data communication with said network interface, said processor apparatus configured to run at least one computer program thereon, said computer program comprising a plurality of instructions which are configured to, when executed by said processor apparatus, cause said client device to:
transmit data indicative of a request to access to at least one of a plurality of media applications via a proxy apparatus, said proxy apparatus being in data communication with said plurality of media applications;
provide, to said proxy apparatus, data related to one or more capabilities of said client device;
based at least in part on analysis of said data related to said one or more capabilities of said client device and a determination by said proxy apparatus that said at least one of said plurality of media applications utilizes a content format which is used by said client device:
receive, from said proxy apparatus, a session-based protocol message, said session-based protocol message comprising data indicative of at least one mechanism by which said at least one of said plurality of media applications may be contacted by said client device;
establish a data communication session with said at least one of said plurality of media applications via said indicated at least one mechanism; and
based at least in part on said establishment of said data communication session, terminate communication with said proxy server for at least a portion of a duration of said established data communication session with said at least one of said plurality of media applications; and
based at least in part on analysis of said data related to said one or more capabilities of said client device and a determination by said proxy apparatus that said at least one of said plurality of media applications utilizes a content format which is not used by said client device:
receive a first converted communication from said proxy apparatus, said first converted communication comprising a first communication which has been converted from a first format into a second format by said proxy apparatus, said first format utilized by said at least one of said plurality of media applications and said second format utilized by said client device;
generate a second communication in said second format, said second communication comprising data indicative of a user command with respect to said at least one of said plurality of media applications;
transmit said second communication to said proxy apparatus, said proxy apparatus configured to convert said second communication into said first format in order to generate a converted second communication for transmission from said proxy apparatus to said at least one of said plurality of media applications.

7. The client device of claim 6, wherein said client device comprises a set-top box, wherein said set-top box comprises at least one tuner, at least one demodulator, and at least one middleware; and
wherein said network interface comprises said at least one tuner and is adapted to receive a quadrature amplitude modulated (QAM) radio frequency in-band channel.

8. The client device of claim 6, wherein said network interface comprises at least one out-of-band channel for aid transmission of said request.

9. The client device of claim 6, wherein said computer program comprises an Enhanced TV Binary Interchange Format (EBIF) user agent and said plurality of media applications comprise EBIF applications.

10. The client device of claim 6, wherein said at least one of said plurality of media applications comprises a search application configured to enable a user of said client device to find information about an entity simultaneous with a display of secondary content associated with said entity, said information comprising a nearest location and/or directions.

11. The client device of claim 6, wherein said at least one of said plurality of media applications comprises a real-time web-based micro-blogging application configured to enable a user of said client device to post, view, and navigate one or more micro-blogs from said client device simultaneously with a display of primary and/or secondary content.

12. The client device of claim 6, wherein said client device comprises a converged premises device configured to offload a more centralized processing to a more distributed processing by utilization of a gateway device within a premises while still supporting a less capable consumer premises equipment (CPE).

* * * * *

UNITED STATES PATENT AND TRADEMARK OFFICE
CERTIFICATE OF CORRECTION

PATENT NO. : 10,178,435 B1
APPLICATION NO. : 13/794560
DATED : January 8, 2019
INVENTOR(S) : Vipul Patel et al.

Page 1 of 1

It is certified that error appears in the above-identified patent and that said Letters Patent is hereby corrected as shown below:

In the Claims

Currently reads (Claim 8 – Column 48):
"8. The client device of claim 6, wherein said network
Interface comprises at least one out-of-band channel for aid
Transmission of said request."

Should read:
-- 8. The client device of claim 6, wherein said network
Interface comprises at least one out-of-band channel for said
Transmission of said request. --

Signed and Sealed this
Tenth Day of September, 2019

Andrei Iancu
*Director of the United States Patent and Trademark Office*